(12) United States Patent
Li et al.

(10) Patent No.: US 12,448,438 B2
(45) Date of Patent: *Oct. 21, 2025

(54) ANTI-IL31 ANTIBODIES FOR VETERINARY USE

(71) Applicant: Elanco US Inc., Greenfield, IN (US)

(72) Inventors: Shyr Jiann Li, Burlingame, CA (US); Lam Nguyen, Burlingame, CA (US); Hangjun Zhan, Burlingame, CA (US)

(73) Assignee: Elanco US Inc., Greenfield, IN (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/311,777

(22) Filed: May 3, 2023

(65) Prior Publication Data

US 2024/0101660 A1    Mar. 28, 2024

Related U.S. Application Data

(63) Continuation of application No. 16/488,045, filed as application No. PCT/US2018/017623 on Feb. 9, 2018, now Pat. No. 11,673,946.

(60) Provisional application No. 62/463,543, filed on Feb. 24, 2017.

(51) Int. Cl.
*C07K 16/24*      (2006.01)
*A61K 39/00*      (2006.01)

(52) U.S. Cl.
CPC ...... *C07K 16/244* (2013.01); *A61K 2039/552* (2013.01); *C07K 2317/24* (2013.01); *C07K 2317/33* (2013.01); *C07K 2317/34* (2013.01); *C07K 2317/52* (2013.01); *C07K 2317/56* (2013.01); *C07K 2317/565* (2013.01); *C07K 2317/76* (2013.01); *C07K 2317/92* (2013.01); *C07K 2317/94* (2013.01)

(58) Field of Classification Search
CPC .............................................. A61K 2039/505
See application file for complete search history.

(56) References Cited

U.S. PATENT DOCUMENTS

| | | | |
|---|---|---|---|
| 5,760,185 A | 6/1998 | Kimachi et al. | |
| 5,795,965 A | 8/1998 | Tsuchiya et al. | |
| 6,194,551 B1 | 2/2001 | Idusogie et al. | |
| 7,514,077 B2 | 4/2009 | Yao et al. | |
| 7,531,636 B2 | 5/2009 | Sprecher et al. | |
| 7,531,637 B2 | 5/2009 | Siadak et al. | |
| 7,615,213 B2 | 11/2009 | Kasaian et al. | |
| 7,638,126 B2 | 12/2009 | Yao et al. | |
| 7,939,068 B2 | 5/2011 | Yao et al. | |
| 8,017,122 B2 | 9/2011 | Siadak et al. | |
| 8,101,183 B2 | 1/2012 | Siadak et al. | |
| 8,105,590 B2 | 1/2012 | Yao et al. | |
| 8,133,899 B2 | 3/2012 | Fry et al. | |
| 8,377,438 B2 | 2/2013 | Yao et al. | |
| 8,388,964 B2 | 3/2013 | Leung et al. | |
| 8,460,667 B2 | 6/2013 | Blanc et al. | |
| 8,466,262 B2 | 6/2013 | Siadak et al. | |
| 8,470,979 B2 | 6/2013 | Bondensgaard et al. | |
| 8,568,723 B2 | 10/2013 | Siadak et al. | |
| 8,637,015 B2 | 1/2014 | Yao et al. | |
| 8,790,651 B2 | 7/2014 | Bammert et al. | |
| 8,968,732 B2 | 3/2015 | Yao et al. | |
| 9,156,909 B2 | 10/2015 | Siadak et al. | |
| 9,206,253 B2 | 12/2015 | Bammert et al. | |
| 9,328,164 B2 | 5/2016 | Gearing | |
| 9,409,986 B2 | 8/2016 | Wu et al. | |
| 9,447,183 B2 | 9/2016 | Wu et al. | |
| 9,447,184 B2 | 9/2016 | Wu et al. | |
| 9,512,219 B2 | 12/2016 | Siadak et al. | |
| 9,556,280 B2 | 1/2017 | Murphy et al. | |
| 9,592,293 B2 | 3/2017 | Wu et al. | |
| 9,605,062 B2 | 3/2017 | Sprecher et al. | |
| 9,683,037 B2 | 6/2017 | Siadak et al. | |
| 9,822,177 B2 | 11/2017 | Siadak et al. | |
| 10,011,647 B2 | 7/2018 | Murphy et al. | |
| 10,086,076 B2 | 10/2018 | Wu et al. | |
| 10,093,731 B2 * | 10/2018 | Li | A61K 39/39591 |
| 10,150,810 B2 | 12/2018 | Li et al. | |
| 10,259,868 B2 | 4/2019 | Siadak et al. | |
| 10,273,297 B2 | 4/2019 | Siadak et al. | |
| 10,633,449 B2 | 4/2020 | Shih et al. | |
| 10,669,337 B2 | 6/2020 | Irving et al. | |
| 10,815,305 B2 | 10/2020 | Orengo et al. | |
| 10,836,796 B2 | 11/2020 | Zhao et al. | |
| 10,845,365 B2 | 11/2020 | Datta et al. | |
| 11,041,017 B2 * | 6/2021 | Yu | G01N 33/57438 |

(Continued)

FOREIGN PATENT DOCUMENTS

| | | |
|---|---|---|
| AU | 2013203075 A1 | 5/2013 |
| CN | 1612689 A | 5/2005 |

(Continued)

OTHER PUBLICATIONS

Hobi et al., "Clinical characteristics and causes of pruritus in cats: a multicentre study on feline hypersensitivity-associated dermatoses," Vet. Dermatol., 1-8 (2011).

Holsapple et al., "Species Comparison of Anatomical and Functional Immune System Development," Birth Defects Res B Dev Reprod Toxicol., 68(4):321-34 (2003).

Hong et al., "Functional Regulation of Interleukin-31 Production by its Genetic Polymorphism in Patients with Extrinsic Atopic Dermatitis," Acta Derm Venereal, 92(4): 430-432 (2012).

Humphrey, et al., "Development of a Model of IL-31 Induced Pruritus in Beagle Dogs," Abstract FC-30, Veterinary Dermatology, 23(Suppl. 1), 1 page (2012).

(Continued)

*Primary Examiner* — Prema M Mertz

(74) *Attorney, Agent, or Firm* — McBee, Moore & Vanik IP, LLC

(57) ABSTRACT

Provided are various embodiments relating to anti-IL31 antibodies binding to canine IL31. Such antibodies can be used in methods to treat IL31-induced conditions in companion animals, such as canines, felines, and equines.

29 Claims, 13 Drawing Sheets

Specification includes a Sequence Listing.

(56) References Cited

U.S. PATENT DOCUMENTS

| | | |
|---|---|---|
| 11,673,946 B2 | 6/2023 | Li et al. |
| 11,697,683 B2 | 7/2023 | Li et al. |
| 2003/0224487 A1 | 12/2003 | Sprecher et al. |
| 2006/0073145 A1 | 4/2006 | Leturcq et al. |
| 2006/0141579 A1 | 6/2006 | Sprecher et al. |
| 2006/0182743 A1 | 8/2006 | Bilsborough |
| 2006/0228329 A1 | 10/2006 | Brady et al. |
| 2006/0275296 A1 | 12/2006 | Siadak et al. |
| 2007/0160610 A1 | 7/2007 | Yao et al. |
| 2007/0160611 A1 | 7/2007 | Yao et al. |
| 2008/0260686 A1 | 10/2008 | Bilsborough et al. |
| 2009/0110685 A1 | 4/2009 | Patel et al. |
| 2009/0208494 A1 | 8/2009 | Bondensgaard et al. |
| 2009/0220417 A1 | 9/2009 | Siadak et al. |
| 2009/0252732 A1 | 10/2009 | Siadak et al. |
| 2009/0280121 A1 | 11/2009 | Leung et al. |
| 2009/0300776 A1 | 12/2009 | Lecron et al. |
| 2010/0061988 A1 | 3/2010 | Hansen |
| 2010/0075996 A1 | 3/2010 | Fry et al. |
| 2010/0221244 A1 | 9/2010 | Yao et al. |
| 2010/0297125 A1 | 11/2010 | Yao et al. |
| 2011/0008820 A1 | 1/2011 | Bilsborough et al. |
| 2011/0123440 A1 | 5/2011 | Hansen et al. |
| 2011/0165063 A1 | 7/2011 | Hsieh et al. |
| 2011/0177072 A1 | 7/2011 | Yao et al. |
| 2011/0287454 A1 | 11/2011 | Wagner |
| 2011/0293514 A1 | 12/2011 | Siadak et al. |
| 2011/0318343 A1 | 12/2011 | Kaisheva et al. |
| 2012/0083456 A1 | 4/2012 | Bilsborough et al. |
| 2012/0100155 A1 | 4/2012 | Stoloff et al. |
| 2012/0107310 A1 | 5/2012 | Yao et al. |
| 2012/0275996 A1 | 11/2012 | Hsieh |
| 2013/0022616 A1 | 1/2013 | Bammert et al. |
| 2013/0177563 A1 | 7/2013 | Leung et al. |
| 2013/0216542 A1 | 8/2013 | Siadak et al. |
| 2013/0266562 A1 | 10/2013 | Siadak et al. |
| 2013/0295611 A1 | 11/2013 | Bondensgaard et al. |
| 2014/0271658 A1 | 9/2014 | Murphy et al. |
| 2014/0286958 A1 | 9/2014 | Bammert et al. |
| 2015/0004161 A1 | 1/2015 | Zhu et al. |
| 2015/0037331 A1 | 2/2015 | Siadak et al. |
| 2015/0368336 A1 | 12/2015 | Siadak et al. |
| 2016/0024201 A1 | 1/2016 | Leung et al. |
| 2016/0137739 A1 | 5/2016 | Arnett et al. |
| 2016/0272703 A1 | 9/2016 | Hsieh et al. |
| 2016/0333101 A1 | 11/2016 | Zhou et al. |
| 2017/0058027 A1 | 3/2017 | Wu et al. |
| 2017/0096484 A1 | 4/2017 | Leung et al. |
| 2017/0158671 A1 | 6/2017 | Zhu et al. |
| 2017/0306019 A1 | 10/2017 | Carriere et al. |
| 2018/0066050 A1 | 3/2018 | Yao et al. |
| 2018/0079817 A1 | 3/2018 | Kaneko et al. |
| 2018/0155418 A1 | 6/2018 | Sprecher et al. |
| 2018/0215805 A1 | 8/2018 | Hjerrild et al. |
| 2018/0244766 A1 | 8/2018 | Li et al. |
| 2019/0010242 A1 | 1/2019 | Eckelman et al. |
| 2019/0038743 A1 | 2/2019 | Siadak et al. |
| 2019/0040125 A1 | 2/2019 | Leung et al. |
| 2019/0119372 A1 | 4/2019 | Yao et al. |
| 2019/0144533 A1 | 5/2019 | Siadak et al. |
| 2019/0169285 A1 | 6/2019 | Li et al. |
| 2019/0284272 A1 | 9/2019 | Bammert et al. |
| 2019/0330366 A1 | 10/2019 | Eckelman et al. |
| 2019/0338020 A1 | 11/2019 | Sprecher et al. |
| 2019/0389944 A1 | 12/2019 | Bammert et al. |
| 2020/0048325 A1 | 2/2020 | Zhan et al. |
| 2020/0048627 A1 | 2/2020 | Gawa et al. |
| 2020/0062840 A1 | 2/2020 | Li et al. |
| 2020/0069773 A1 | 3/2020 | Xu et al. |
| 2020/0069814 A1 | 3/2020 | Zhao et al. |
| 2020/0102396 A1 | 4/2020 | Kaneko et al. |
| 2020/0181258 A1 | 6/2020 | Leger et al. |
| 2020/0190203 A1 | 6/2020 | Shih et al. |
| 2020/0216536 A1 | 7/2020 | Brondyk et al. |
| 2020/0276261 A1 | 9/2020 | Zhao et al. |
| 2020/0277348 A1 | 9/2020 | Kitten et al. |
| 2020/0345843 A1 | 11/2020 | Asrat et al. |
| 2020/0362035 A1 | 11/2020 | Brondyk et al. |
| 2021/0009678 A1 | 1/2021 | Hammerberg et al. |
| 2021/0047406 A1 | 2/2021 | Irving et al. |
| 2021/0079105 A1 | 3/2021 | Orengo et al. |
| 2021/0163587 A1 | 6/2021 | Li et al. |
| 2021/0169896 A1 | 6/2021 | Zhao et al. |
| 2021/0268103 A1 | 9/2021 | Brewer et al. |
| 2021/0308277 A1 | 10/2021 | Zhao et al. |
| 2021/0363270 A1 | 11/2021 | Park et al. |
| 2021/0388053 A1 | 12/2021 | Zhan et al. |
| 2021/0393790 A1 | 12/2021 | Zhao et al. |
| 2021/0395340 A1 | 12/2021 | Zhan et al. |
| 2022/0009994 A1 | 1/2022 | Brondyk et al. |
| 2022/0049002 A1 | 2/2022 | Li et al. |
| 2022/0064263 A1 | 3/2022 | Zhan et al. |
| 2022/0324960 A1 | 10/2022 | Li et al. |

FOREIGN PATENT DOCUMENTS

| | | |
|---|---|---|
| CN | 1896229 A | 1/2007 |
| CN | 101291692 A | 10/2008 |
| CN | 103890009 A | 6/2014 |
| CN | 104710528 A | 6/2015 |
| EP | 1270595 A1 | 1/2003 |
| EP | 1500329 A2 | 1/2005 |
| EP | 1827485 A2 | 9/2007 |
| EP | 2215124 A1 | 8/2010 |
| EP | 2301965 A1 | 3/2011 |
| EP | 2493925 A1 | 9/2012 |
| EP | 2611462 A2 | 7/2013 |
| EP | 2703486 A1 | 3/2014 |
| EP | 2705053 A1 | 3/2014 |
| EP | 2710040 A1 | 3/2014 |
| EP | 2764026 A2 | 8/2014 |
| EP | 2842573 A1 | 3/2015 |
| EP | 2968454 A1 | 1/2016 |
| EP | 2734549 A1 | 5/2017 |
| EP | 3219729 A1 | 9/2017 |
| EP | 3227342 A1 | 10/2017 |
| EP | 2829551 A1 | 12/2017 |
| EP | 2644698 B1 | 1/2018 |
| JP | 2014-529295 A | 11/2014 |
| JP | 6022563 B2 | 11/2016 |
| RU | 2444528 A | 6/2009 |
| RU | 2009/111884 A | 10/2010 |
| WO | 2003060080 A1 | 7/2003 |
| WO | 2006081573 A2 | 8/2006 |
| WO | 2006088855 A1 | 8/2006 |
| WO | 2006088955 A2 | 8/2006 |
| WO | 2006122079 A1 | 11/2006 |
| WO | 2007133816 A3 | 11/2007 |
| WO | 2007143231 A1 | 12/2007 |
| WO | 2008028192 A2 | 3/2008 |
| WO | 2008086505 A2 | 7/2008 |
| WO | 2009071696 A2 | 6/2009 |
| WO | 2010117448 A2 | 10/2010 |
| WO | 2011047262 A1 | 4/2011 |
| WO | 2011065935 A1 | 6/2011 |
| WO | 2011106528 A1 | 9/2011 |
| WO | 2013011407 A1 | 1/2013 |
| WO | 2014191391 A1 | 12/2014 |
| WO | 2014208645 A1 | 12/2014 |
| WO | 2015042596 A1 | 3/2015 |
| WO | 2015067755 A2 | 5/2015 |
| WO | 2015086830 A1 | 6/2015 |
| WO | 2015151079 A2 | 10/2015 |
| WO | 2015173782 A1 | 11/2015 |
| WO | 2016170176 A1 | 10/2016 |
| WO | 2017025698 A1 | 2/2017 |
| WO | 2018073185 A1 | 4/2018 |
| WO | 2018156180 A1 | 8/2018 |
| WO | 2018156367 A1 | 8/2018 |
| WO | 2019118512 A2 | 6/2019 |
| WO | 2019177697 A2 | 9/2019 |
| WO | 2020073345 A1 | 4/2020 |
| WO | 2020155017 A1 | 8/2020 |
| WO | 2020257998 A1 | 12/2020 |

(56) References Cited

FOREIGN PATENT DOCUMENTS

| WO | 2020258893 A1 | 12/2020 |
|---|---|---|
| WO | 2021041972 A1 | 3/2021 |
| WO | 2021115240 A1 | 6/2021 |
| WO | 2021123092 A1 | 6/2021 |
| WO | 2021123094 A1 | 6/2021 |
| WO | 2021165417 A1 | 8/2021 |
| WO | 2021188631 A1 | 9/2021 |
| WO | 2021212081 A1 | 10/2021 |
| WO | 2021212638 A1 | 10/2021 |
| WO | 2021216810 A1 | 10/2021 |
| WO | 2021216899 A1 | 10/2021 |
| WO | 2022029447 A1 | 2/2022 |
| WO | 2022049614 A1 | 3/2022 |

OTHER PUBLICATIONS

Hvid et al., "IL-25 in Atopic Dermatitis: A Possible Link Between Inflammation and Skin Barrier Dysfunction," J Invest Dermatol, 131(1): 150-157 (2011).

IL-31 sequence alignments, submitted in Opposition in EP 3219729, 1 page (submitted on Jun. 9, 2021).

"IL-31 Antibody" (Aviva Systems Biology) [retrieved on Apr. 24, 2018, www.avivasysbio.com/en/il31-antibody-n-terminal-region-oaab05980.html], 2 pages (Oct. 11, 2016).

"IL-31 Antibody" (Aviva Systems Biology) [retrieved on Apr. 24, 2018, www.google.com/search?q=IL31Antibody+-+N-terminal+region+%280AAB05980%29+from+Aviva+Systems+Biology&rlz=1C1GGRV_enUS769US769&source=Int&tbs=cdr%3A1%2Ccd_min%3A%2Ccd_max%3A2.24.2017&tbm=], 1 page.

ImmunoGlobe® product information, Antikorpertechnik GmbH, 2 pages.

Incorvaia et al., "Allergy and the skin," Clinical and Experimental Immunology, vol. 153, Suppl. 1: 27-29 (2008).

Information from European Patent Office regarding revocation of EP Patent No. 3219729 (EP Application No. 17168574.6) (1 page) (issued Jan. 25, 2023).

"INTERDOG: Canine Interferon-γ Preparation (Genetically Modified)," Toray Group, accessed at https://www.toray.com/products/chemicals/che_0060.html, (2 pages) (Aug. 27, 2019).

International Nonproprietary Names for Pharmaceutical Substances (INN) excerpt for Lokivetmab, WHO Drug Information, 29(3):407-408 (2015).

International Preliminary Report on Patentability and Written Opinion for PCT/US2020/048618, 7 pages (Mar. 1, 2022).

International Search Report and Written Opinion for PCT/US2018/017623, 15 pages (May 15, 2018).

International Search Report and Written Opinion for PCT/US2020/048618, 11 pages (mailed Jan. 21, 2021).

International Search Report and Written Opinion received in PCT/US2021/028548, 8 pages (mailed Sep. 2, 2021).

International Search Report received in PCT/US2017/023788, 12 pages (dated Jun. 6, 2017).

Ip et al., "Interleukin-31 induces cytokine and chemokine production from human bronchial epithelial cells through activation of mitogen-activated protein kinase signalling pathways: implications for the allergic response," Immunology, vol. 122: 532-541 (2007).

Janeway et al. Immunology, 3rd ed., Garland Publications, Inc., pp. 3:1-3:11 (1997).

Jarilin, "Osnovy immunologii", M. Medicina: pp. 172-174, with Machine Translation.

Javens et al., "Oclacitinib Inhibits Canine IL-4 and IL-13-activated JAK-STAT Pathways in Canine DH82 Cells," 3pt Proceedings of the North American Veterinary Dermatology Forum, May 1-5, 2018, p. 104 (2018).

Jin et al., "Animal Models of Atopic Dermatitis," J Invest Dermatol, 129(1):31-40 (2009).

Jiao et al., "Progress in the study of the correlation between interleukin-31 and atopic dermatitis," China Medical Innovation, vol. 13 No. 36, pp. 133-136 (Dec. 25, 2016).

Kanda et al., "Characterization of Canine Filaggrin: Gene Structure and Protein Expression in Dog Skin," Vet Dermatol, 24:25-31, e7 (2013).

Kasraie et al, "Interleukin (IL)-31 Induces Pro-Inflammatory Cytokines in Human Monocytes and Macrophages Following Stimulation with Staphylococcal Exotoxins," Allergy, 65:712-721 (2010).

Kasraie et al., "Functional Effects of Interleukin 31 in Human Primary Keratinocytes," Allergy, 66:845-852 (2011).

Kasraie et al., "Interleukin (IL)-31 Activates Signal Transducer and Activator of Transcription (STAT)-1, STAT-5 and Extracellular Signal-Regulated Kinase 1/2 and Down-Regulates IL-12p40 Production in Activated Human Macrophages," Allergy, 68:739-747 (2013).

Kasutani et al., "Anti-IL-31 Receptor Antibody is Shown to be a Potential Therapeutic Option for Treating Itch and Dermatitis in Mice," British Journal of Pharmacology, 171:5049-5058 (2014).

Kindred Biosciences' (KIN) CEO Richard Chin on Q1 2017 Results—Earnings Call Transcript, 3 pages (2017).

King, Stephen, et al. "A randomized double-blinded placebo-controlled study to evaluate an effective ciclosporin dose for the treatment of feline hypersensitivity dermatitis" Veterinary Dermatology, vol. 23, pp. 440-e84, Oct. 2012.

Kovalik et al., The Use of Ciclosporin A in Veterinary Dermatology, Vet J, 2012, 193(2):317-25.

Kruse et al., "Transcriptome and proteome responses in RNAlater preserved tissue of *Arabidopsis thaliana*," PLoS ONE, vol. 12, No. 4: e0175943, 10 pages (2017).

Lai et al., "Interleukin-31 expression and relation to disease severity in human asthma," Scientific Reports, vol. 6: 22835, 1-9 (2016).

Le Saux et al., "Molecular Dissection of Human Interleukin-31-Mediated Signal Transduction through Site-Directed Mutagenesis," Journal of Biological Chemistry, 285(5):3470-3477 (2010).

Leung et al., "Atopic Dermatitis," Lancet, 361:151-60 (2003).

Leung, "Human Atopic Dermatitis: From Laboratory Research to Bedside," Scientific Session Presentations, found at http://ssms.weblinkconnect.com/CWT/EXTERNAL/WCPAGES_NAVDF/PDF/ARCHIVES/ 2010SCIENTIFIC.PDF; 60 pages (2010).

Lewis et al., "The different effector function capabilities of the seven equine IgG subclasses have implications for vaccine strategies," Molecular Immunology, vol. 45, No. 3: 818-827 (2008).

Liu et al., "A SYBR Green I real-time RT-PCR assay for detection and differentiation of influenza A(H1N1) virus in swine populations," Journal of Virological Methods, vol. 162: 184-187 (2009).

Maeda et al., "Engineering of Functional Chimeric Protein G-Vargula Luciferase," Analytical Biochemistry, vol. 249: 147-152 (1997).

Maeda S. et al., "Production of a Monoclonal Antibody to Canine Thymus and Activation-Regulated Chemokine (TARC) and Detection of TARC in Lesional Skin from Dogs with Atopic Dermatitis," Veterinary Immunology and Immunopathology, 103(1-2):83-92 (2005).

Maeda et al., "Expression of CC Chemokine Receptor 4 (CCR4) mRNA in Canine Atopic Skin Lesion," Veterinary Immunology and Immunopathology, 90(3-4):145-154 (2002).

Maeda et al., "Expression Analysis of CCL27 and CCL28 mRNA in Lesional and Non-Lesional Skin of Dogs with Atopic Dermatitis," J Vet. Med. Sci., 70(1):51-55 (2008).

Maeda et al., "Lesional Expression of Thymus and Activation-Regulated Chemokine in Canine Atopic Dermatitis," Vet Immunol Immunopathol, 2002, 88(1-2):79-87.

Marsella et al., "Atopic Dermatitis in Animals and People: An Update and Comparative Review," Vet. Sci., vol. 4: 37, 19 pages (2017).

Marsella et al., "Current evidence of skin barrier dysfunction in human and canine atopic dermatitis," Veterinary Dermatology, vol. 22, 239-248 (2011).

Marsella et al., "Pilot Investigation of a Model for Canine Atopic Dermatitis: Environmental House Dust Mite Challenge of High-Ig-E-Producing Beagles, Mite Hypersensitive Dogs with Atopic Dermatitis and Normal Dogs," Veterinary Dermatology, 17:24-35 (2006).

Marsella et al., "Canine Models of Atopic Dermatitis: A Useful Tool with Untapped Potential," Journal of Investigative Dermatology, 129:2351-2357 (2009).

(56) References Cited

OTHER PUBLICATIONS

Marsella et al., "Transmission Electron Microscopy Studies in an Experimental Model of Canine Atopic Dermatitis," Veterinary Dermatology, 21:81-88 (2010).
Marsella et al., "Current Understanding of the Pathophysiologic Mechanisms of Canine Atopic Dermatitis," Journal of the American Veterinary Medical Association, 241:194-207 (2012).
Declaration of Prof. Dr. Ralf Mueller (Second), EP 2734549--12748547, 6 pages (Aug. 22, 2019).
Declaration of Prof. Kun-Liang Guan, Ph.D., submitted in Opposition to EP 2734549, 40 pages (Jun. 23, 2019).
Dillon et al., "Interleukin 31, a Cytokine Produced by Activated T Cells, Induces Dermatitis in Mice," Nature Immunology, 5(7):752-760 (2004).
Diveu et al, "Predominant Expression of the Long Isoform of GP130-like (GPL) Receptor is Required for Interleukin-31 Signaling," Eur. Cytokine Netw., 15(4): 291-302 (2004).
Dreuw et al., "Characterization of the Signaling Capacities of the Novel gp130-like Cytokine Receptor*," The Journal of Biological Chemistry, vol. 279, No. 34, Issue of Aug. 20: 36112-36120 (2004).
EMBOSS Needle alignment, submitted in Opposition in EP 3219729, 1 page (Nov. 2, 2021).
EMBOSS Needle alignment canine IL31-mouse IL-31, submitted in Opposition in EP 3219729, 1 page (Nov. 2, 2021).
EMBOSS Needle alignment feline IL31-human IL-31, submitted in Opposition in EP 3219729, 1 page (Nov. 2, 2021).
EMBOSS Needle alignment feline IL31-mouse IL-31, submitted in Opposition in EP 3219729, 1 page (Nov. 2, 2021).
EMBOSS Needle alignment IL-31_felis catus (SEQ ID No. 70)_1L-31 canis lupus (1 page) (Rundate: Oct. 31, 2021).
Estep et al., "High Throughput Solution-Based Measurement of Antibody-Antigen Affinity and Epitope Binning," mAbs, 5(2):270-278 (2013).
Experimental report submitted in EP 2734549--12748547, 3 pages (Jul. 18, 2019).
Experimental Report of IL-31-Induced Stat1-6 Phosphorylation, extracted from WO 2019177697, submitted in EP 2734549 Opposition, 3 pages (Mar. 11, 2011).
"Experimental Report of IL-31-Induced Stati-6 Phosphorylation," Filed in the European Patent Office Opposition to European Patent EP 2734549 B1, Jul. 18, 2019, 3 pages.
Extended European Search Report for European Patent Application No. 18756690.6, 9 pages, dated Nov. 2, 2020.
Ezzat et al., "Serum Measurement of Interleukin-31 (IL-31) in Paediatric Atopic Dermatitis: Elevated Levels Correlate with Severity Scoring," JEADV, 25:334-339 (2011).
Favrot, C. "Feline allergic dermatitis: clinical aspects and diagnosis," ESVD-ECVD Annual Meeting, 5 pages (2013).
Felsburg, "Overview of Immune System Development in the Dog: Comparison with Humans," Hum Exp Toxicol, 21 (9-10):487-92 (2002).
File History of U.S. Appl. No. 17/638,372, (filed Feb. 25, 2022).
File History of U.S. Appl. No. 15/467,464, (filed Mar. 23, 2017).
File History of U.S. Appl. No. 16/488,045, (filed Aug. 22, 2019).
Finkelstein et al., "Protein Physics," Institute of Protein Research, Second, Updated and Extended Edition, Lecture 1, p. 11 (2016).
Fleck, et al., "Comparison of the Janus Kinase (JAK) Inhibitor, Oclacitinib, and Prednisolone in Canine Models of Pruritus," Abstract FC-36, Veterinary Dermatology, 23(Suppl. 1), 1 page (2012).
Further Written Submissions of Opponent 01, in Opposition of EP 3219729 (22 pages) (Nov. 25, 2022).
Further Written Submissions of Opponent 02, in Opposition of EP 3219729 (36 pages) (Nov. 24, 2022).
GenBank NCBI Sequence XM_011287838.1, "Predicted: Felis catus interleuikin 31 (IL31), mRNA," 1 page (Feb. 10, 2015).
Gibbs et al., "Role of the Pruritic Cytokine IL-31 in Autoimmune Skin Diseases," Frontiers in Immunololgy, vol. 10, Article 1383: 1-6 (2019).
Gonzales et al., "Interleukin-31: Its Role in Canine Pruritus and Naturally Occurring Canine Atopic Dermatitis," Vet Dermatol, 24:48-53 and e11-e12 (2013).
Gonzales, et al., "IL-31: Its Role in Canine Pruritus and Prevalence in Naturally Occurring Canine Atopic Dermatitis," Abstract Supporting Original Study 5, Veterinary Dermatology, 23(Suppl. 1):6 (2012).
Gonzales et al., "Oclacitinib (Apoquel®; Zoetis) is a novel Janus kinase inhibitor that has activity against canine pro-allergic and pro-inflammatory cytokines," Abstracts of the 25th Annual Congress of the ECVD-ESVD, Sep. 19-21, 2013, Valencia, Spain, Veterinary Dermatology, 24:377-397, at pp. 384-385 (2013).
Gonzales et al., "Oclacitinib (Apoquel®) is a novel Janus kinase inhibitor with activity against cytokines involved in allergy," Journal of Veterinary Pharmacology and Therapeutics, 37:317-24 (2014).
Grimstad et al., "The Effect of Anti-Interleukin-31-Antibodies on Scratching Behaviour and Development of Dermatitis on NC/NGA Mice," Inflamm. Res., Supplement 3, FC09.7, S396-S397 (2007).
Grimstad et al., "Anti-Interleukin-31-Antibodies Ameliorate Scratching Behaviour in NC/Nga Mice: A Model of Atopic Dermatitis," Experimental Dermatology, 18(1):35-43 (2009).
Gutzmer et al., "Pathogenetic and therapeutic implications of the histamine H4 receptor in inflammatory skin diseases and pruritus," Frontiers in Bioscience S3, pp. 985-994 (2011).
Gutzwiller, M. E. R., "Canine Dendritic Cells and Their Involvement in Atopic Dermatitis," Dissertation, Bern, 69 pages (2010).
Haitina et al., The G Protein-Coupled Receptor Subset of the Dog Genome is More Similar to that in Humans than Rodents, BMC Genomics, 10:24, 13 pages (2009).
Halliwell, R. E. W., "The immunopathogenesis of allergic skin diseases in dogs and cats," EJCAP, vol. 19, No. 3: 213-218 (2009).
Halliwell et al., "The ACVD task force on canine atopic dermatitis (III): the role of antibodies in canine atopic dermatitis," Veterinary Immunology and Immunpathology, 81(3-4):159-167 (2001).
Harrison et al., "The use of quantitative RT-PCR to measure mRNA expression in a rat model of focal ischemia—caspase-3 as a case study," Molecular Brain Research, vol. 75: 143-149 (2000).
Hashimoto et al., "Itch-Associated Scratching Contributes to the Development of Dermatitis and Hyperimmunoglobulinaemia E in NC/Nga Mice," Experimental Dermatology, 20:820-825 (2011).
Hashizume et al., "IL-6 Plays an Essential Role in Neutrophilia Under Inflammation," Cytokine, 54:92-99 (2011).
Hashizume et al., The Roles of Interleukin-6 in the Pathogenesis of Rheumatoid Arthritis, Arthritis, Article ID 765624, 8 pages (2011).
Hawro et al., "Interleukin-31 Does Not Induce Immediate Itch in Atopic Dermatitis Patients and Healthy Controls after Skin Challenge," Allergy, 69:113-117 (2014).
Heise et al., "IL-31 Receptor Alpha Expression in Epidermal Keratinocytes Is Modulated by Cell Differentiation and Interferon Gamma," Journal of Investigative Dermatology, vol. 129, 240-243 (2009).
Hill et al., "Survey of the prevalence, diagnosis and treatment of dermatological conditions in small animals in general practice," Veterinary Record, vol. 158: 533-539 (2006).
Hill, R. E., "Center for Veterinary Biologics Notice No. 13-05," United States Department of Agriculture, Animal and Plant Health Inspection Service, Veterinary Services, Center for Veterinary Biologics, Ames, Iowa (dated Mar. 4, 2013).
Hill et al., "Pilot Study of the Effect of Individualised Homeopathy on the Pruritus Associated with Atopic Dermatitis in Dogs," Vet. Rec., 164(12):364-70 (2009).
Hillier et al., The ACVD Task Force on Canine Atopic Dermatitis (I): Incidence and Prevalence, Veterinary Immunology and Immunopathology, 81:147-151 (2001).
Hirano et al., "Signaling Mechanisms Through gp130: A Model of the Cytokine System," Cytokme & Growth Factor Reviews, vol. 8., No. 4: 241-252 (1997).
UniProt Database, IL31Ra, *Canis lupus familiaris* (Dog), UniProtKB—F1PTZ6, 7 pages.
UniProt Database, OSMR, *Canis lupus familiaris* (Dog), UniProtKB—E2QWS7, 8 pages.

(56) References Cited

OTHER PUBLICATIONS

Vandesompele et al., "Accurate normalization of real-time quantitative RT-PCR data by geometric averaging of multiple internal control genes," Genome Biology, vol. 3(7): research0034.1-0034.11 (2002).
Venereau et al., "Definition and Characterization of an Inhibitor for Interleukin-31," Journal of Biological Chemistry, 285 (20):14955-14963 (2010).
Wai et al., "Interleukin-31 Induces Cytokine and Chemokine Production from Human Bronchial Epithelial Cells Through Activation of Mitogen-Activated Protein Kinase Signalling Pathways: Implications for the Allergic Response," Immunology, 122:532-541 (2007).
Weber et al., "Assessment of mRNA and microRNA Stabilization in Peripheral Human Blood for Multicenter Studies and Biobanks," Biomarker Insights, vol. 5: 95-102 (2010).
Winthrop, "The Emerging Safety Profile of JAK Inhibitors in Rheumatic Disease," Nat Rev Rheumatol, 13(4):234-243, and correction (1 page) (2017).
Wisselink et al., "The efficacy of cyclosporine A in cats with presumed atopic dermatitis: A double blind, randomised prednisolone-controlled study," The Veterinary Journal, vol. 180: 55-59 (2009).
Wood et al., "Despite Identifying Some Shared Gene Associations with Human Atopic Dermatitis the use of Multiple Dog Breeds from Various Locations Limits Detection of Gene Associations in Canine Atopic Dermatitis," Vet Immunol and Immunopath, 138:193-197 (2010).
Wood et al., "Reference Genes for Canine Skin When Using Quantitative Real-Time PCR," Vet Immunol Immunopathol, 2008, 126(3-4):392-395.
Wood et al., "Gene Expression in Canine Atopic Dermatitis and Correlation with Clinical Severity Scores," J Dermatol Sci, 2009, 55(1):27-33.
Xia et al., "Interleukin 31 and Atopic Dermatitis," Intl Journal of Immunol, 31(5):383-386, English Abstract (2008).
Yagi et al., "Interleukin-31 Stimulates Production of Inflammatory Mediators from Human Colonic Subepithelial Myofibroblasts," Int J Mol Med, 2007, 19(6):941-946.
Yaseen et al., "Interleukin-31 promotes pathogenic mechanisms underlying skin and lung fibrosis in sclerodema," Rheumatology, vol. 0: 1-12 (2020).
Zhang et al., "Structures and Biological Functions of IL-31 and IL-31 Receptors," Cytokine Growth Factor Rev., 19 (5-6):347-356, NIH public access version, 18 pages (2008).
Zoetis Press Release, Zoetis Receives European Commission Marketing Authorization for Cytopoint (lokivetmab), 4 pages (Apr. 26, 2017).
Zoetis Press Release, "Zoetis Receives USDA License for CYTOPOINT," 4 pages (Dec. 21, 2016).
Reichmann et al., "Reshaping Human Antibodies for Therapy," Nature, 332:323-327 (1988).
Rejection of the Opposition, EP Opposition EP12748547.2-EP 2734549, 25 pages (Oct. 21, 2019).
Reply to appeal, EP Opposition EP12748547.2-EP 2734549, 58 pages (Jul. 16, 2020).
Reply to Opposition, EP Opposition EP17168574.6-EP 3219729, 66 pages (Nov. 3, 2021).
Reply to Opposition, EP Opposition EP12748547.2-EP 2734549, 47 pages (Jul. 23, 2018).
Reply to Opposition Proceedings in EP 3219729 (218 pages) (Nov. 3, 2021).
Reply to the Summons to Attend Oral Proceedings, in Opposition of EP 3219729 (19 pages) (Nov. 25, 2022).
Robinson et al., "Clinical Consequences of Targeting IL-17 and TH17 in Autoimmune and Allergic Disorders," Curr Allergy Asthma Rep, vol. 13, No. 6: 1-14 (2013).
Roosje et al., "Feline Atopic Dermatitis: A Model for Langerhans Cell Participation in Disease Pathogenesis," American Journal of Pathology, vol. 151, No. 4: 927-932 (1997).
Roosje et al., "Increased Numbers of CD4+ and CD8+ T Cells in Lesional Skin of Cats with Allergic Dermatitis," Vet Pathol, vol. 35: 268-273 (1998).
Rudikoff et al. Proc. Natl. Acad. Sci. USA vol. 79, pp. 1979-1983 (Mar. 1982).
Rugg et al., "Immunohistochemical Evaluation of IL-31 Receptor A Localization in Neuronal and Cutaneous Tissues of Beagle Dogs," Zoetis Inc.,Florham Park, NJ, USA.
Saeki et al., Thymus and Activation Regulated Chemokine (TARC)/CCL 17 and Skin Diseases, J Derma Science, 43:75-84 (2006).
Safdari et al., "Antibody humanization methods—a review and update," Biotechnology and Genetic Engineering Reviews, vol. 29, No. 2: 175-186 (2013).
Saleem, et al., "Interleukin-31 Pathway and Its Role in Atopic Dermatitis: A Systematic Review," J Dermatolg Treat., 28 (7):591-599 (2017).
Sandilands et al., "Filaggrin in the Frontline: Role in Skin Barrier Function and Disease," J Cell Science, 122:1285-1294 (2009).
Sando et al., "Complete Overlap of Interleukin-31 Receptor A and Oncostatin M Receptor in the Adult Dorsal Root Ganglia with Distinct Developmental Expression Patterns," Neuroscience, 142(4): 1263-1271 (2006).
Santoro, et al., "Canine and Human Atopic Dermatitis: Two Faces of the Same Host-Microbe Interaction," J Investigative Dermatol, 136:1087-1089 (2016).
Sapunar et al., "Dorsal root ganglion—a potential new therapeutic target for neuropathic pain," Journal of Pain Research, vol. 5: 31-38 (2012).
Scheerlinck et al., "Functional and Structural Comparison of Cytokines in Different Species," Vet Immunol Immunopathol, 1999, 72(1-2):39-44.
Schlothauer et al., "Novel human IgG1 and IgG4 Fc-engineered antibodies with completely abolished immune effector functions," Protein Engineering, Design and Selection, vol. 29, No. 10: 457-466 (2016).
Schlotter et al, "Lesional Skin in Atopic Dogs Shows a Mixed Type-1 and Type-2 Immune Responsiveness," Vet Immunol Immunopathol, 2011, 143(1-2):20-26.
Schulz et al., "A common haplotype of the IL-31 gene influencing gene expression is associated with nonatopic eczema," J Allergy Clin Immunol, (2007), vol. 120, No. 5: 1097-1102.
Schwartzman et al., "Canine Reaginic Antibody: Characterization of the Spontaneous Anti-Ragweed and Induced Anti-Dinitrophenyl Reaginic Antibodies of the Atopic Dog," Clin. exp. Immunol., vol. 9: 549-569 (1971).
Scott et al., "Treatment of Canine Atopic Dermatitis with a Commercial Homeopathic Remedy: A Single-Blinded, Placebo-Controlled Study," Can Vet J, 2002, 43(8):601-603.
Sequence Alignment (3 pages ) performed Jul. 2, 2019.
Shen et al., "Single Variable Domain-IgG Fusion: A Novel Recombinant Approach to Fc Domain-Containing Bispecific Antibodies," The Journal of Biological Chemistry, vol. 281, No. 16: 10706-10714 (2006).
Song et al., "JAK1 Activates STAT3 Activity in Non-Small-Cell Lung Cancer and IL-6 Neutralizing Antibodies Can Suppress JAK1-STAT3 Signaling," Mol Cancer Ther, 2011, 10(3):481-494.
Sonkoly et al., "IL-31: A New Link Between T Cells and Pruritus in Atopic Skin Inflammation," J Allergy Clin Immunol, 117(2):411-417 (2006).
Soumelis et al., "Human Epithelial Cells Trigger Dendritic Cell-Mediated Allergic Inflammation by Producing TSLP," Nat Immunol, 2002, 3(7):673-680.
Sousa et al., "The ACVD Task Force on Canine Atopic Dermatitis (II): Genetic Factors," Veterinary Immunology and Immunopathology, 2001, 81(3-4):153-157.
"STAT3," Wikipedia, using the Internet archive service "Wayback Machine" (1 page) (from Sep. 3, 2010).
Statement of grounds of appeal, EP Opposition EP12748547.2-EP 2734549, 39 pages (Feb. 28, 2020).
Strachan et al., "Family Size, Infection, and Atopy: The First Decade of the Hygiene Hypothesis," Thorax, 2000, 55 (Suppl 1): S2-S10.

(56) References Cited

OTHER PUBLICATIONS

Strietzel et al., "In Vitro functional characterization of feline IgGs," Veterinary Immunology and Immunopathology, vol. 158, No. 3: 214-223 (2014).
Strohl, W. R., "Fusion Proteins for Half-Life Extension of Biologics as a Strategy to Make Biobetters," Biodrugs, vol. 29, No. 4: 215-239 (2015).
Suter et al., "The keratinocyte in epidermal renewal and defence," Veterinary Dermatology, vol. 20, 515-532 (2009).
Table of Antibodies—Excerpt from WO 2019-177697, cited in Opposition of EP 3219729 (2 pages) (Nov. 25, 2022).
Takaoka et al., "Expression of IL-31 Gene Transcripts in NC/Nga Mice with Atopic Dermatitis," European Journal of Pharmacology, 516(2):180-181 (2005).
Takaoka et al., "Involvement of IL-31 on Scratching Behavior in NC/Nga Mice with Atopic-Like Dermatitis," Experimental Dermatology, 15(3):161-167 (2006).
Tang, "Molecular Cloning of Canine IL-13 Receptor a Chain (a1 and a2) cDNAs and Detection of Corresponding mRNAs in Canine Tissues," Veterinary Immunology and Immunopathology, 2001, 79(3-4):181-195.
Terada et al, "Clinical Comparison of Human and Canine Atopic Dermatitis Using Human Diagnostic Criteria: Proposal of Provisional Diagnostic Criteria for Canine Atopic Dermatitis," Journal of Dermatology, 38:784-790 (2011).
Third Party Observations, EP Opposition EP 19196963.3-EP 3653645, 12 pages (Aug. 22, 2022).
Third Party Observations According to Art. 115 EPC, filed in EP 2734549 (9 pages) (Apr. 14, 2015).
Tomasco et al., "Comparison of commercial DNA preparation kits for the detection of Brucellae in tissue using quantitative real-time PCR," BMC Infectious Diseases, vol. 10: 100, 5 pages (2010).
Tominaga et al., "In Vitro Model for Penetration of Sensory Nerve Fibers on a Matrigel Basement Membrane: Implication for Possible Application to Intractable Pruritus," British Journal of Dermatology, 161:1028-1037 (2009).
Torres et al., "The immunoglobulin constant region contributes to affinity and specificity," Trends in Immunology, vol. 29, No. 2: 91-97 (2008).
Tricarico et al., "Quantitative real-time reverse transcription polymerase chain reaction: normalization to rRNA or single housekeeping genes is inappropriate for human tissue biopsies," Analytical Biochemistry, vol. 309: 293-300 (2002).
UniProtKB-A0A3Q7TBT9 (A0A3Q7TBT9_VULVU), (3 pages) "Interleukin-31," last modified Jun. 5, 2019.
UniProt Database, Interleukin 31, *Canis lupus familiaris* (Dog), UniProtKB—C7GOW1, 4 pages.
Aaronson et al., "A Road Map for Those Who Don't Know JAK-STAT," Science, 296:1653-1655 (2002).
Abdi, et al., "IL-31 Is an Inflammatory Pro-Fibrotic Factor Elevated in a Subset of Scleroderma Patients with Severe Pruritus," Abstract No. 821, Arthritis Rheumatol, 68(suppl 10), 2 pages (2016).
Advancing the Science of Atopic Dermatitis Treatment, Canine Atopic Dermatitis Immunotherapeutic Brochure, Zoetis, 8 pages (2016).
Akira, Shizuo, "Functional Roles of STAT Family Proteins: Lessons from Knockout Mice," Stem Cells, vol. 17:138-146 (1999).
AlphaScreen kits brochure, Perkins Elmer, 2 pages (Mar. 2011).
"Amended Claims With Annotations" in Opposition of EP 2734549 (156 pages) (filed Jul. 16, 2020).
Anti-Feline IL-31 Functional Assay Data, filed in Opposition in EP 3219729 (1 page) (Nov. 25, 2022).
Bachmann et al., "Vaccination against IL-31 for the treatment of atopic dermatitis in dogs," Letters to the Editor, J Allergy Clin Immunol, vol. 142, No. 1: 279-281.e1, 4 pages (2018).
Bammert et al., "Genome-Wide Expression Patterns in *Saccharomyces cerevisiae*: Comparison of Drug Treatments and Genetic Alterations Affecting Biosynthesis of Ergosterol," Antimicrobial Agents and Chemotherapy, vol. 44, No. 5: 1255-1265 (2000).

Bando et al., Complete Overlap of Interleukin-31 Receptor A and Oncostatin M Receptor β in the Adult Dorsal Root Ganglia with Distinct Developmental Expression Patterns, Neuroscience, 142(4): 1263-1271 (2006).
Barber et al., "GAPDH as a housekeeping gene: analysis of GAPDH mRNA expression in a panel of 72 human tissues," Physiol Genomics, vol. 21: 389-395 (2005).
Bergeron et al., "Comparative functional characterization of canine IgG subclasses," Veterinary Immunology and Immunopathology, vol. 157, No. 1: 31-41 (2014).
Bieber et al., "Pathogenesis of Atopic Dermatitis: New Developments," Allergic Dermatosis and Urticaria, vol. 9: 291-294 (2009).
Bilsborough et al., "IL-31 Receptor (IL-31RA) Knockout Mice Exhibit Elevated Responsiveness to Oncostatin M," J Immunol, 185:6023-6030 (2010).
Bilsborough et al., "IL-31 is Associated with Cutaneous Lymphocyte Antigen-Positive Skin Homing T Cells in Patients with Atopic Dermatitis," J Allergy and Clin Immunol, 117(2):418-425 (2006).
Bogiatzi et al., "Cutting Edge: Proinflammatory and Th2 Cytokines Synergize to Induce Thymic Stromal Lymphopoietin Production by Human Skin Keratinocytes," J Immunol, 178:3373-3377 (2007).
Boguniewicz et al., "Atopic Dermatitis: A Disease of Altered Skin Barrier and Immune Dysregulation," Immunol Rev., vol. 242, No. 1: 233-246 (2011).
Brandt et al., Th2 Cytokines and Atopic Dermatitis, J Clin Cell Immunol., 2(3):110, 25 pages (2011).
Brief Communication from European Patent Office regarding Opposition of EP Patent No. 3219729 (EP Application No. 17168574.6) enclosing letter from Opponent (3 pages) (Jan. 17, 2023).
Buddenkotte et al., "Pathophysiology and Therapy of Pruritus in Allergic and Atopic Diseases," Allergy, 65:805-821 (2010).
Butler et al., "Porcine IgG: structure, genetics, and evolution," Immunogenetics, Springer, Berlin, DE, vol. 61, No. 3: 209-230 (2009).
Canidae family information submitted in EP 2734549-12748547, 2 pages (Jul. 18, 2019).
Canine Atopic Dermatitis Immunotherapeutic: A Caninized Anti-cIL-31 Monoclonal Antibody, FAQ's, o.zoetisus.com/rs/686-BYD-443/images/canine-il-31-faqs.pdf, 16 pages.
Canine Atopic Dermatitis Immunotherapeutic, First to Know Slides, found at http://o.zoetisus.com/rs/686-BYD-443/images/canine-il-31-first-to-know-slide-deck.pdf, 160 pages (2015).
Carmi-Levy, et al., "A Modular View of Cytokine Networks in Atopic Dermatitis," Clinic Rev Allerg Immunol, 41:245-253 (2011).
Carr et al., "Investigation of the Pruitogenic Effects of Histamine, Serotonin, Tryptase, Substance P and Interleukin-2 in Healthy Dogs," Vet Dermatol, 2009, 20(2):105-110.
Castellani et al., "IL-31 A TH2 Cytokine Involved in Immunity and Inflammation," Int J Immunopathol Pharmacol, 23 (3):709-713 (2010).
Carter, Paul J., "Potent antibody therapeutics by design," Nature Reviews Immunology, Nature Pub. Group, GB, vol. 6: 343-357 (2006).
Cevikbas et al, "Interleukin-31 Directly Regulates Neuronal Function in Inflammation and Itch," Journal Inv. Derm. Abstract No. 700, 130:S117, 2 pages (2010).
Cevikbas et al., "A Sensory Neuron-Expressed IL-31 Receptor Mediates T helper Cell-Dependent Itch: Involvement of TRPV1 and TRPA1," J Allergy Clin Immunol, 133:448-60, 460.e1-e7 (2014).
Chattopadhyay et al., "Interleukin-31 and Oncostatin-M Mediate Distinct Signaling Reactions and Response Patterns in Lung Epithelial Cells," Journal of Biological Chemistry, 282(5):3014-3026 (2007).
Chen et al., "Restoration of Tight Junction Structure and Barrier Function by Down-Regulation of the Mitogen-Activated Protein Kinase Pathway in Ras-Transformed Madin-Darby Canine Kidney Cells," Mol Biol Cell, 11:849-862 (2000).
Cheung et al., "Activation of Human Eosinophils and Epidermal Keratinocytes by Th2 Cytokine IL-31: Implication for the Immunopathogenesis of Atopic Dermatitis," Int Immunol, 22(6):453-467 (2010).

(56) References Cited

OTHER PUBLICATIONS

Chinese Office Action with Search Report and English translation issued in corresponding Chinese Patent Application No. 201880026436.4 (13 pages) (Jan. 20, 2023).
Colman, P.M., "Effects of amino acid sequence changes on antibody-antigen interactions," Res Immunol., vol. 145, No. 1: 33-36 (1994).
Cornelissen et al., "Signaling by IL-31 and Functional Consequences," European Journal of Cell Biology, 91:552-566 (2012).
Cosgrove et al., "A Multicentre Clinical Trial to Evaluate the Efficacy and Field Safety of Oclacitinib," Abstract FC-35, Veterinary Dermatology, 23(Suppl. 1), 1 page (2012).
Cytopoint™ ALK Technical Memo, Medical Scientific Affairs, 2 pages (Apr. 2017).
Cytopoint, European Medicines Agency, European public assessment report (EPAR), 2 pages (2017).
Dambacher et al., "Interleukin 31 Mediates MAP Kinase and STAT1/3 Activation in Intestinal Epithelial Cells and its Expression is Upregulated in Inflammatory Bowel Disease," Gut, 56:1257-1265 (2007).
Darnell et al., "Jak-STAT Pathways and Transcriptional Activation in Response to IFNs and Other Extracellular Signaling Proteins," Science, 1994, 264(5164):1415-1421, 7 pages.
Data and sequence alignments submitted in EP 2734549-12748547, 9 pages (Jul. 18, 2019).
Data submitted in EP 2734549-12748547, 2 pages (Jul. 18, 2019).
De Bellis, Filippo, "Latest Thinking on Atopic Dermatitis in Cats and Dogs," Vet Times, 23 pages (Apr. 7, 2014).
Decision of the Board of Appeal, EP Opposition EP12748547.2-EP 2734549, 8 pages (Apr. 1, 2022).
Decision (Preliminary and Non-binding Opinion of the Opposition Division) and Summons to Attend Oral Proceedings, In Opposition of EP 3219729 (18 pages) (Feb. 28, 2022).
Marsella et al., "Animal Models of Atopic Dermatitis," Clinics in Dermatology, 21(2):122-133 (2003).
McCandless et al., "Production of IL-31 by Canine Th2 Cells and Identification of Inflammatory and Neuronal Target Cells," Abstract FC-65, Veterinary Dermatology, 23(Suppl. 1), 1 page (2012).
McCandless et al., "Allergen-Induced Production of IL-31 by Canine Th2 Cells and Identification of Immune, Skin, and Neuronal Target Cells," Veterinary Immunology and Immunopathy, 157:42-48 (2014).
Medina-Cucurella et al., "Feline Interleukin-31 Shares Overlapping Epitopes with the Oncostatin M Receptor and IL-31RA," Biochemistry, vol. 59: 2171-2181, and S1-S10 (2020).
Meng, et al., "New mechanism underlying IL-31-induced atopic dermatitis," J Allergy Clin Immunol, 141:1677-89, 1689. e1-e8 (2018).
Menotti-Raymond et al., "Mutation in CEP290 Discovered for Cat Model of Human Retinal Degeneration," Journal of Heredity, vol. 98, No. 3: 211-220 (2007).
Merryman-Simpson et al., "Gene (mRNA) Expression in Canine Atopic Dermatitis: Microarray Analysis," Vet Dermatol, 2008, 19(2):59-66.
Metz et al., "Pruritus: an Overview of Current Concepts," Vet Dermatol, 22(2):121-31 (2011).
Michels et al., "A blinded, randomized, placebo-controlled trial of the safety of lokivetmab (ZTS-00103289), a caninized anti-canine IL-31 monoclonal antibody in client-owned dogs with atopic dermatitis," Vet Dermatol. vol. 27(6); pp. 505-e136 (Dec. 2016).
Minutes of the oral proceedings, EP Opposition EP12748547.2-EP 2734549, 4 pages (Mar. 31, 2022).
Mizuno et al., "Molecular Cloning of Canine Interleukin-31 and its Expression in Various Tissues," Veterinary Immunology and Immunopathology, 131:140-143 (2009).
Moyaert et al., "A Blinded, Randomized Clinical Trial Evaluating the Efficacy and Safety of Lokivetmab Compared to Ciclosporin in Client-Owned Dogs with Atopic Dermatitis," Vet Dermatol, 2017, 28(6):593-603 and e144-e145.

Nagaoka et al., "Single amino acid substitution in the mouse IgG1 Fc region induces drastic enhancement of the affinity to protein A," Protein Engineering, vol. 16, No. 4: 243-245 (2003).
Nakamura el al., "Prurilogenic mediators in psoriasis vulgaris: comparative evaluation of itch-associated cutaneous actors," British J of Dermatol, 149:718-730 (2003).
National Human Genome Research Institute (NHGRI), "Researchers Publish Dog Genome Sequence," 2 pages (2005).
Nattkemper et al., "Cutaneous T-cell Lymphoma and Pruritus: The Expression of IL-31 and its Receptors in the Skin," Acta Derm Venereal, 96:894-898 (2016).
Neis et al., "Enhanced Expression Levels of IL-31 Correlate with IL-4 and IL-13 in Atopic and Allergic Contact Dermatitis," J Allergy Clin Immunol, 118(4):930-937 (2006).
Niyonsaba et al., "Antimicrobial Peptides Human 13-Defensins and Cathelicidin LL-37 Induce the Secretion of a Pruritogenic Cytokine IL-31 by Human Mast Cells," J Immunol, 184:3526-3534 (2010).
Nobbe et al., "IL-31 Expression by Inflammatory Cells is Preferentially Elevated in Atopic Dermatitis," Acta Derm Venereal, 92:24-28, comment on same at 92:5-6 (2012).
Noli, Chiara, et al. "A double-blinded, randomized, methylprednisolone-controlled study on the efficacy of oclacitinib in the management of pruritus in cats with nonflea nonfood-induced hypersensitivity dermatitis" Veterinary Dermatology, vol. 30, pp. 440-e30, Apr. 2019.
Notice of Appeal, EP Opposition EP12748547.2-EP 2734549, 3 pages (Dec. 19, 2019).
Notice of Opposition 1, EP Opposition EP17168574.6-EP 3219729, 43 pages (Jun. 9, 2021).
Notice of Opposition 2, EP Opposition EP17168574.6-EP 3219729, 26 pages (Jun. 9, 2021).
Notice of Opposition 1, EP Opposition EP12748547.2-EP 2734549, 41 pages (Feb. 21, 2018).
Notice of Opposition 2, EP Opposition EP12748547.2-EP 2734549, 24 pages (Feb. 23, 2018).
Nuttall et al., "T-Helper 1, T-helper 2 and Immunosuppressive Cytokines in Canine Atopic Dermatitis," Veterinary Immunol Immunopathol, 2002, 87(3-4):379-384.
Nuttall et al., "Expression of Th1, Th2 and Immunosuppressive Cytokine Gene Transcripts in Canine Atopic Dermatitis," Clin Exp Allergy, 2002, 32(5):789-795.
O'Kennedy et al., "A Review of Enzyme-Immunoassay and a Description of a Competitive Enzyme-Linked Immunosorbent Assay for the Detection of Immunoglobulin Concentrations," Biochemical Education, 18(3):136-140 (1990).
Olivry et al., "Early Activation of Th2/Th22 Inflammatory and Pruritogenic Pathways in Acute Canine Atopic Dermatitis Skin Lesions," Journal of Investigative Dermatology, vol. 136: 1961-1969 (2016).
Olivry et al., "Interventions for Atopic Dermatitis in Dogs: A Systematic Review of Randomized Controlled Trials," Vet Dermatol, 21:4-22 (2010).
Olivry et al., "Toward a Canine Model of Atopic Dermatitis: Amplification of Cytokine-Gene Transcripts in the Skin of Atopic Dogs," Exp Dermatol, 1999, 8(3):204-211.
Olivry et al., "The ACVD Task Force on Canine Atopic Dermatitis: Forewords and Lexicon," Veterinary Immunology and Immunpathology, 2001, 81(3-4):143-146.
Olivry et al., "Treatment of Canine Atopic Dermatitis: 2010 Clinical Practice Guidelines from the International Task Force on Canine Atopic Dermatitis," Vet Dermatol, 2010, 21(3):233-248.
O'Shea et al., "A New Modality for Immunosuppression: Targeting the JAK/STAT Pathway," Nat Rev Drug Discov, 3 (7):555-564 (2004).
Passow et al., "Nonrandom RNAseq gene expression associated with RNAlater and flash freezing storage methods," Mol Ecol Resour., vol. 19(2): 456-464 (2019).
Pedersen et al., "Identification of Monoclonal Antibodies that Cross-React with Cytokines from Different Animal Species," Vet Immunol and Immunopath, 88:111-122 (2002).
Perrigoue et al., "IL-31-IL-31 R Interactions Limit the Magnitude of Th2 Cytokine-Dependent Immunity and Inflammation Following Intestinal Helminth Infection," J Immunol, 182(10):6088-6094 (2009).

(56) References Cited

OTHER PUBLICATIONS

Picco et al., "A Prospective Study on Canine Atopic Dermatitis and Food-Induced Allergic Dermatitis in Switzerland," Vet. Dermatol, 2008, 19(3):150-155.
Plager et al., "Gene transcription abnormalities in canine atopic dermatitis and related human eosinophilic allergic diseases," Vet Immunol Immunopathol., vol. 149(0): 136-142 (2012).
Pontius et al., "Initial sequence and comparative analysis of the cat genome," Genome Research, vol. 17: 1675-1689 (2007).
Post-published data from Zoetis for two anti-feline IL-31 antibodies (extracted from WO 2019/177697), submitted in Opposition in EP 3219729, 4 pages (submitted on Mar. 11, 2011).
Prelaud et al., "Reevaluation of Diagnostic Criteria of Canine Atopic Dermatitis," Revue de Medecine Veterinaire, 1998, 149:1057-1064, English abstract only.
Preliminary Opinion Board of Appeal, EP Opposition EP12748547.2-EP 2734549, 12 pages (Feb. 23, 2020).
Product Sheet, DH82, CRL-10389(TM), ATCC, 7 pages (2021).
Prost, C., "Feline atopic dermatitis: Clinical signs and diagnosis," EJCAP, vol. 19, No. 3: 223-229 (2009).
Pucheu-Haston et al., "A Canine Model of Cutaneous Late-Phase Reactions: Prednisolone Inhibition of Cellular and Cytokine Responses," Immunology, 117:177-187 (2005).
Raap et al., "Correlation of IL-31 Serum Levels with Severity of Atopic Dermatitis," J Allergy Clin Immunol, 122 (2):421-423 (2008).
Raap et al., "Increased Levels of Serum IL-31 in Chronic Spontaneous Urticaria," Exp. Dermatol., 2010, 19(5):464-466.
Radstrom et al., "Pre-PCR Processing: Strategies to Generate PCR-Compatible Samples," Molecular Biotechnology, vol. 26: 133-146 (2004).
Rawlings et al., The JAK/STAT Signaling Pathway, J Cell Science, 117:1281-1283 (2004).

\* cited by examiner

LC

```
M14   METDTLLLWVLLLWVPGSTGDIVLTQSPASLAVSLGQRATISCRAS          MHWY
M18   METDTLLLWVLLLWVPGSTGDIVLTQSPASLAVS GQRATISCRAS          IHWY
M19   METDTLLLWVLLLWVPGSTGDIVLTQSPASLAVSLGQRATISCRAS          MHWY
M87   METDTLLLWVLLLWVPGSTGDIVLTQSPASLAVSLGQRATIS RAS          MHWN
      *********************************  ******  ***  *  *  *  :**

M14   QQKSGQSPKLLIY    NLESGIPARFGGSGSRTDFTLTIDPVEADDVATYY
M18   QQKPGQSPKLLIY    NLESGIPARFSGSGSRTDFTLTINPVEDDDVATYY
M19   QQKPGQPPKLLIY    NLESGIPARFSGSGS TDFTLTINPVE  ATYY
M87   QQKPGQPPRLLIY    NLESG PARFSGSGS TDFTL IHPVE EDAATYY
      ***.**.*:****  .*****:****.****.*.*** :* ****** ;    * .

M14       GGGTKLEIKRADAAPTVSIFPPSSEQLTSGGASVVCFLNNFYPKDINVKWKIDGSERQ
M18       GGGTKLEIKRADAAPTVSIFPPSSEQLTSGGASVVCFLNNFYPKDINVKWKIDGSERQ
M19       GGGTKLEIKRADAAPTVSIFPPSSEQLTSGGASVVCFLNNFYPKDINVKWKIDGSERQ
M87       GGGTKLEIKRADAAPTVSIFPPSSEQLTSGGASVVCFLNNFYPKDINVKWKIDGSERQ
          :*********************************************************

M14   NGVLNSWTDQDSKDSTYSMSSTLTLTKDEYERHNSYTCEATHKTSTSPIVKSFNRNEC  (SEQ ID NO: 36)
M18   NGVLNSWTDQDSKDSTYSMSSTLTLTKDEYERHNSYTCEATHKTSTSPIVKSFNRNEC  (SEQ ID NO: 37)
M19   NGVLNSWTDQDSKDSTYSMSSTLTLTKDEYERHNSYTCEATHKTSTSPIVKSFNRNEC  (SEQ ID NO: 38)
M87   NGVLNSWTDQDSKDSTYSMSSTLTLTKDEYERHNSYTCEATHKTSTSPIVKSFNRNEC  (SEQ ID NO: 39)
      **********************************************************
```

```
M14_HC   MAVLGLLLCLVIFPSCVLSEVQLQESGPSLVKPSQTLSLTCSVT         WNWIRKFP
M19_HC   MAVLGLLFCLVIFPSCVLSEVQLQESGPSLVKPSQTLSLTCSVT         WNWIRKFP
M18_HC   MAVLGLLFCLVIFPSCVLSEVQLQESGPSLVKPSQTLSLTCSVT         WNWIRKFP
M87_HC   MAVLGLLFCLVIFPSCVLSEV L ESG  LV P   L L C         WNW R PP
         *******;************* *   .***. ;* *:*:.:* ::*. *  **:*; *

M14_HC   GNKLEYMGY      ---  TDYNPSLKSRISITRDTSKNQYYLQLNSVITEDTATYYC
M19_HC   GNKLEYMGY      ---  TDYNPSLKSRISITRDTSKNQYYLQLNSVITEDTATYYC
M18_HC   GN ELEYMGY     ---  T YNPSLKSR SITRDTSKNQYYLQLNSVITEDTATYYC
M87_HC   G ALEW GF             TEYS SVKGRFTISRDNS SI YLQ N TL AEDSATYYC
         *: **:;:*       ..     * *.*.*;:*:*.*:. ***;*:: ;**:*******

M14_HC                WGQGTSVTVSSAKTTPPSVYPLAPGS  (SEQ ID NO: 40)
M19_HC                WGQGTSVTVSSAKTTPPSVYPLAPGS  (SEQ ID NO: 41)
M18_HC                WGQGTSVTVSSAKTTPPSVYPLAPGS  (SEQ ID NO: 42)
M87_HC                WGQGTTLTVSSAKTTPPSVYPLAPGS  (SEQ ID NO: 43)
                . ** .;******;************
```

FIG 1B

1. Feline IL31-huFc-His6
2. Horse IL31-huFc-His6

1. pGEX_GST
2. pGEX_GST-IL31. P12-E21*(clone 24-7)
3. pGEX_GST-IL31. E21-G28*(clone 21-2)
4. pGEX_GST-IL31. R16-P24*(clone 22-5)

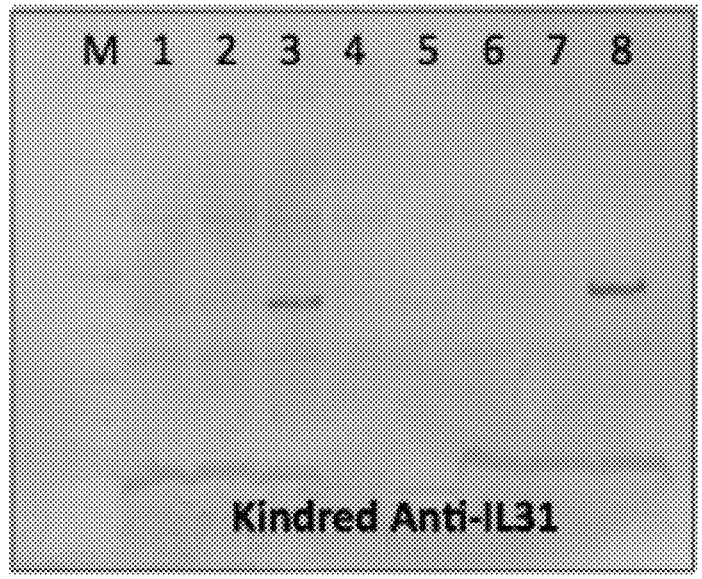
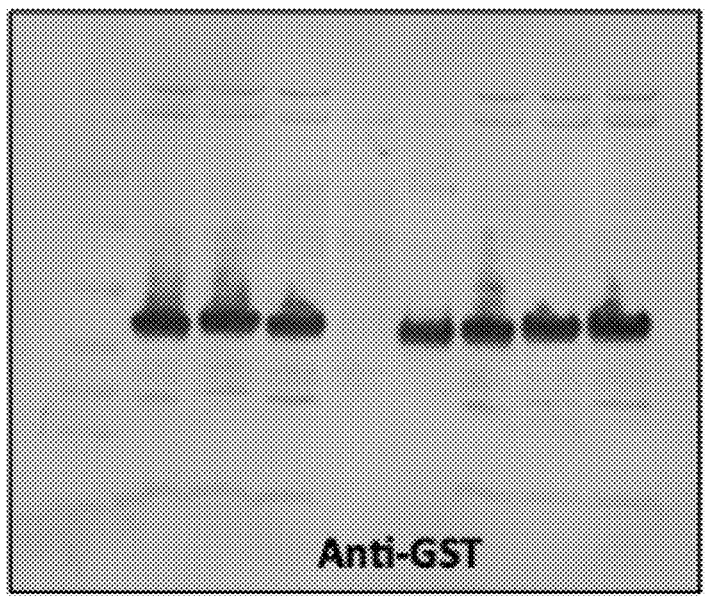
1. & 6. pGEX_GST-IL31. D14-L20* (Clone s 51.4 & 51.2)
2. & 7. pGEX_GST-IL31. P12-I18* (Clone s 52.1 & 52.8)
3. & 8. pGEX_GST-IL31. P12-E21*.R16A (Clone s 53.1 & 53.8)
4. Lysate No plasmid.  5. pGST
FIG 9

1. GST_IL31.P12-E21.D14A (#72.5)
2. GST_IL31.P12-E21.V15A (#73.4)
3. GST_IL31.P12-E21.K17A (#74.2)
4. GST_IL31.P12-E21 (#24.5)
5. GST
6. GST_IL31.P12-E21.V15A (#73.1)
7. GST_IL31.P12-E21.D14A (#72.7)

1. GST_IL31.P12-E21.P12A (#78.1)
2. GST_IL31.P12-E21.S13A (#80.3)
3. GST_IL31.P12-E21.I18A (#81.4)
4. GST_IL31.P12-E21.L20A (#77.3)
5. GST_IL31.P12-E21.I19A (#79.1)
6. GST
7. GST_IL31.P12-E21(#24.5)

1. GST
2. GST_IL31.P12-E21 (#24.5)
3. GST_IL31.P12-E21.P12A (#78.6)
4. GST_IL31.P12-E21.S13A (#80.8)
5. GST_IL31.P12-E21.I18A (#81.8)
6. GST_IL31.P12-E21.I19A (#79.7)
7. GST_IL31.P12-E21.L20A (#77.5)

ANTI-IL31 ANTIBODIES FOR VETERINARY USE

CROSS-REFERENCE TO RELATED APPLICATIONS

This application is a Divisional Application of U.S. application Ser. No. 16/488,045, filed 22 Aug. 2019, which is a National Stage Application of PCT/US2018/017623, filed 9 Feb. 2018, which claims the benefit of U.S. Provisional Application No. 62/463,543, filed 24 Feb. 2017, and claims the benefit of International Application No. PCT/US2017/023788, filed 23 Mar. 2017, the entire contents of each of which are incorporated herein by reference.

REFERENCE TO SEQUENCE LISTING SUBMITTED AS A COMPLIANT ASCII TEXT FILE (.xml)

A Sequence Listing is submitted herewith as an ASCII compliant text file named "2920951-451006_Sequence_Listing_ST26" created on 11 Dec. 2023 and having a size of 142,666 bytes as permitted under 37 C.F.R. § 1.821 (c). The material in the aforementioned file is hereby incorporated by reference in its entirety.

BACKGROUND OF THE INVENTION

Field

This invention relates to isolated anti-IL31 antibodies, for example, binding to canine IL31, and methods of using the same, for example, treating IL31-induced conditions or reducing IL31 signaling function in cells, for instance in companion animals, such as canines, felines, and equines.

Interleukin 31 (IL31) is a cytokine mostly produced by Th2 cells and understood to be involved in promoting skin disease, such as pruritic and other forms of allergic diseases (for example, atopic dermatitis). IL31 functions by binding its receptor and activating downstream activities, such as activation of JAK1, and is thought to cause many of the clinical problems associated with dermatitis and other disorders.

Companion animals such as cats, dogs, and horses, suffer from many skin diseases similar to human skin diseases, including atopic dermatitis. However, the IL31 sequence is divergent between human, cat, dog, and horse. There remains a need, therefore, for methods and compounds that can be used specifically to bind companion animal IL31 for treating IL31-induced conditions and for reducing IL31 signaling.

SUMMARY OF THE INVENTION

In some embodiments, an isolated antibody is provided that binds to canine IL31. In some embodiments the antibody binds to an epitope comprising amino acids 34-50 of SEQ ID NO: 22. In some embodiments, the antibody binds to an epitope comprising the amino acid sequence of SEQ ID NO: 23. In some embodiments the antibody binds to an epitope comprising the amino acid sequence of PSDX$_1$X$_2$KI (SEQ ID NO: 45), wherein X is any amino acid residue. In some embodiments, X$_1$ is a hydrophobic amino acid. In some embodiments, X$_1$ is selected from A, V, I, and L. In some embodiments, X$_1$ is selected from V and I. In some embodiments, X$_2$ is a hydrophilic amino acid. In some embodiments, X$_2$ is selected from A, R, K, Q, and N. In some embodiments, X$_2$ is selected from R and Q. In some embodiments, X$_1$ is V and X$_2$ is R. In some embodiments, X$_1$ is I and X$_2$ is Q. In some embodiments, the antibody binds to an epitope comprising the amino acid sequence of SEQ ID NO: 88.

In some embodiments, the antibody binds to canine IL31 with a dissociation constant (Kd) of less than $5\times10^{-6}$ M, less than $1\times10^{-6}$ M, less than $5\times10^{-7}$ M, less than $1\times10^{-7}$ M, less than $5\times10^{-8}$ M, less than $1\times10^{-8}$ M, less than $5\times10^{-9}$ M, less than $1\times10^{-9}$ M, less than $5\times10^{-10}$ M, less than $1\times10^{-10}$ M, less than $5\times10^{-11}$ M, less than $1\times10^{-11}$ M, less than $5\times10^{-12}$ M, or less than $1\times10^{-12}$ M, as measured by biolayer interferometry.

In some embodiments, the antibody reduces IL31 signaling function in a companion animal species, as measured by a reduction in STAT-3 phosphorylation. In some embodiments, the companion animal species is canine, feline, or equine.

In some embodiments, the antibody binds to feline IL31 or equine IL31, as determined by immunoblot analysis and/or biolayer interferometry. In some embodiments, the antibody competes with monoclonal M14 antibody in binding to canine IL31. In some embodiments, the antibody competes with monoclonal M14 antibody in binding to feline IL31. In some embodiments, the antibody does not bind to human IL31 as determined by immunoblot analysis and/or biolayer interferometry.

In some embodiments, the antibody is a monoclonal antibody. In some embodiments, the antibody is a canine, a caninized, a feline, a felinized, an equine, an equitized, or a chimeric antibody. In some embodiments, the antibody is a chimeric antibody comprising murine variable heavy chain framework regions or murine variable light chain framework regions.

In some embodiments, the antibody comprises a heavy chain and a light chain, wherein:
 a. the heavy chain comprises a CDR-H1 sequence having at least 85% sequence identity, at least 90% sequence identity, at least 95% sequence identity, or at least 98% sequence identity to the amino acid sequence of SEQ ID NO: 1; a CDR-H2 sequence having at least 85% sequence identity, at least 90% sequence identity, at least 95% sequence identity, or at least 98% sequence identity to the amino acid sequence of SEQ ID NO: 2, 62, 89, or 87; and a CDR-H3 sequence having at least 85% sequence identity, at least 90% sequence identity, at least 95% sequence identity, or at least 98% sequence identity to the amino acid sequence of SEQ ID NO: 3, and b. the light chain comprises a CDR-L1 sequence having at least 85% sequence identity, at least 90% sequence identity, at least 95% sequence identity, or at least 98% sequence identity to the amino acid sequence of SEQ ID NO: 8 or SEQ ID NO: 63; a CDR-L2 sequence having at least 85% sequence identity, at least 90% sequence identity, at least 95% sequence identity, or at least 98% sequence identity to the amino acid sequence of SEQ ID NO: 9; and a CDR-L3 sequence having at least 85% sequence identity, at least 90% sequence identity, at least 95% sequence identity, or at least 98% sequence identity to the amino acid sequence of SEQ ID NO: 10.

In some embodiments, the antibody comprises a heavy chain comprising (a) a CDR-H1 comprising the amino acid sequence of SEQ ID NO: 1, (b) a CDR-H2 comprising the amino acid sequence of SEQ ID NO: 2 or 89, and (c) a CDR-H3 comprising the amino acid sequence of SEQ ID NO: 3.

In some embodiments, the antibody comprises a heavy chain comprising (a) a CDR-H1 comprising the amino acid sequence of SEQ ID NO: 1, (b) a CDR-H2 comprising the amino acid sequence of SEQ ID NO: 62 or 87, and (c) a CDR-H3 comprising the amino acid sequence of SEQ ID NO: 3.

In some embodiments, the antibody comprises a light chain comprising (a) a CDR-L1 comprising the amino acid sequence of SEQ ID NO: 8, (b) a CDR-L2 comprising the amino acid sequence of SEQ ID NO: 9, and (c) a CDR-L3 comprising the amino acid sequence of SEQ ID NO: 10.

In some embodiments, the antibody comprises a light chain comprising (a) a CDR-L1 comprising the amino acid sequence of SEQ ID NO: 63, (b) a CDR-L2 comprising the amino acid sequence of SEQ ID NO: 9, and (c) a CDR-L3 comprising the amino acid sequence of SEQ ID NO: 10.

In some embodiments, the antibody comprises one or more of (a) a variable region heavy chain framework 1 (HC-FR1) sequence of SEQ ID NO: 4, 70, or 79, (b) a HC-FR2 sequence of SEQ ID NO: 5, 71, or 80, (c) a HC-FR3 sequence of SEQ ID NO: 6, 72, 73, or 81, (d) a HC-FR4 sequence of SEQ ID NO: 7, 74, or 82, (e) a variable region light chain framework 1 (LC-FR1) sequence of SEQ ID NO: 11, 75, or 83, (f) an LC-FR2 sequence of SEQ ID NO: 12, 76, or 84, (g) an LC-FR3 sequence of SEQ ID NO: 13, 77, or 85, or (h) an LC-FR4 sequence of SEQ ID NO: 14, 78, or 86.

In some embodiments, the antibody comprises:
a. (i) a variable light chain sequence having at least 85%, at least 90%, at least 95%, or at least 98% sequence identity to the amino acid sequence of SEQ ID NO: 24; (ii) a variable heavy chain sequence having at least 85%, at least 90%, at least 95%, or at least 98% sequence identity to the amino acid sequence of SEQ ID NO: 25; or (iii) a variable light chain sequence as in (i) and a variable heavy chain sequence as in (ii); or
b. (i) a variable light chain sequence having at least 85%, at least 90%, at least 95%, or at least 98% sequence identity to the amino acid sequence of SEQ ID NO: 16; (ii) a variable heavy chain sequence having at least 85%, at least 90%, at least 95%, or at least 98% sequence identity to the amino acid sequence of SEQ ID NO: 15; or (iii) a variable light chain sequence as in (i) and a variable heavy chain sequence as in (ii); or
c. (i) a variable light chain sequence having at least 85%, at least 90%, at least 95%, or at least 98% sequence identity to the amino acid sequence of SEQ ID NO: 32; (ii) a variable heavy chain sequence having at least 85%, at least 90%, at least 95%, or at least 98% sequence identity to the amino acid sequence of SEQ ID NO: 33; or (iii) a variable light chain sequence as in (i) and a variable heavy chain sequence as in (ii).

In some embodiments, the antibody comprises a variable light chain sequence of SEQ ID NO: 24; SEQ ID NO: 16; or SEQ ID NO: 32. In some embodiments, the antibody comprises a variable heavy chain sequence SEQ ID NO: 25; SEQ ID NO: 15; or SEQ ID NO: 33. In some embodiments, the antibody comprises: a variable light chain sequence of SEQ ID NO: 24 and a variable heavy chain sequence of SEQ ID NO: 25; a variable light chain sequence of SEQ ID NO: 16 and a variable heavy chain sequence of SEQ ID NO: 15; or a variable light chain sequence of SEQ ID NO: 32 and a variable heavy chain sequence of SEQ ID NO: 33.

In some embodiments, the antibody is a chimeric antibody comprising a constant heavy chain region or constant light chain region derived from a companion animal.

In some embodiments, the antibody comprises (a) a canine heavy chain constant region selected from an IgG-A, IgG-B, IgG-C, and IgG-D constant region; (b) a feline heavy chain constant region selected from an IgG1, IgG2a, and IgG2b constant region; or (c) an equine heavy chain constant region selected from an IgG1, IgG2, IgG3, IgG4, IgG5, IgG6 and IgG7 constant region.

In some embodiments, the antibody comprises:
a. (i) a light chain amino acid sequence of SEQ ID NO: 26; (ii) a heavy chain amino acid sequence of SEQ ID NO: 27; or (iii) a light chain amino acid sequence as in (i) and a heavy chain amino acid sequence as in (ii); or
b. (i) a light chain amino acid sequence of SEQ ID NO: 30; (ii) a heavy chain amino acid sequence of SEQ ID NO: 31; or (iii) a light chain amino acid sequence as in (i) and a heavy chain amino acid sequence as in (ii); or
c. (i) a light chain amino acid sequence of SEQ ID NO: 34; (ii) a heavy chain amino acid sequence of SEQ ID NO: 35, or (iii) a light chain amino acid sequence as in (i) and a heavy chain amino acid sequence as in (ii).

In some embodiments, the antibody comprises a light chain amino acid sequence of SEQ ID NO: 21. In some embodiments, the antibody comprises a heavy chain amino acid sequence of SEQ ID NO: 17; SEQ ID NO: 18; SEQ ID NO: 19; or SEQ ID NO: 20.

In some embodiments, the antibody is an antibody fragment selected from Fv, scFv, Fab, Fab', F(ab')2, and Fab'-SH.

In some embodiments, the antibody is bi-specific, wherein the antibody binds to IL31 and one or more antigens selected from IL17, TNFα, CD20, CD19, CD25, IL4, IL13, IL23, IgE, CD11α, IL6R, α4-Intergrin, IL12, IL1β, or BlyS.

In some embodiments, an isolated nucleic acid is provided, which encodes an anti-IL31 antibody described herein above. In some embodiments, a host cell is provided, which comprises a nucleic acid encoding an anti-IL31 antibody described herein above. In some embodiments, a method of producing an anti-IL31 antibody is provided, which comprises culturing such a host cell comprising a nucleic acid encoding an anti-IL31 antibody described herein above and isolating the antibody.

In some embodiments, a pharmaceutical composition is provided, which comprises an anti-IL31 antibody described herein and a pharmaceutically acceptable carrier. In some embodiments, a pharmaceutical composition is provided, which comprises an anti-IL31 antibody described herein and a pharmaceutically acceptable carrier, wherein the pharmaceutically acceptable carrier comprises L-histidine, sodium chloride, and polysorbate 80.

In some embodiments, the pharmaceutical composition has a pH of from 5.0 to 6.2. In some embodiments, the pharmaceutical composition has a pH of from 5.0 to 6.0, or from 5.3 to 5.7, or 5.5.

In some embodiments, the pharmaceutical composition has an L-histidine concentration of from 5 mM to 100 mM, from 10 mM to 50 mM, from 20 mM to 30 mM, from 10 to 30 mM, or 20 mM.

In some embodiments, the pharmaceutical composition has a sodium chloride concentration of from 80 to 200 mM, from 100 to 175 mM, from 120 to 150 mM, or 140 mM.

In some embodiments, the pharmaceutical composition has a polysorbate 80 concentration of from 0.005 mg/mL to 0.5 mg/mL, from 0.01 mg/mL to 0.1 mg/mL, or 0.05 mg/mL.

In some embodiments, the pharmaceutically acceptable carrier comprises at least one sugar. In some embodiments, the pharmaceutical composition has a concentration of at least one sugar of from 0.5% to 20%, from 1% to 10%, from 1% to 5%, or from 1% to 3%. In some embodiments, the pharmaceutically acceptable carrier comprises sucrose, trehalose, D-mannitol, maltose, and/or sorbitol.

In some embodiments, the pharmaceutically acceptable carrier comprises an anti-bacterial agent. In some embodiments, the pharmaceutical composition comprises m-cresol or methylparaben. In some embodiments, the pharmaceutical composition comprises 0.2% m-cresol and/or 0.9% methylparaben.

Uses of Antibodies and Pharmaceutical Compositions

In some embodiments, methods of treating a companion animal species having an IL31-induced condition are provided, comprising administering to the companion animal species a therapeutically effective amount of an anti-1131 antibody described herein or a pharmaceutical composition comprising the antibody described herein. In some embodiments, the companion animal species is canine, feline, or equine. In some embodiments, the IL31-induced condition is a pruritic or allergic condition. In some embodiments, the IL31-induced condition is selected from atopic dermatitis, pruritus, asthma, psoriasis, scleroderma and eczema.

In some embodiments, the anti-IL31 antibody or the pharmaceutical composition is administered parenterally. In some embodiments, the anti-IL31 antibody or the pharmaceutical composition is administered by an intramuscular route, an intraperitoneal route, an intracerebrospinal route, a subcutaneous route, an intra-arterial route, an intrasynovial route, an intrathecal route, or an inhalation route.

In some embodiments, the method comprises administering in combination with the anti-IL31 antibody or the pharmaceutical composition a Jak inhibitor, a PI3K inhibitor, an AKT inhibitor, or a MAPK inhibitor. In some embodiments, the method comprises administering in combination with the anti-IL31 antibody or the pharmaceutical composition one or more antibodies selected from an anti-IL17 antibody, an anti-TNFα antibody, an anti-CD20 antibody, an anti-CD19 antibody, an anti-CD25 antibody, an anti-IL4 antibody, an anti-IL13 antibody, an anti-IL23 antibody, an anti-IgE antibody, an anti-CD11α antibody, anti-IL6R antibody, anti-α4-Intergrin antibody, an anti-IL12 antibody, an anti-IL1β antibody, and an anti-BlyS antibody.

In some embodiments, methods of reducing IL31 signaling function in a cell are provided, comprising exposing to the cell an anti-IL31 antibody the pharmaceutical composition described herein under conditions permissive for binding of the antibody to extracellular IL31, thereby reducing binding to IL31 receptor and/or reducing IL31 signaling function by the cell. In some embodiments, the cell is exposed to the antibody or the pharmaceutical composition ex vivo. In some embodiments, the cell is exposed to the antibody or the pharmaceutical composition in vivo. In some embodiments, the cell is a canine cell, a feline cell, or an equine cell.

In some embodiments, a method for detecting IL31 in a sample from a companion animal species are provided, comprising contacting the sample with an anti-IL31 antibody or the pharmaceutical composition described herein under conditions permissive for binding of the antibody to IL31, and detecting whether a complex is formed between the antibody and IL31 in the sample. In some embodiments, the sample is a biological sample obtained from a canine, a feline, or an equine.

BRIEF DESCRIPTION OF THE DRAWINGS

FIG. 1A is an alignment of variable light sequences of M14, M18, M19, and M87 mouse monoclonal antibody clones. FIG. 1B is an alignment of variable heavy sequences of M14, M18, M19, and M87 mouse monoclonal antibody clones.

FIG. 9 shows immunoblot analysis of fine epitope mapping and alanine scanning of mature canine IL31 epitope using anti-canine IL31 antibody (top panel) and anti-GST antibody (bottom panel).

DESCRIPTION OF CERTAIN SEQUENCES

Figure 2A:
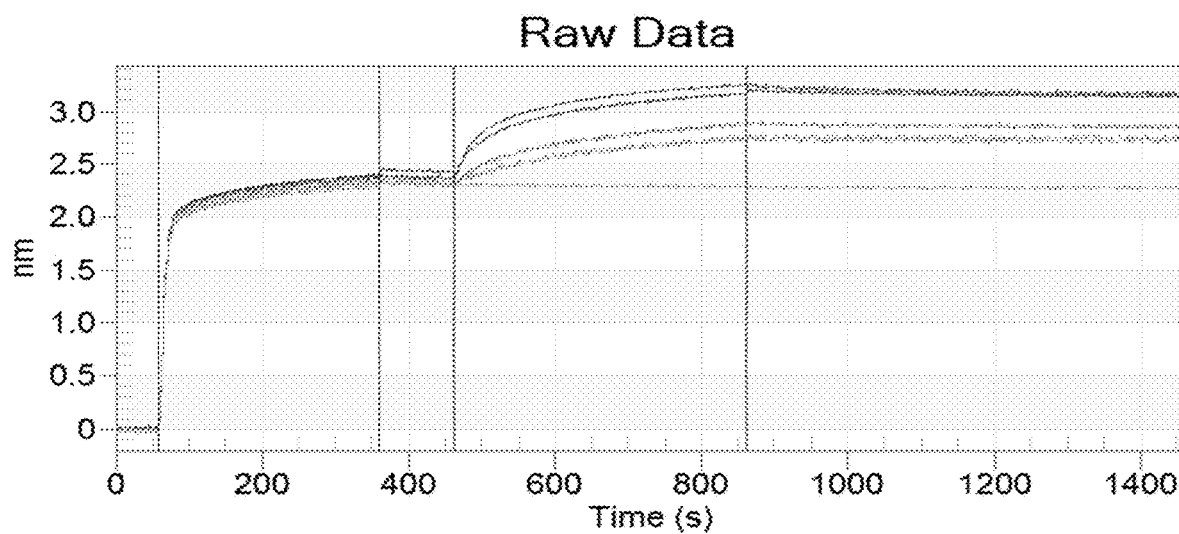
FIG. 2A and FIG. 2B are graphs of canine IL31 binding analysis with varying concentrations of chimeric M14 antibody.

Table 1 provides a listing of certain sequences referenced herein.

TABLE 1

Description of Certain Sequences

| SEQ ID NO: | SEQUENCE | DESCRIPTION |
|---|---|---|
| 1 | GDSITSGYW | Variable heavy chain CDR-H1 amino acid sequence of mouse antibody clones M14, M18, and M19 |

TABLE 1-continued

Description of Certain Sequences

| SEQ ID NO: | SEQUENCE | DESCRIPTION |
|---|---|---|
| 2 | YISYSGITDYNPSLKS | Variable heavy chain CDR-H2 amino acid sequence of mouse antibody clones M14 and M19 |
| 62 | YISYSGITYYNPSLKS | Variable heavy chain CDR-H2 amino acid sequence of mouse antibody clone M18 |
| 89 | YISYSGITDY | Alternate variable heavy chain CDR-H2 amino acid sequence of mouse antibody clones M14 and M19 |
| 87 | YISYSGITYY | Alternate variable heavy chain CDR-H2 amino acid sequence of mouse antibody clone M18 |
| 3 | ARYGNYGYAMDY | Variable heavy chain CDR-H3 amino acid sequence of mouse antibody clones M14, M18, and M19 |
| 4 | EVQLQESGPSLVKPSQTLSLTCSVT | Variable region heavy chain framework HC-FR1 amino acid sequence of mouse antibody clone M14 |
| 5 | NWIRKFPGNKLEYMG | Variable region heavy chain framework HC-FR2 amino acid sequence of mouse antibody clone M14 |
| 6 | RISITRDTSKNQYYLQLNSVTTEDTATYYC | Variable region heavy chain framework HC-FR3 amino acid sequence of mouse antibody clone M14 |
| 7 | WGQGTSVTVSS | Variable region heavy chain framework HC-FR4 amino acid sequence of mouse antibody clone M14 |
| 8 | RASESVDTYGNSFMH | Variable light chain CDR-L1 amino acid sequence of mouse antibody clones M14 and M19 |
| 63 | RASESVDTYGNSFIH | Variable light chain CDR-L1 amino acid sequence of mouse antibody clone M18 |
| 9 | RASNLES | Variable light chain CDR-L2 amino acid sequence of mouse antibody clones M14, M18, and M19 |
| 10 | QQSYEDPWT | Variable light chain CDR-L3 amino acid sequence of mouse antibody clones M14, M18, and M19 |
| 11 | DIVLTQSPASLAVSLGQRATISC | Variable region light chain framework LC-FR1 amino acid sequence of mouse antibody clone M14 |
| 12 | WYQQKSGQSPKLLIY | Variable region light chain framework LC-FR2 amino acid sequence of mouse antibody clone M14 |
| 13 | GIPARFGGSGSRTDFTLTIDPVEADDVATYYC | Variable region light chain framework LC-FR3 amino acid sequence of mouse antibody clone M14 |

TABLE 1-continued

Description of Certain Sequences

| SEQ ID NO: | SEQUENCE | DESCRIPTION |
| --- | --- | --- |
| 14 | FGGGTKLEIK | Variable region light chain framework LC-FR4 amino acid sequence of mouse antibody clone M14 |
| 15 | EVQLVESGPSLVKPGGSLRLTCSVTGDSITSGYWNWI RKFPGNKLEYMGYISYSGITDYNPSLKSRITISRDTS KNQYYLQLNSVTTEDTATYYCARYGNYGYAMDYWGQG TLVTVSS | Caninized variable heavy chain amino acid sequence of mouse antibody clone M14 |
| 16 | DIVMTQSPASLSVSLGQRATISCRASESVDTYGNSFM HWYQQKPGQSPKLLIYRASNLESGIPARFGGSGSGTD FTLTIDPVQADDVATYYCQQSYEDPWTFGGGTKLEIK | Caninized variable light chain amino acid sequence of mouse antibody clone M14 |
| 70 | EVQLVESGPSLVKPGGSLRLTCSVT | Caninized M14 HC-FR1 |
| 71 | NWIRKFPGNKLEYMG | Caninized M14 HC-FR2 |
| 72 | RITISRDTSKNQYYLQLNSVTTEDTATYYC | Caninized M14 HC-FR3 |
| 73 | NPSLKSRITISRDTSKNQYYLQLNSVITEDTATYYC | Alternate caninized M14 HC-FR3 |
| 74 | WGQGTLVTVSS | Caninized M14 HC-FR4 |
| 75 | DIVMTQSPASLSVSLGQRATISC | Caninized M14 LC-FR1 |
| 76 | WYQQKPGQSPKLLIY | Caninized M14 LC-FR2 |
| 77 | GIPARFGGSGSGTDFTLTIDPVQADDVATYYC | Caninized M14 LC-FR3 |
| 78 | FGGGTKLEIK | Caninized M14 LC-FR4 |
| 17 | EVQLVESGPSLVKPGGSLRLTCSVTGDSITSGYWNWI RKFPGNKLEYMGYISYSGITDYNPSLKSRITISRDTS KNQYYLQLNSVTTEDTATYYCARYGNYGYAMDYWGQG TLVTVSSASTTAPSVFPLAPSCGSTSGSTVALACLVS GYFPEPVTVSWNSGSLTSGVHTFPSVLQSSGLHSLSS MVTVPSSRWPSETFTCNVVHPASNTKVDKPVFNECRC TDTPCPVPEPLGGPSVLIFPPKPKDILRITRIPEVIC VVLDLGREDPEVQISWFVDGKEVHTAKTQSREQQFNG TYRVVSVLPIEHQDWLTGKEFKCRVNHIDLPSPIERT ISKARGRAHKPSVYVLPPSPKELSSSDTVSITCLIKD FYPPDIDVEWQSNGQQEPERKHRMTPPQLDEDGSYFL YSKLSVDKSRWQQGDPFTCAVMHETLQNHYTDLSLSH SPGK | Caninized heavy chain sequence from mouse antibody clone M14 and canine IgG-A |
| 18 | EVQLVESGPSLVKPGGSLRLTCSVTGDSITSGYWNWI RKFPGNKLEYMGYISYSGITDYNPSLKSRITISRDTS KNQYYLQLNSVTTEDTATYYCARYGNYGYAMDYWGQG TLVTVSSASTTAPSVFPLAPSCGSTSGSTVALACLVS GYFPEPVTVSWNSGSLTSGVHTFPSVLQSSGLYSLSS MVTVPSSRWPSETFTCNVAHPASKTKVDKPVPKRENG RVPRPPDCPKCPAPEMLGGPSVFIFPPKPKDTLLIAR TPEVTCVVVDLDPEDPEVQISWFVDGKQMQTAKTQPR EEQFNGTYRVVSVLPIGHQDWLKGKQFTCKVNNKALP SPIERTISKARGQAHQPSVYVLPPSREELSKNTVSLT CLIKDFFPPDIDVEWQSNGQQEPESKYRTTPPQLDED GSYFLYSKLSVDKSRWQRGDTFICAVMHEALHNHYTQ ESLSHSPGK | Caninized heavy chain sequence from mouse antibody clone M14 and canine IgG-B |
| 19 | EVQLVESGPSLVKPGGSLRLTCSVTGDSITSGYWNWI RKFPGNKLEYMGYISYSGITDYNPSLKSRITISRDTS KNQYYLQLNSVTTEDTATYYCARYGNYGYAMDYWGQG TLVTVSSASTTAPSVFPLAPSCGSQSGSTVALACLVS GYIPEPVTVSWNSVSLTSGVHTFPSVLQSSGLYSLSS MVTVPSSRWPSETFTCNVAHPATNTKVDKPVAKECEC KCNCNNCPCPGCGLLGGPSVFIFPPKPKDILVTARTP TVTCVVVDLDPENPEVQISWFVDSKQVQTANTQPREE QSNGTYRVVSVLPIGHQDWLSGKQFKCKVNNKALPSP IEEIISKTPGQAHQPNVYVLPPSRDEMSKNIVTLICL VKDFFPPEIDVEWQSNGQQEPESKYRMTPPQLDEDGS YFLYSKLSVDKSRWQRGDTFICAVMHEALHNHYTQIS LSHSPGK | Caninized heavy chain sequence from mouse antibody clone M14 and canine IgG-C |

TABLE 1-continued

Description of Certain Sequences

| SEQ ID NO: | SEQUENCE | DESCRIPTION |
|---|---|---|
| 20 | EVQLVESGPSLVKPGGSLRLTCSVTGDSITSGYWNWI RKFPGNKLEYMGYISYSGITDYNPSLKSRITISRDTS KNQYYLQLNSVTTEDTATYYCARYGNYGYAMDYWGQG TLVTVSSASTTAPSVFPLAPSCGSTSGSTVALACLVS GYFPEPVTVSWNSGSLTSGVHTFPSVLQSSGLYSLSS TVTVPSSRWPSETFTCNVVHPASNTKVDKPVPKESTC KCISPCPVPESLGGPSVFIFPPKPKDILRITRIPEIT CVVLDLGREDPEVQISWFVDGKEVHTAKTQPREQQFN STYRVVSVLPIEHQDWLTGKEFKCRVNHIGLPSPIER TISKARGQAHQPSVYVLPPSPKELSSSDTVTLICLIK DFFPPEIDVEWQSNGQPEPESKYHTTAPQLDEDGSYF LYSKLSVDKSRWQQGDTFTCAVMHEALQNHYTDLSLS HSPGK | Caninized heavy chain sequence from mouse antibody clone M14 and canine IgG-D |
| 21 | DIVMTQSPASLSVSLGQRATISCRASESVDTYGNSFM HWYQQKPGQSPKLLIYRASNLESGIPARFGGSGSGTD FTLTIDPVQADDVATYYCQQSYEDPWTFGGGTKLEIK RNDAQPAVYLFQPSPDQLHTGSASVVCLLNSFYPKDI NVKWKVDGVIQDTGIQESVTEQDKDSTYSLSSTLTMS STEYLSHELYSCEITHKSLPSTLIKSFQRSECQRVD | Caninized light chain sequence from mouse antibody clone M14 and canine light chain constant region |
| 22 | MLSHTGPSRFALFLLCSMETLLSSHMAPTHQLPPSDV RKIILELQPLSRGLLEDYQKKETGVPESNRILLLCLT SDSQPPRLNSSAILPYFRAIRPLSDKNIIDKIIEQLD KLKFQHEPETEISVPADTFECKSFILTILQQFSACLE SVFKSLNSGPQ | Canine IL31 amino acid sequence |
| 23 | PSDVRKIILELQPLSRG | Canine IL31 epitope |
| 24 | DIVLTQSPASLAVSLGQRATISCRASESVDTYGNSFM HWYQQKSGQSPKLLIYRASNLESGIPARFGGSGSRTD FTLTIDPVEADDVATYYCQQSYEDPWTFGGGTKLEIK | Variable light chain amino acid sequence of mouse antibody clone M14 |
| 25 | EVQLQESGPSLVKPSQTLSLTCSVTGDSITSGYWNWI RKFPGNKLEYMGYISYSGITDYNPSLKSRISITRDTS KNQYYLQLNSVTTEDTATYYCARYGNYGYAMDYWGQG TSVTVSS | Variable heavy chain amino acid sequence of mouse antibody clone M14 |
| 26 | DIVLTQSPASLAVSLGQRATISCRASESVDTYGNSFM HWYQQKSGQSPKLLIYRASNLESGIPARFGGSGSRTD FTLTIDPVEADDVATYYCQQSYEDPWTFGGGTKLEIK RNDAQPAVYLFQPSPDQLHTGSASVVCLLNSFYPKDI NVKWKVDGVIQDTGIQESVTEQDKDSTYSLSSTLTMS STEYLSHELYSCEITHKSLPSTLIKSFQRSECQRVD | Chimeric variable light chain of mouse antibody clone M14 and canine light chain constant region |
| 27 | EVQLQESGPSLVKPSQTLSLTCSVTGDSITSGYWNWI RKFPGNKLEYMGYISYSGITDYNPSLKSRISITRDTS KNQYYLQLNSVTTEDTATYYCARYGNYGYAMDYWGQG TSVTVSSASTTAPSVFPLAPSCGSTSGSTVALACLVS GYFPEPVTVSWNSGSLTSGVHTFPSVLQSSGLYSLSS MVTVPSSRWPSETFTCNVAHPASKTKVDKPVPKRENG RVPRPPDCPKCPAPEMLGGPSVFIFPPKPKDTLLIAR TPEVTCVVVDLDPEDPEVQISWFVDGKQMQTAKTQPR EEQFNGTYRVVSVLPIGHQDWLKGKQFTCKVNNKALP SPIERTISKARGQAHQPSVYVLPPSREELSKNTVSLT CLIKDFFPPDIDVEWQSNGQQEPESKYRTTPPQLDED GSYFLYSKLSVDKSRWQRGDTFICAVMHEALHNHYTQ ESLSHSPGK | Chimeric variable heavy chain of mouse antibody clone M14 and canine IgG-B |
| 28 | MLSHAGPARFALFLLCCMETLLPSHMAPAHRLQPSDV RKIILELRPMSKGLLQDYLKKEIGLPESNHSSLPCLS SDSQLPHINGSAILPYFRAIRPLSDKNTIDKIIEQLD KLKFQREPEAKVSMPADNFERKNFILAVLQQFSACLE HVLQSLNSGPQ | Feline IL31 amino acid sequence NCBI ref: XP_011286140.1 [felis catus] |
| 29 | MVSHIGSTRFALFLLCCLGTLMFSHTGPIYQLQPKEI QAIIVELQNLSKKLLDDYLNKEKGVQKFDSDLPSCFT SDSQAPGNINSSAILPYFKAISPSLNNDKSLYIIEQL DKLNFQNAPETEVSMPTDNFERKRFILTILRWFSNCL ELAMKTLTTAEQALPPLDPSTPHAGAVALTHHQQDRT ALDRAVFPFVWAAPRGGEVGDGGH | Equine IL31 amino acid sequence |
| 30 | DIVLTQSPASLAVSLGQRATISCRASESVDTYGNSFM HWYQQKSGQSPKLLIYRASNLESGIPARFGGSGSRTD | Chimeric variable light chain of mouse antibody clone M14 |

TABLE 1-continued

Description of Certain Sequences

| SEQ ID NO: | SEQUENCE | DESCRIPTION |
|---|---|---|
|  | FTLTIDPVEADDVATYYCQQSYEDPWTFGGGTKLEIK<br>RSDAQPSVFLFQPSLDELHTGSASIVCILNDFYPKEV<br>NVKWKVDGVVQNKGIQESTTEQNSKDSTYSLSSTLTM<br>SSTEYQSHEKFSCEVTHKSLASTLVKSFNRSECQRE | and feline light chain constant region |
| 31 | EVQLQESGPSLVKPSQTLSLTCSVTGDSITSGYWNWI<br>RKFPGNKLEYMGYISYSGITDYNPSLKSRISITRDTS<br>KNQYYLQLNSVTTEDTATYYCARYGNYGYAMDYWGQG<br>TSVTVSSASTTAPSVFPLAPSCGTTSGATVALACLVL<br>GYFPEPVTVSWNSGALTSGVHTFPAVLQASGLYSLSS<br>MVTVPSSRWLSDTFTCNVAHPPSNTKVDKTVRKTDHP<br>PGPKPCDCPKCPPPEMLGGPSIFIFPPKPKDTLSISR<br>TPEVICLVVDLGPDDSDVQITWFVDNIQVYTAKTSPR<br>EEQFNSTYRVVSVLPILHQDWLKGKEFKCKVNSKSLP<br>SPIERTISKAKGQPHEPQVYVLPPAQEELSRNKVSVT<br>CLIKSFHPPDIAVEWEITGQPEPENNYRTTPPQLDSD<br>GTYFVYSKLSVDRSHWQRGNTYTCSVSHEALHSHHTQ<br>KSLTQSPGK | Chimeric variable heavy chain of mouse antibody clone M14 and feline heavy chain constant region |
| 32 | EIQMTQSPSSLSASPGDRVTISCRASESVDTYGNSFM<br>HWYQQKPGQSPKLLIYRASNLESGVPSRFSGSGSGTD<br>FTLTISSLEPEDAATYYCQQSYEDPWTFGGGTKLEIK | Felinized variable light chain sequence from mouse antibody clone M14 |
| 33 | DVQLVESGGDLVKPGGSLRLTCSVTGDSITSGYWNWV<br>RQAPGKGLQWVAYISYSGITDYADSVKGRFTISRDNA<br>KNTLYLQLNNLKAEDTATYYCARYGNYGYAMDYWGQG<br>TLVTVSS | Felinized variable heavy chain sequence from mouse antibody clone M14 |
| 79 | DVQLVESGGDLVKPGGSLRLTCSVT | Felinized M14 HC-FR1 |
| 80 | NWVRQAPGKGLQWVA | Felinized M14 HC-FR2 |
| 81 | ADSVKGRFTISRDNAKNTLYLQLNNLKAEDTATYYCA | Felinized M14 HC-FR3 |
| 82 | WGQGTLVTVSS | Felinized M14 HC-FR4 |
| 83 | EIQMTQSPSSLSASPGDRVTISC | Felinized M14 LC-FR1 |
| 84 | WYQQKPGQSPKLLIY | Felinized M14 LC-FR2 |
| 85 | GVPSRFSGSGSGTDFTLTISSLEPEDAATYYC | Felinized M14 LC-FR3 |
| 86 | FGGGTKLEIK | Felinized M14 LC-FR4 |
| 34 | EIQMTQSPSSLSASPGDRVTISCRASESVDTYGNSFM<br>HWYQQKPGQSPKLLIYRASNLESGVPSRFSGSGSGTD<br>FTLTISSLEPEDAATYYCQQSYEDPWTFGGGTKLEIK<br>RSDAQPSVFLFQPSLDELHTGSASIVCILNDFYPKEV<br>NVKWKVDGVVQNKGIQESTTEQNSKDSTYSLSSTLTM<br>SSTEYQSHEKFSCEVTHKSLASTLVKSFNRSECQRE | Felinized light chain sequence from mouse antibody clone M14 |
| 35 | DVQLVESGGDLVKPGGSLRLTCSVTGDSITSGYWNWV<br>RQAPGKGLQWVAYISYSGITDYADSVKGRFTISRDNA<br>KNTLYLQLNNLKAEDTATYYCARYGNYGYAMDYWGQG<br>TLVTVSSASTTAPSVFPLAPSCGTTSGATVALACLVL<br>GYFPEPVTVSWNSGALTSGVHTFPAVLQASGLYSLSS<br>MVTVPSSRWLSDTFTCNVAHPPSNTKVDKTVRKTDHP<br>PGPKPCDCPKCPPPEMLGGPSIFIFPPKPKDTLSISR<br>TPEVICLVVDLGPDDSDVQITWFVDNIQVYTAKTSPR<br>EEQFNSTYRVVSVLPILHQDWLKGKEFKCKVNSKSLP<br>SPIERTISKAKGQPHEPQVYVLPPAQEELSRNKVSVT<br>CLIKSFHPPDIAVEWEITGQPEPENNYRTTPPQLDSD<br>GTYFVYSKLSVDRSHWQRGNTYTCSVSHEALHSHHTQ<br>KSLTQSPGK | Felinized heavy chain sequence from mouse antibody clone M14 |
| 36 | METDTLLLWVLLLWVPGSTGDIVLTQSPASLAVSLGQ<br>RATISCRASESVDTYGNSFMHWYQQKSGQSPKLLIYR<br>ASNLESGIPARFGGSGSRTDFTLTIDPVEADDVATYY<br>CQQSYEDPWTFGGGTKLEIKRADAAPTVSIFPPSSEQ<br>LTSGGASVVCFLNNFYPKDINVKWKIDGSERQNGVLN<br>SWTDQDSKDSTYSMSSTLTLIKDEYERHNSYTCEATH<br>KTSTSPIVKSFNRNEC | Light chain amino acid sequence of mouse antibody clone M14 |

TABLE 1-continued

Description of Certain Sequences

| SEQ ID NO: | SEQUENCE | DESCRIPTION |
|---|---|---|
| 37 | METDTLLLWVLLLWVPGSTGDIVLTQSPASLAVSPGQ RATISCRASESVDTYGNSFIHWYQQKPGQSPKLLIYR ASNLESGIPARFSGSGSRTDFTLTINPVETDDVATYY CQQSYEDPWTFGGGTKLEIKRADAAPTVSIFPPSSEQ LTSGGASVVCFLNNFYPKDINVKWKIDGSERQNGVLN SWTDQDSKDSTYSMSSTLTLIKDEYERHNSYTCEATH KTSTSPIVKSFNRNEC | Light chain amino acid sequence of mouse antibody clone M18 |
| 38 | METDTLLLWVLLLWVPGSTGDIVLTQSPASLAVSLGQ RATISCRASESVDTYGNSFMHWYQQKPGQPPKLLIYR ASNLESGIPARFSGSGSRTDFTLTINPVEADDIATYY CQQSYEDPWTFGGGTKLEIKRADAAPTVSIFPPSSEQ LTSGGASVVCFLNNFYPKDINVKWKIDGSERQNGVLN SWTDQDSKDSTYSMSSTLTLIKDEYERHNSYTCEATH KTSTSPIVKSFNRNEC | Light chain amino acid sequence of mouse antibody clone M19 |
| 39 | METDTLLLWVLLLWVPGSTGDIVLTQSPASLAVSLGQ RATISYRASKSVSTSGYSYMHWNQQKPGQPPRLLIYL VSNLESGVPARFSGSGSGTDFTLNIHPVEEEDAATYY CQHIRELTRSFGGGTKLEIKRADAAPTVSIFPPSSEQ LTSGGASVVCFLNNFYPKDINVKWKIDGSERQNGVLN SWTDQDSKDSTYSMSSTLTLIKDEYERHNSYTCEATH KTSTSPIVKSFNRNEC | Light chain amino acid sequence of mouse antibody clone M87 |
| 64 | METDTLLLWVLLLWVPGSTGDIVLTQSPASLAVSPGQ RATISCRASESVDTYGNSFIHWYQQKPGQSPKLLIYR ASNLESGIPARFSGSGSRTDFTLTINPVETDDVATYY CQQSYEDPWTFGGGTKLEIK | Variable light chain amino acid sequence of mouse antibody clone M18 |
| 65 | METDTLLLWVLLLWVPGSTGDIVLTQSPASLAVSLGQ RATISCRASESVDTYGNSFMHWYQQKPGQPPKLLIYR ASNLESGIPARFSGSGSRTDFTLTINPVEADDIATYY CQQSYEDPWTFGGGTKLEIK | Variable light chain amino acid sequence of mouse antibody clone M19 |
| 66 | METDTLLLWVLLLWVPGSTGDIVLTQSPASLAVSLGQ RATISYRASKSVSTSGYSYMHWNQQKPGQPPRLLIYL VSNLESGVPARFSGSGSGTDFTLNIHPVEEEDAATYY CQHIRELTRSFGGGTKLEIK | Variable light chain amino acid sequence of mouse antibody clone M87 |
| 40 | MAVLGLLLCLVTFPSCVLSEVQLQESGPSLVKPSQTL SLTCSVTGDSITSGYWNWIRKFPGNKLEYMGYISYSG ITDYNPSLKSRISITRDTSKNQYYLQLNSVTTEDTAT YYCARYGNYGYAMDYTNGQGTSVTVSSAKTTPPSVYPL APGS | Variable and hinge heavy chain amino acid sequence of mouse antibody clone M14 |
| 41 | MAVLGLLFCLVTFPSCVLSEVQLQESGPSLVKPSQTL SLTCSVTGDSITSGYWNWIRKFPGNKLEYMGYISYSG ITDYNPSLKSRISITRDTSKNQYYLQLNSVTTEDTAT YYCARYGNYGYAMDYTNGQGTSVTVSSAKTTPPSVYPL APGS | Variable and hinge heavy chain amino acid sequence of mouse antibody clone M18 |
| 42 | MAVLGLLFCLVTFPSCVLSEVQLQESGPSLVKPSQTL SLTCSVTGDSITSGYWNWIRKFPGNELEYMGYISYSG ITYYNPSLKSRFSITRDTSKNQYYLQLNSVTTEDTAT YYCARYGNYGYAMDYTNGQGTSVTVSSAKTTPPSVYPL APGS | Variable and hinge heavy chain amino acid sequence of mouse antibody clone M19 |
| 43 | MAVLGLLFCLVTFPSCVLSEVKLVESGGGLVQPGGSL RLSCATSGFTFTDYYMNWVRQPPGKALETNLGFIRNKA NGYTTEYSASVKGRFTISRDNSQSILYLQMNTLRAED SATYYCARDYYGSCFDYTNGQGTTLIVSSAKTTPPSVY PLAPGS | Variable and hinge heavy chain amino acid sequence of mouse antibody clone M87 |
| 67 | MAVLGLLFCLVTFPSCVLSEVQLQESGPSLVKPSQTL SLTCSVTGDSITSGYTNNWIRKFPGNKLEYMGYISSG ITDYNPSLKSRISITRDTSKNQYYLQLNSVTTEDTAT YYCARYGNYGYAMDYTNGQGTSVIVSS | Variable heavy chain amino acid sequence of mouse antibody clone M18 |
| 68 | MAVLGLLFCLVTFPSCVLSEVQLQESGPSLVKPSQTL SLTCSVTGDSITSGYTNNWIRKFPGNELEYMGYISYSG ITYYNPSLKSRFSITRDTSKNQYYLQLNSVTTEDTAT YYCARYGNYGYAMDYTNGQGTSVIVSS | Variable heavy chain amino acid sequence of mouse antibody clone M19 |

TABLE 1-continued

Description of Certain Sequences

| SEQ ID NO: | SEQUENCE | DESCRIPTION |
|---|---|---|
| 69 | MAVLGLLFCLVTFPSCVLSEVKLVESGGGLVQPGGSL RLSCATSGFTFTDYYMNWVRQPPGKALETNLGFIRNKA NGYTTEYSASVKGRFTISRDNSQSILYLQMNTLRAED SATYYCARDYYGSCFDYTNGQGTTLIVSS | Variable heavy chain amino acid sequence of mouse antibody clone M87 |
| 44 | SSHMAPTHQLPPSDVRKIILELQPLSRGLLEDYQKKE TGVPESNRILLLCLTSDSQPPRLNSSAILPYFRAIRP LSDKNIIDKIIEQLDKLKFQHEPETEISVPADTFECK SFILTILQQFSACLESVFKSLNSGPQ | Mature canine IL31 amino acid sequence |
| 45 | PSDX₁X₂KI, wherein X₁ and X₂ are any amino acids; or wherein X₁ is a hydrophobic amino acid, or wherein X₁ is selected from A, V, I, and L, or wherein X₁ is selected from V and I; and wherein X₂ is a hydrophilic amino acid, or wherein X₂ is selected from A, R, K, Q, and N; or wherein X₂ is selected from R and Q. | IL31 epitope |
| 88 | PSDVRKI | Alternative canine IL31 epitope |
| 46 | MASHSGPSTSVLFLFCCLGGWLASHTLPVRLLRPSDD VQKIVEELQSLSKMLLKDVEEEKGVLVSQNYTLPCLS PDAQPPNNIHSPAIRAYLKTIRQLDNKSVIDEIIEHL DKLIFQDAPETNISVPTDTHECKRFILTISQQFSECM DLALKSLTSGAQQATT | Human IL31 precursor amino acid sequence NCBI ref: NP_001014358.1 |
| 47 | MLSHAGPARFALFLLCFMGTSLTSQTAPIHQLHPSDV RKIILELQPLSKGLLEDYLKKEMGVPESNHFLLPCLT SDSQPPRINSSAILPYFRAIRPLSDKNTINKIIEQLD KLKFQHEPETEVSVPADTFESKSFILAILQQFSACLD HVFKSLNPGPQQVMQGHLIEPIPSGTADV | Predicted walrus IL31 amino acid sequence NCBI ref: XP_004395998.1 [*odobenus rosmarus divergens*] |
| 48 | MLSHAGPARFALFLLCFMGTSLTSQTAPIHQLHPSDV RKIILELQPLSKGLLEDYLKKEMGVPESNHFLLPCLT SDSQPPRINSSAILPYFRAIRPLSDKNTINKIIEQLD KLKFQHEPETEVSVPADTFESKSFILAILQQFSACLD HVFKSLNPGPQQVMQGHLIEPIPSGTADV*GSGSHHHH HH* | Walrus_IL31_His6 |
| 49 | MASHSGPATSVLFLLCCLGGWLTSHTLPVHFLQPSDI QKIVEELQSLSKMLLKDVKEDKGVLVSQNYTLPCLTP DAQPPNIIHSPAIRAYLKTIRELDNKSVIDEIIEHLD KLIFQDAPETNISVPTDTHECKRFILTISQQFSECMD LALKSLTSGAQQATT | Predicted olive baboon IL31 amino acid sequence NCBI ref: XP_003907358.1 [*papio anubis*] |
| 50 | MASHSGPATSVLFLLCCLGGWLTSHTLPVHFLQPSDI QKIVEELQSLSKMLLKDVKEDKGVLVSQNYTLPCLTP DAQPPNIIHSPAIRAYLKTIRELDNKSVIDEIIEHLD KLIFQDAPETNISVPTDTHECKRFILTISQQFSECMD LALKSLTSGAQQATT*GSGSHHHHHH* | Olive baboon_IL31_His6 |
| 51 | MLSRAVPAGFALFLLCYMETLLTSHTAPTHRLPPSDI RKIILELQPLSKGLLEDYLKKETGLPESNHSLVPCLT SDSEAPHINSSAILPYFRAIRPLSDKNVIDKIIEQLD KLKFQHEPETEVSVPADTFEGKSFILTILQQFSACLE RVFKSLNPGAQ | Predicted polar bear IL31 amino acid sequence NCBI ref: XP_008687166.1 [*ursus mantimus*] |
| 52 | MLSHAGPARFALFLLCFMETSLTSQTVPIHQLQPSDV RKIILELQPLSKGLLEDYLKKEMGVPESNHFLLPCLT SDSQPPRINSSAILPYFRAIRPLSDKNIINKIIEQLD KLKFQHEPETEVSVPADTFESKSFILTILQQFSACLG HVLKSLNPGPQQVMQGHLAKPIPSGTADMYETLRHHH | Predicted weddell seal IL31 amino acid sequence NCBI ref: XP_006746595.1 [*leptonychotes weddellii*] |
| 53 | MLSHAGPARFALFLLCCMETLLPSHMAPTHRLPSDV RKIILELRPMSKGLLQDYLKKEMGLPESNHSSLPCLS SDSQLPHINGSAILPYFRAIRPLSDKNTIDKIIEQLD KLKFQREPEAEVSMPADNFERKNFILAVLQQFSACLE HVLQSLNSGPQ | Predicted amur tiger IL31 amino acid sequence NCBI ref: XP_007079636.1 [*panthera tigris altaica*] |
| 54 | MLSHAGPARFALFLLCCMETLLPSHMAPTHRLQPSDV RKIILELRPMSKGLLQDYLKKEMGLPESNHSSLPCLS SDSQLPHINGSAILPYFRAIRPLSDKNTIDKIIEQLD | Predicted cheetah IL31 amino acid sequence NCBI ref: XP_014919275.1 |

TABLE 1-continued

Description of Certain Sequences

| SEQ ID NO: | SEQUENCE | DESCRIPTION |
|---|---|---|
|  | KLKFQREPEAEVSMPADNFERKNFILAVLQQFSACLE HVLQSLNSGSQ | [acinonyx jubatus] |
| 55 | MASHSGPATSVLFLLCCLGGWLTSHTLPVHFLQ*PSDI QKIV*EELQSLSKMLLKDVKEDKGVLVSQNYTLPCLTP DAQPPNIIHSPAIRAYLKTIRQLDNKSVIDEIIEHLD KLIFQDAPETNISVPTDTHECKRFILTISQQFSECMD LALKSLTSGAQQATT | Predicted crab-eating macaque IL31 amino acid sequence GenBank ref: EHH66805.1 [macaca fascicularis] |
| 56 | GPATSVLFLLCCLGGWLTSHTLPVHFLQ*PSDIQKIV*E ELQSLSKMLLKDVKEDKGVLVSQNYTLPCLTPDAQPP NIIHSPAIRAYLKTIRQLDNKSVIDEIIEHLDKLIFQ DAPETNISVPTDTHECKRFILTISQQFSECMDLALKS LTSGAQQATT | Predicted rhesus monkey IL31 amino acid sequence (partial) GenBank ref: EHH21279.1 [macaca mulatta] |
| 57 | MASHSGPATSVLFLLCCLGGWLTSHTLPVHFLQ*PSDI QKIV*KELQSLSKMLLKDVKEDKGVLVSQNYTLPCLTP DAQPPNIIHSPAIRAYLKTIRQLDNRSVIDEIIEHLD KLIFQDAPETNISVPTDTHECKRFILTISQQFSECMD LALKSLTSGAQQATT | Predicted drill IL31 amino acid sequence NCBI ref: XP_011819882.1 [mandrillus leucophaeus] |
| 58 | MASHSGPATSVLFLLCCLGGWLTSHTLPVHFLQ*PSDI QKIV*EELQSLSKMLLKDVKEDKGVLVSQNYKLPCLTP DAQPPNIIHSPAIRAYLKTIRQLDNKSVIDEIIEHLD KLIFQDAPETNISVPTDTHECKRFILTISQQFSECMD LALKSLTSGAQQATT | Predicted green monkey IL31 amino acid sequence NCBI ref: XP_008003211.1 [chlorocebus sabaeus] |
| 59 | MASHSGPATSVLFLLCCLGGWLTSHTLPVHFLQ*PSDI QKIV*EELQSLSKMLLKDVKEDKGVLVSQNYTLPCLTP DAQPPNIIHSPAIRAYLKTIRQLDNRSVIDEIIEHLD KLIFQDAPETNISVPTDTHECKRFILTISQQFSECMD LALKSLTSGAQQATT | Predicted sooty mangebey IL31 amino acid sequence NCBI ref: XP_011926625.1 [cercocebus atys] |
| 60 | MASHSGPTTSVLFLLCCLGGWLTSHTLPVHFLR*PSDI QKIV*EELQSLSKMLLKDVEEDKGVLVSQNYTLPCLTP DAQPPNIIHSPAIRAYLKTIRQLDNKSVIDEIIEHLD KLIFQDAPETNISVPTDTHECKRFILTISQQFSECMD LALKSLTSGAQQATT | Predicted golden snub-nosed monkey IL31 amino acid sequence NCBI ref: XP_010366647.1 [rhinopithecus roxellana] |
| 61 | MIFHTGTTKPTLVLLCCIGTWLATCSLSFGAPISKED LRTTIDLLKQESQDLYNNYSIKQASGMSADESIQLPC FSLDREALTNISVIIAHLEKVKVLSENTVDTSWVIRW LTNISCFNPLNLNISVPGNTDESYDCKVFVLTVLKQF SNCMAELQAKDNTTC | Murine IL31 precursor amino acid sequence NCBI ref: NP_083870 [mus musculus] |

DESCRIPTION OF CERTAIN EMBODIMENTS

Antibodies that bind canine IL31, feline IL31, or equine IL31 are provided. Antibody heavy chains and light chains that are capable of forming antibodies that bind IL31 are also provided. In addition, antibodies, heavy chains, and light chains comprising one or more particular complementary determining regions (CDRs) are provided. Polynucleotides encoding antibodies to canine IL31 are provided. Methods of producing or purifying antibodies to canine IL31 are also provided. Methods of treatment using antibodies to canine IL31 are provided. Such methods include, but are not limited to, methods of treating IL31-induced conditions in companion animal species. Methods of detecting IL31 in a sample from a companion animal species are provided.

For the convenience of the reader, the following definitions of terms used herein are provided.

As used herein, numerical terms such as Kd are calculated based upon scientific measurements and, thus, are subject to appropriate measurement error. In some instances, a numerical term may include numerical values that are rounded to the nearest significant figure.

As used herein, "a" or "an" means "at least one" or "one or more" unless otherwise specified. As used herein, the term "or" means "and/or" unless specified otherwise. In the context of a multiple dependent claim, the use of "or" when referring back to other claims refers to those claims in the alternative only.

Anti-IL31 Antibodies

Novel antibodies directed against IL31 are provided, for example antibodies that bind to canine IL31, feline IL31, and/or equine IL31. Anti-IL31 antibodies provided herein include, but are not limited to, monoclonal antibodies, mouse antibodies, chimeric antibodies, caninized antibodies, felinized antibodies, and equinized antibodies. In some embodiments, an anti-IL31 antibody is an isolated mouse monoclonal antibody such as M14, M18, M19, and M87.

Monoclonal antibodies M14, M18, M19, and M87 were isolated as follows. Briefly, mice were immunized with canine IL31 and mouse monoclonal antibody clones were obtained through standard hybridoma technology. Enzyme linked immunosorbent assay (ELISA) was used to screen for hybridoma clones producing IL31-binding antibodies. Based on binding affinity and a cell-based functional assay described herein, hybridoma clones producing monoclonal antibodies M14, M18, M19, and M87 were selected for further investigation. The variable heavy chain (VH) and variable light chain (VL) of each of the four clones were sequenced and analyzed by sequence alignment (FIG. 1).

Also provided herein are amino acid sequences of monoclonal antibody M14. For example, the variable heavy chain CDRs (SEQ ID NOs: 1-3; SEQ ID NO: 89 is an alternate definition for CDR-H2), variable light chain CDRs (SEQ ID NOs: 8-10), variable region heavy chain framework sequences (SEQ ID NOs: 4-7), and variable region light chain framework sequences (SEQ ID NOs: 11-14) for monoclonal antibody M14 are provided. The amino acid sequences of the variable light chain, light chain, variable heavy chain, and variable and hinge heavy chain of monoclonal antibody M14 are provided (SEQ ID NOs: 24, 36, 25, and 40, respectively).

In addition, the amino acid sequences of the CDRs, framework sequences, variable light chain, variable heavy chain of monoclonal antibodies M18, M19, and M87 are provided (See, e.g., FIG. 1). The variable heavy chain CDRs (SEQ ID NOs: 1-3; SEQ ID NO: 89 is an alternate definition for CDR-H2), variable light chain CDRs (SEQ ID NOs: 8-10), variable light chain (SEQ ID NO: 65), light chain (SEQ ID NO: 38), variable and hinge heavy chain (SEQ ID NO: 42), and variable heavy chain (SEQ ID NO: 68) for monoclonal antibody M19 are provided. The variable heavy chain CDRs (SEQ ID NOs: 1, 62, and 3; SEQ ID NO: 87 is an alternate definition for CDR-H2), variable light chain CDRs (SEQ ID NOs: 63, 9, and 10), variable light chain (SEQ ID NO: 64), light chain (SEQ ID NO: 37), variable and hinge heavy chain (SEQ ID NO: 41), and variable heavy chain (SEQ ID NO: 67) for monoclonal antibody M18 are provided. The variable light chain (SEQ ID NO: 66), light chain (SEQ ID NO: 39), variable and hinge heavy chain (SEQ ID NO: 43), and variable heavy chain (SEQ ID NO: 69) for monoclonal antibody M87 are provided.

Also provided herein are chimeric, caninized, felinized, and equinized antibodies derived from monoclonal antibody M14, M18, M19, and M87. In some embodiments, amino acid sequences of caninized monoclonal antibody M14 are provided, such as SEQ ID NOs: 15-21 and 70-78. In some embodiments, amino acid sequences of felinized antibodies derived from monoclonal antibody M14 are provided, such as SEQ ID NOs: 32-35 and 79-86. In some embodiments, amino acid sequences of chimeric antibodies derived from monoclonal antibody M14 are provided, such as SEQ ID NOs: 26, 27, 30, and 31.

The term "antibody" herein is used in the broadest sense and encompasses various antibody structures, including but not limited to monoclonal antibodies, polyclonal antibodies, multispecific antibodies (for example, bispecific (such as Bi-specific T-cell engagers) and trispecific antibodies), and antibody fragments (such as Fab, F(ab')$_2$, ScFv, minibody, diabody, triabody, and tetrabody) so long as they exhibit the desired antigen-binding activity. Canine, feline, and equine species have different varieties (classes) of antibodies that are shared by many mammalians.

The term antibody includes, but is not limited to, fragments that are capable of binding to an antigen, such as Fv, single-chain Fv (scFv), Fab, Fab', di-scFv, sdAb (single domain antibody) and (Fab')2 (including a chemically linked F(ab')2). Papain digestion of antibodies produces two identical antigen-binding fragments, called "Fab" fragments, each with a single antigen-binding site, and a residual "Fc" fragment, whose name reflects its ability to crystallize readily. Pepsin treatment yields an F(ab')2 fragment that has two antigen combining sites and is still capable of crosslinking antigen. The term antibody also includes, but is not limited to, chimeric antibodies, humanized antibodies, and antibodies of various species such as mouse, human, cynomolgus monkey, canine, feline, equine, etc. Furthermore, for all antibody constructs provided herein, variants having the sequences from other organisms are also contemplated. Thus, if a murine version of an antibody is disclosed, one of skill in the art will appreciate how to transform the murine sequence based antibody into a cat, dog, horse, etc. sequence. Antibody fragments also include either orientation of single chain scFvs, tandem di-scFv, diabodies, tandem tri-sdcFv, minibodies, etc. Antibody fragments also include nanobodies (sdAb, an antibody having a single, monomeric domain, such as a pair of variable domains of heavy chains, without a light chain). An antibody fragment can be referred to as being a specific species in some embodiments (for example, mouse scFv or a canine scFv). This denotes the sequences of at least part of the non-CDR regions, rather than the source of the construct. In some embodiments, the antibodies comprise a label or are conjugated to a second moiety.

The terms "label" and "detectable label" mean a moiety attached to an antibody or its analyte to render a reaction (for example, binding) between the members of the specific binding pair, detectable. The labeled member of the specific binding pair is referred to as "detectably labeled." Thus, the term "labeled binding protein" refers to a protein with a label incorporated that provides for the identification of the binding protein. In some embodiments, the label is a detectable marker that can produce a signal that is detectable by visual or instrumental means, for example, incorporation of a radiolabeled amino acid or attachment to a polypeptide of biotinyl moieties that can be detected by marked avidin (for example, streptavidin containing a fluorescent marker or enzymatic activity that can be detected by optical or colorimetric methods). Examples of labels for polypeptides include, but are not limited to, the following: radioisotopes or radionuclides (for example, $^{3}$H, $^{14}$C, $^{35}$S, $^{90}$Y $^{99}$Tc, $^{111}$In, $^{125}$I, $^{131}$I, $^{177}$Lu, $^{166}$Ho, or $^{153}$Sm); chromogens, fluorescent labels (for example, FITC, rhodamine, lanthanide phosphors), enzymatic labels (for example, horseradish peroxidase, luciferase, alkaline phosphatase); chemiluminescent markers; biotinyl groups; predetermined polypeptide epitopes recognized by a secondary reporter (for example, leucine zipper pair sequences, binding sites for secondary antibodies, metal binding domains, epitope tags); and magnetic agents, such as gadolinium chelates. Representative examples of labels commonly employed for immunoassays include moieties that produce light, for example, acridinium compounds, and moieties that produce fluorescence, for example, fluorescein. In this regard, the moiety itself may not be detectably labeled but may become detectable upon reaction with yet another moiety.

The term "monoclonal antibody" refers to an antibody of a substantially homogeneous population of antibodies, that is, the individual antibodies comprising the population are identical except for possible naturally-occurring mutations that may be present in minor amounts. Monoclonal antibodies are highly specific, being directed against a single antigenic site. Furthermore, in contrast to poly clonal antibody preparations, which typically include different antibodies directed against different determinants (epitopes), each monoclonal antibody is directed against a single determinant on the antigen. Thus, a sample of monoclonal antibodies can bind to the same epitope on the antigen. The modifier "monoclonal" indicates the character of the antibody as being obtained from a substantially homogeneous population of antibodies, and is not to be construed as requiring production of the antibody by any particular method. For example, the monoclonal antibodies may be made by the hybridoma method first described by Kohler and Milstein, 1975, Nature 256:495, or may be made by recombinant DNA methods such as described in U.S. Pat. No. 4,816,567. The monoclonal antibodies may also be isolated from phage libraries generated using the techniques described in McCafferty et al., 1990, Nature 348:552-554, for example.

In some embodiments, the monoclonal antibody is an isolated mouse antibody selected from clone M14, M18, M19, and M87.

"Amino acid sequence," means a sequence of amino acids residues in a peptide or protein. The terms "polypeptide" and "protein" are used interchangeably to refer to a polymer of amino acid residues, and are not limited to a minimum length. Such polymers of amino acid residues may contain natural or non-natural amino acid residues, and include, but are not limited to, peptides, oligopeptides, dimers, trimers, and multimers of amino acid residues. Both full-length proteins and fragments thereof are encompassed by the definition. The terms also include post-expression modifications of the polypeptide, for example, glycosylation, sialylation, acetylation, phosphorylation, and the like. Furthermore, for purposes of the present disclosure, a "polypeptide" refers to a protein which includes modifications, such as deletions, additions, and substitutions (generally conservative in nature), to the native sequence, as long as the protein maintains the desired activity. These modifications may be deliberate, as through site-directed mutagenesis, or may be accidental, such as through mutations of hosts which produce the proteins or errors due to PCR amplification.

"IL31" as used herein refers to any native IL31 that results from expression and processing of IL31 in a cell. The term includes IL31 from any vertebrate source, including mammals such as primates (e.g., humans and cynomolgus monkeys) and rodents (e.g., mice and rats), and companion animals (e.g., dogs, cats, and equine), unless otherwise indicated. The term also includes naturally occurring variants of IL31, e.g., splice variants or allelic variants.

In some embodiments, a canine IL31 comprises the amino acid sequence of SEQ ID NO: 22 or SEQ ID NO: 44. In some embodiments, a feline IL31 comprises the amino acid sequence of SEQ ID NO: 28. In some embodiments, an equine IL31 comprises the amino acid sequence of SEQ ID NO: 29. In some embodiments, a human IL31 comprises the amino acid sequence of SEQ ID NO: 46. In some embodiments, a walrus IL31 comprises the amino acid sequence of SEQ ID NO: 47. In some embodiments, a murine IL31 comprises the amino acid sequence of SEQ ID NO: 61. In other embodiments, the IL31 comprises the amino acid sequence of SEQ ID NO: 49, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, or SEQ ID NO: 60.

The term "IL31 binding domain" of an antibody means the binding domain formed by a light chain and heavy chain of an anti-IL31 antibody, which binds IL31.

In some embodiments, the IL31 binding domain binds canine IL31 with greater affinity than it binds human IL31. In some embodiments, the IL31 binding domain binds IL31 of other companion animals, such as feline IL31 or equine IL31. In some embodiments, the IL31 binding domain does not bind human IL31.

As used herein, the term "epitope" refers to a site on a target molecule (for example, an antigen, such as a protein, nucleic acid, carbohydrate or lipid) to which an antigen-binding molecule (for example, an antibody, antibody fragment, or scaffold protein containing antibody binding regions) binds. Epitopes often include a chemically active surface grouping of molecules such as amino acids, polypeptides or sugar side chains and have specific three dimensional structural characteristics as well as specific charge characteristics. Epitopes can be formed both from contiguous or juxtaposed noncontiguous residues (for example, amino acids, nucleotides, sugars, lipid moiety) of the target molecule. Epitopes formed from contiguous residues (for example, amino acids, nucleotides, sugars, lipid moiety) typically are retained on exposure to denaturing solvents whereas epitopes formed by tertiary folding typically are lost on treatment with denaturing solvents. An epitope may include but is not limited to at least 3, at least 5 or 8-10 residues (for example, amino acids or nucleotides). In some examples an epitope is less than 20 residues (for example, amino acids or nucleotides) in length, less than 15 residues or less than 12 residues. Two antibodies may bind the same epitope within an antigen if they exhibit competitive binding for the antigen. In some embodiments, an epitope can be identified by a certain minimal distance to a CDR residue on the antigen-binding molecule. In some embodiments, an epitope can be identified by the above distance, and further limited to those residues involved in a bond (for example, a hydrogen bond) between an antibody residue and an antigen residue. An epitope can be identified by various scans as well, for example an alanine or arginine scan can indicate one or more residues that the antigen-binding molecule can interact with. Unless explicitly denoted, a set of residues as an epitope does not exclude other residues from being part of the epitope for a particular antibody. Rather, the presence of such a set designates a minimal series (or set of species) of epitopes. Thus, in some embodiments, a set of residues identified as an epitope designates a minimal epitope of relevance for the antigen, rather than an exclusive list of residues for an epitope on an antigen.

In some embodiments, the epitope comprises the amino acid sequence PSDX$_1$x$_2$KI (SEQ ID NO: 45), wherein X is any amino acid residue. In some embodiments, X$_1$ is a hydrophobic amino acid. In some embodiments, X$_1$ is selected from A, V, I, and L. In some embodiments, X$_1$ is selected from V and I. In some embodiments, X$_2$ is a hydrophilic amino acid. In some embodiments, X$_2$ is selected from A, R, K, Q, and N. In some embodiments, X$_2$ is selected from R and Q. In some embodiments, X$_1$ is V and X$_2$ is R. In some embodiments, X$_1$ is I and X$_2$ is Q. In some embodiments, the epitope comprises the amino acid sequence of SEQ ID NO: 88. In some embodiments, the epitope comprises the amino acid sequence of SEQ ID NO: 23. In some embodiments, the epitope is within amino acids 34-50 of SEQ ID NO: 22. In some embodiments, the epitope comprises amino acids 34-50 of SEQ ID NO: 22.

The term "CDR" means a complementarity determining region as defined by at least one manner of identification to one of skill in the art. In some embodiments, CDRs can be defined in accordance with any of the Chothia numbering schemes, the Kabat numbering scheme, a combination of Kabat and Chothia, the AbM definition, the contact definition, or a combination of the Kabat, Chothia, AbM, or contact definitions. The various CDRs within an antibody can be designated by their appropriate number and chain type, including, without limitation as CDR-H1, CDR-H2, CDR-H3, CDR-L1, CDR-L2, and CDR-L3. The term "CDR" is used herein to also encompass a "hypervariable region" or HVR, including hypervariable loops.

In some embodiments, an anti-IL31 antibody comprises a heavy chain comprising (a) a CDR-H1 comprising the amino acid sequence of SEQ ID NO: 1; (b) a CDR-H2 comprising the amino acid sequence of SEQ ID NO: 2, SEQ ID NO: 62, SEQ ID NO: 89, or SEQ ID NO: 87; or (c) a CDR-H3 comprising the amino acid sequence of SEQ ID NO: 3. In some embodiments, an anti-IL31 antibody comprises a light chain comprising (a) a CDR-L1 comprising the amino acid sequence of SEQ ID NO: 8 or SEQ ID NO: 63; (b) a CDR-L2 comprising the amino acid sequence of SEQ ID NO: 9; or (c) a CDR-L3 comprising the amino acid sequence of SEQ ID NO: 10.

In some embodiments, an anti-IL31 antibody comprises a heavy chain comprising (a) a CDR-H1 comprising the amino acid sequence of SEQ ID NO: 1, (b) a CDR-H2 comprising the amino acid sequence of SEQ ID NO: 2 or 89, and (c) a CDR-H3 comprising the amino acid sequence of SEQ ID NO: 3; and a light chain comprising (a) a CDR-L1 comprising the amino acid sequence of SEQ ID NO: 8 or 63, (b) a CDR-L2 comprising the amino acid sequence of SEQ ID NO: 9, and (c) a CDR-L3 comprising the amino acid sequence of SEQ ID NO: 10.

In some embodiments, an anti-IL31 antibody comprises a heavy chain comprising (a) a CDR-H1 comprising the amino acid sequence of SEQ ID NO: 1, (b) a CDR-H2 comprising the amino acid sequence of SEQ ID NO: 62 or 87, and (c) a CDR-H3 comprising the amino acid sequence of SEQ ID NO: 3; and a light chain comprising (a) a CDR-L1 comprising the amino acid sequence of SEQ ID NO: 8 or 63, (b) a CDR-L2 comprising the amino acid sequence of SEQ ID NO: 9, and (c) a CDR-L3 comprising the amino acid sequence of SEQ ID NO: 10.

The term "variable region" as used herein refers to a region comprising at least three CDRs. In some embodiments, the variable region includes the three CDRs and at least one framework region ("FR"). The terms "heavy chain variable region" or "variable heavy chain" are used interchangeably to refer to a region comprising at least three heavy chain CDRs. The terms "light chain variable region" or "variable light chain" are used interchangeably to refer to a region comprising at least three light chain CDRs. In some embodiments, the variable heavy chain or variable light chain comprises at least one framework region. In some embodiments, an antibody comprises at least one heavy chain framework region selected from HC-FR1, HC-FR2, HC-FR3, and HC-FR4. In some embodiments, an antibody comprises at least one light chain framework region selected from LC-FR1, LC-FR2, LC-FR3, and LC-FR4. The framework regions may be juxtaposed between light chain CDRs or between heavy chain CDRs. For example, an antibody may comprise a variable heavy chain having the following structure: (HC-FR1)-(CDR-H1)-(HC-FR2)-(CDR-H2)-(HC-FR3)-(CDR-H3)-(HC-FR4). An antibody may comprise a variable heavy chain having the following structure: (CDR-H1)-(HC-FR2)-(CDR-H2)-(HC-FR3)-(CDR-H3). An antibody may also comprise a variable light chain having the following structure: (LC-FR1)-(CDR-L1)-(LC-FR2)-(CDR-L2)-(LC-FR3)-(CDR-L3)-(LC-FR4). An antibody may also comprise a variable light chain having the following structure: (CDR-L1)-(LC-FR2)-(CDR-L2)-(LC-FR3)-(CDR-L3).

In some embodiments, an anti-IL31 antibody comprises one or more of (a) a variable region heavy chain framework 1 (HC-FR1) sequence of SEQ ID NO: 4, (b) a HC-FR2 sequence of SEQ ID NO: 5, (c) a HC-FR3 sequence of SEQ ID NO: 6, (d) a HC-FR4 sequence of SEQ ID NO: 7, (e) a variable region light chain framework 1 (LC-FR1) sequence of SEQ ID NO: 11, (f) an LC-FR2 sequence of SEQ ID NO: 12, (g) an LC-FR3 sequence of SEQ ID NO: 13, or (h) an LC-FR4 sequence of SEQ ID NO: 14. In some embodiments, an anti-IL31 antibody comprises a variable light chain sequence of (a) SEQ ID NO: 16, (b) SEQ ID NO: 24, or (c) SEQ ID NO: 32. In some embodiments, an anti-IL31 antibody comprises a variable heavy chain sequence of (a) SEQ ID NO: 15; (b) SEQ ID NO: 25; or (c) SEQ ID NO: 33. In some embodiments, an anti-IL31 antibody comprises (a) a variable light chain sequence of SEQ ID NO: 16 and a variable heavy chain sequence of SEQ ID NO: 15; (b) a variable light chain sequence of SEQ ID NO: 24 and a variable heavy chain sequence of SEQ ID NO: 25; or (c) a variable light chain sequence of SEQ ID NO: 32 and a variable heavy chain sequence of SEQ ID NO: 33.

The term "constant region" as used herein refers to a region comprising at least three constant domains. The terms "heavy chain constant region" or "constant heavy chain" are used interchangeably to refer to a region comprising at least three heavy chain constant domains, CH1, CH2, and CH3. Nonlimiting exemplary heavy chain constant regions include γ, δ, α, ε, and μ. Each heavy chain constant region corresponds to an antibody isotype. For example, an antibody comprising a γ constant region is an IgG antibody, an antibody comprising a δ constant region is an IgD antibody, an antibody comprising an α constant region is an IgA antibody, an antibody comprising a constant region is an IgM antibody, and an antibody comprising an ε constant region is an IgE antibody. Certain isotypes can be further subdivided into subclasses. For example, IgG antibodies include, but are not limited to, IgG1 (comprising a γ1 constant region), IgG2 (comprising a $\gamma_2$ constant region), IgG3 (comprising a $\gamma_3$ constant region), and IgG4 (comprising a $\gamma_4$ constant region) antibodies; IgA antibodies include, but are not limited to, IgA1 (comprising an α1 constant region) and IgA2 (comprising an $a_2$ constant region) antibodies; and IgM antibodies include, but are not limited to IgM1 and IgM2. The terms "light chain constant region" or "constant light chain" are used interchangeably to refer to a region comprising a light chain constant domain, CL. Nonlimiting exemplary light chain constant regions include λ and κ. Non-function-altering deletions and alterations within the domains are encompassed within the scope of the term "constant region" unless designated otherwise. Canine, feline, and equine have antibody classes such as IgG, IgA, IgD, IgE, and IgM. Within the canine IgG antibody class are IgG-A, IgG-B, IgG-C, and IgG-D. Within the feline IgG antibody class are IgG1a, IgG1b, and IgG2. Within the equine IgG antibody class are IgG1, IgG2, IgG3, IgG4, IgG5, IgG6, and IgG7.

The term "chimeric antibody" or "chimeric" refers to an antibody in which a portion of the heavy chain or light chain is derived from a particular source or species, while at least a part of the remainder of the heavy chain or light chain is derived from a different source or species. In some embodiments, a chimeric antibody refers to an antibody comprising at least one variable region from a first species (such as mouse, rat, cynomolgus monkey, etc.) and at least one constant region from a second species (such as human, dog, cat, equine, etc.). In some embodiments, a chimeric antibody comprises at least one mouse variable region and at least one canine constant region. In some embodiments, a chimeric antibody comprises at least one mouse variable region and at least one feline constant region. In some embodiments, all of the variable regions of a chimeric antibody are from a first species and all of the constant regions of the chimeric antibody are from a second species. In some embodiments, a chimeric antibody comprises a constant heavy chain region or constant light chain region from a companion animal. In some embodiments, a chimeric antibody comprises a mouse variable heavy and light chains and a companion animal constant heavy and light chains. For example, a chimeric antibody may comprise a mouse variable heavy and light chains and a canine constant heavy and light chains; a chimeric antibody may comprise a mouse variable heavy and light chains and a feline constant heavy and light chains; or a chimeric antibody may comprise a mouse variable heavy and light chains and an equine constant heavy and light chains.

In some embodiments, an anti-IL31 antibody comprises a chimeric antibody comprising:
- a. (i) a light chain amino acid sequence of SEQ ID NO: 26; (ii) a heavy chain amino acid sequence of SEQ ID NO: 27; or (iii) a light chain amino acid sequence as in (i) and a heavy chain sequence as in (ii); or
- b. (i) a light chain amino acid sequence of SEQ ID NO: 30; (ii) a heavy chain amino acid sequence of SEQ ID NO: 31; or (iii) a light chain amino acid sequence as in (i) and a heavy chain sequence as in (ii).

A "canine chimeric" or "canine chimeric antibody" refers to a chimeric antibody having at least a portion of a heavy chain or a portion of a light chain derived from a dog. A "feline chimeric" or "feline chimeric antibody" refers to a chimeric antibody having at least a portion of a heavy chain or a portion of a light chain derived from a cat. An "equine chimeric" or "equine chimeric antibody" refers to a chimeric antibody having at least a portion of a heavy chain or a portion of a light chain derived from a horse. In some embodiments, a canine chimeric antibody comprises a mouse variable heavy and light chains and a canine constant heavy and light chains. In some embodiments, a feline chimeric antibody comprises a mouse variable heavy and light chains and a feline constant heavy and light chains. In some embodiments, an equine chimeric antibody comprises a mouse variable heavy and light chains and an equine constant heavy and light chains. In some embodiments, the antibody is a chimeric antibody comprising murine variable heavy chain framework regions or murine variable light chain framework regions.

A "canine antibody" as used herein encompasses antibodies produced in a canine; antibodies produced in non-canine animals that comprise canine immunoglobulin genes or comprise canine immunoglobulin peptides; or antibodies selected using in vitro methods, such as phage display, wherein the antibody repertoire is based on a canine immunoglobulin sequence. The term "canine antibody" denotes the genus of sequences that are canine sequences. Thus, the term is not designating the process by which the antibody was created, but the genus of sequences that are relevant.

In some embodiments, an anti-IL31 antibody comprises a canine heavy chain constant region selected from an IgG-A, IgG-B, IgG-C, and IgG-D constant region. In some embodiments, an anti-IL31 antibody is a canine IgG-A, IgG-B, IgG-C, or IgG-D antibody. In some embodiments, an anti-IL31 antibody is (a) a canine IgG-A antibody comprising the heavy chain amino acid sequence of SEQ ID NO: 17; (b) a canine IgG-B antibody comprising the heavy chain amino acid sequence of SEQ ID NO: 18; (c) a canine IgG-C antibody comprising the heavy chain amino acid sequence of SEQ ID NO: 19; or (d) a canine IgG-D antibody comprising the heavy chain amino acid sequence of SEQ ID NO: 20.

A "feline antibody" as used herein encompasses antibodies produced in a feline; antibodies produced in non-feline animals that comprise feline immunoglobulin genes or comprise feline immunoglobulin peptides; or antibodies selected using in vitro methods, such as phage display, wherein the antibody repertoire is based on a feline immunoglobulin sequence. The term "feline antibody" denotes the genus of sequences that are feline sequences. Thus, the term is not designating the process by which the antibody was created, but the genus of sequences that are relevant.

In some embodiments, an anti-IL31 antibody comprises a feline heavy chain constant region selected from an IgG1, IgG2a, and IgG2b constant region. In some embodiments, an anti-IL31 antibody is a feline IgG1, IgG2a, or IgG2b antibody.

An "equine antibody" as used herein encompasses antibodies produced in an equine; antibodies produced in non-equine animals that comprise equine immunoglobulin genes or comprise equine immunoglobulin peptides; or antibodies selected using in vitro methods, such as phage display, wherein the antibody repertoire is based on an equine immunoglobulin sequence. The term "equine antibody" denotes the genus of sequences that are equine sequences. Thus, the term is not designating the process by which the antibody was created, but the genus of sequences that are relevant.

In some embodiments, an anti-IL31 antibody comprises an equine heavy chain constant region selected from an IgG1, IgG2, IgG3, IgG4, IgG5, IgG6 and IgG7 constant region. In some embodiments, an anti-IL31 antibody is an equine IgG1, IgG2, IgG3, IgG4, IgG5, IgG6 and IgG7 antibody.

A "caninized antibody" means an antibody in which at least one amino acid in a portion of a non-canine variable region has been replaced with the corresponding amino acid from a canine variable region. In some embodiments, a caninized antibody comprises at least one canine constant region (e.g., a γ constant region, an a constant region, a δ constant region, an ε constant region, a constant region, or etc.) or fragment thereof. In some embodiments, a caninized antibody is an antibody fragment, such as Fab, scFv, (Fab')$_2$, etc. The term "caninized" also denotes forms of non-canine (for example, murine) antibodies that are chimeric immunoglobulins, immunoglobulin chains, or fragments thereof (such as Fv, Fab, Fab', F(ab')$_2$ or other antigen-binding sequences of antibodies) that contain minimal sequence of non-canine immunoglobulin. Caninized antibodies can include canine immunoglobulins (recipient antibody) in which residues from a CDR of the recipient are substituted by residues from a CDR of a non-canine species (donor antibody) such as mouse, rat, or rabbit having the desired specificity, affinity, and capacity. In some instances, Fv framework region (FR) residues of the canine immunoglobulin are replaced by corresponding non-canine residues. Furthermore, the caninized antibody can comprise residues that are found neither in the recipient antibody nor in the imported CDR or framework sequences, but are included to further refine and optimize antibody performance.

In some embodiments, at least one amino acid residue in a portion of a mouse variable heavy chain or a mouse variable light chain has been replaced with the corresponding amino acid from a canine variable region. In some embodiments, the modified chain is fused to a canine constant heavy chain or a canine constant light chain. In some embodiments, an anti-IL31 antibody is a caninized antibody comprising (a) a heavy chain sequence of SEQ ID NO: 15, (b) a heavy chain sequence of SEQ ID NO: 17, (c) a heavy chain sequence of SEQ ID NO: 18, (d) a heavy chain sequence of SEQ ID NO: 19, (e) a heavy chain sequence of SEQ ID NO: 20, (f) a light chain sequence of SEQ ID NO: 16, or (g) a light chain sequence of SEQ ID NO: 21.

A "felinized antibody" means an antibody in which at least one amino acid in a portion of a non-feline variable region has been replaced with the corresponding amino acid from a feline variable region. In some embodiments, a felinized antibody comprises at least one feline constant region (e.g., a γ constant region, an a constant region, a δ constant region, an ε constant region, a constant region, or etc.) or fragment thereof. In some embodiments, a felinized antibody is an antibody fragment, such as Fab, scFv, (Fab')$_2$, etc. The term "felinized" also denotes forms of non-feline (for example, murine) antibodies that are chimeric immunoglobulins, immunoglobulin chains, or fragments thereof (such as Fv, Fab, Fab', F(ab')$_2$ or other antigen-binding sequences of antibodies) that contain minimal sequence of non-feline immunoglobulin. Felinized antibodies can include feline immunoglobulins (recipient antibody) in which residues from a CDR of the recipient are substituted by residues from a CDR of a non-feline species (donor antibody) such as mouse, rat, or rabbit having the desired specificity, affinity, and capacity. In some instances, Fv framework region (FR) residues of the feline immunoglobulin are replaced by corresponding non-feline residues. Furthermore, the felinized antibody can comprise residues that are found neither in the recipient antibody nor in the imported CDR or framework sequences, but are included to further refine and optimize antibody performance.

In some embodiments, at least one amino acid residue in a portion of a mouse variable heavy chain or a mouse variable light chain has been replaced with the corresponding amino acid from a feline variable region. In some embodiments, the modified chain is fused to a feline constant heavy chain or a canine constant light chain. In some embodiments, an anti-IL31 antibody is a felinized antibody comprising (a) a light chain sequence of SEQ ID NO: 32, (b) a light chain sequence of SEQ ID NO: 34, (c) a heavy chain sequence of SEQ ID NO: 33, or (d) a heavy chain sequence of SEQ ID NO: 35.

An "equinized antibody" means an antibody in which at least one amino acid in a portion of a non-equine variable region has been replaced with the corresponding amino acid from an equine variable region. In some embodiments, an equinized antibody comprises at least one equine constant region (e.g., a γ constant region, an a constant region, a δ constant region, an ε constant region, a constant region, or etc.) or fragment thereof. In some embodiments, an equinized antibody is an antibody fragment, such as Fab, scFv, (Fab')$_2$, etc. The term "equinized" also denotes forms of non-equine (for example, murine) antibodies that are chimeric immunoglobulins, immunoglobulin chains, or fragments thereof (such as Fv, Fab, Fab', F(ab')$_2$ or other antigen-binding sequences of antibodies) that contain minimal sequence of non-equine immunoglobulin. Equinized antibodies can include equine immunoglobulins (recipient antibody) in which residues from a CDR of the recipient are substituted by residues from a CDR of a non-equine species (donor antibody) such as mouse, rat, or rabbit having the desired specificity, affinity, and capacity. In some instances, Fv framework region (FR) residues of the equine immunoglobulin are replaced by corresponding non-equine residues. Furthermore, the equinized antibody can comprise residues that are found neither in the recipient antibody nor in the imported CDR or framework sequences, but are included to further refine and optimize antibody performance.

In some embodiments, at least one amino acid residue in a portion of a mouse variable heavy chain or a mouse variable light chain has been replaced with the corresponding amino acid from an equine variable region. In some embodiments, the modified chain is fused to an equine constant heavy chain or a canine constant light chain.

The term "IgX Fc" means the Fc region is derived from a particular antibody isotype (e.g., IgG, IgA, IgD, IgE, IgM, etc.), where "X" denotes the antibody isotype. Thus, "IgG Fc" denotes the Fc region of a γ chain, "IgA Fc" denotes the Fc region of an a chain, "IgD Fc" denotes the Fc region of a δ chain, "IgE Fc" denotes the Fc region of an ε chain, "IgM Fc" denotes the Fc region of a μ chain, etc. In some embodiments, the IgG Fc region comprises CH1, hinge, CH2, CH3, and CL1. "IgX—N-Fc" denotes that the Fc region is derived from a particular subclass of antibody isotype (such as canine IgG subclass A, B, C, or D; feline IgG subclass 1, 2a, or 2b; or equine IgG subclass IgG1, IgG2, IgG3, IgG4, IgG5, IgG6, or IgG7, etc.), where "N" denotes the subclass. In some embodiments, IgX Fc or IgX—N-Fc regions are derived from a companion animal, such as a dog, a cat, or a horse. In some embodiments, IgG Fc regions are isolated from canine γ heavy chains, such as IgG-A, IgG-B, IgG-C, or IgG-D. In some instances, IgG Fc regions are isolated from feline γ heavy chains, such as IgG1, IgG2a, or IgG2b. Antibodies comprising an Fc region of IgG-A, IgG-B, IgG-C, or IgG-D may provide for higher expression levels in recombination production systems.

The term "affinity" means the strength of the sum total of noncovalent interactions between a single binding site of a molecule (for example, an antibody) and its binding partner (for example, an antigen). The affinity of a molecule X for its partner Y can generally be represented by the dissociation constant (K D). Affinity can be measured by common methods known in the art, such as, for example, immunoblot, ELISA KD, KinEx A, biolayer interferometry (BLI), or surface plasmon resonance devices.

The terms "$K_D$," "$K_d$," "Kd" or "Kd value" as used interchangeably to refer to the equilibrium dissociation constant of an antibody-antigen interaction. In some embodiments, the $K_d$ of the antibody is measured by using biolayer interferometry assays using a biosensor, such as an Octet® System (Pall ForteBio LLC, Fremont, Calif) according to the supplier's instructions. Briefly, biotinylated antigen is bound to the sensor tip and the association of antibody is monitored for ninety seconds and the dissociation is monitored for 600 seconds. The buffer for dilutions and binding steps is 20 mM phosphate, 150 mM NaCl, pH 7.2. A buffer only blank curve is subtracted to correct for any drift. The data are fit to a 2:1 binding model using ForteBio data analysis software to determine association rate constant ($k_{on}$), dissociation rate constant ($k_{off}$), and the $K_d$. The equilibrium dissociation constant (K d) is calculated as the ratio of k off/k on. The term "k on" refers to the rate constant for association of an antibody to an antigen and the term "koff" refers to the rate constant for dissociation of an antibody from the antibody/antigen complex.

The term "binds" to an antigen or epitope is a term that is well understood in the art, and methods to determine such binding are also well known in the art. A molecule is said to exhibit "binding" if it reacts, associates with, or has affinity for a particular cell or substance and the reaction, association, or affinity is detectable by one or more methods known in the art, such as, for example, immunoblot, ELISA $K_D$, KinEx A, biolayer interferometry (BLI), surface plasmon resonance devices, or etc.

"Surface plasmon resonance" denotes an optical phenomenon that allows for the analysis of real-time biospecific interactions by detection of alterations in protein concentrations within a biosensor matrix, for example using the BIAcore™ system (BIAcore International AB, a GE Healthcare company, Uppsala, Sweden and Piscataway, N.J.). For further descriptions, see Jonsson et al. (1993) Ann. Biol. Clin. 51: 19-26.

"Biolayer interferometry" refers to an optical analytical technique that analyzes the interference pattern of light reflected from a layer of immobilized protein on a biosensor tip and an internal reference layer. Changes in the number of molecules bound to the biosensor tip cause shifts in the interference pattern that can be measured in real-time. A nonlimiting exemplary device for biolayer interferometry is an Octet® system (Pall ForteBio LLC). See, e.g., Abdiche et al., 2008, Anal. Biochem. 377: 209-277.

In some embodiments, an anti-IL31 antibody binds to canine IL31, feline IL31, or equine IL31 with a dissociation constant (Kd) of less than $5\times10^{-6}$ M, less than $1\times10^{-6}$ M, less than $5\times10^{-7}$ M, less than $1\times10^{-7}$ M, less than $5\times10^{-8}$ M, less than $1\times10^{-8}$ M, less than $5\times10^{-9}$ M, less than $1\times10^{-9}$ M, less than $5\times10^{-10}$ M, less than $1\times10^{-10}$ M, less than $5\times10^{-11}$ M, less than $1\times10^{-11}$ M, less than $5\times10^{-12}$ M, or less than $1\times10^{-12}$ M, as measured by biolayer interferometry. In some embodiments, an anti-IL31 antibody binds to canine IL31, feline IL31, or equine IL31 with a Kd of between $5\times10^{-6}$ M and $1\times10^{-6}$ M, between $5\times10^{-6}$ M and $5\times10^{-7}$ M, between $5\times10^{-6}$ M and $1\times10^{-7}$ M, between $5\times10^{-6}$ M and $5\times10^{-8}$ M, $5\times10^{-6}$ M and $1\times10^{-8}$ M, between $5\times10^{-6}$ M and $5\times10^{-9}$ M, between $5\times10^{-6}$ M and $1\times10^{-9}$ M, between $5\times10^{-6}$ M and $5\times10^{-10}$ M, between $5\times10^{-6}$ M and $1\times10^{-10}$ M, between $5\times10^{-6}$ M and $5\times10^{-11}$ M, between $5\times10^{-6}$ M and $1\times10^{-11}$ M, between $5\times10^{-6}$ M and $5\times10^{-12}$ M, between $5\times10^{-6}$ M and $1\times10^{-12}$ M, between $1\times10^{-6}$ M and $5\times10^{-7}$ M, between $1\times10^{-6}$ M and $1\times10^{-7}$ M, between $1\times10^{-6}$ M and $5\times10^{-8}$ M, $1\times10^{-6}$ M and $1\times10^{-8}$ M, between $1\times10^{-6}$ M and $5\times10^{-9}$ M, between $1\times10^{-6}$ M and $1\times10^{-9}$ M, between $1\times10^{-6}$ M and $5\times10^{-10}$ M, between $1\times10^{-6}$ M and $1\times10^{-10}$ M, between $1\times10^{-6}$ M and $5\times10^{-11}$ M, between $1\times10^{-6}$ M and $1\times10^{-11}$ M, between $1\times10^{-6}$ M and $5\times10^{-12}$ M, between $1\times10^{-6}$ M and $1\times10^{-12}$ M, between $5\times10^{-7}$ M and $1\times10^{-7}$ M, between $5\times10^{-7}$ M and $5\times10^{-8}$ M, $5\times10^{-7}$ M and $1\times10^{-8}$ M, between $5\times10^{-7}$ M and $5\times10^{-9}$ M, between $5\times10^{-7}$ M and $1\times10^{-9}$ M, between $5\times10^{-7}$ M and $5\times10^{-10}$ M, between $5\times10^{-7}$ M and $1\times10^{-10}$ M, between $5\times10^{-7}$ M and $5\times10^{-11}$ M, between $5\times10^{-7}$ M and $1\times10^{-11}$ M, between $5\times10^{-7}$ M and $5\times10^{-12}$ M, between $5\times10^{-7}$ M and $1\times10^{-12}$ M, between $1\times10^{-7}$ M and $5\times10^{-8}$ M, $1\times10^{-7}$ M and $1\times10^{-8}$ M, between $1\times10^{-7}$ M and $5\times10^{-9}$ M, between $1\times10^{-7}$ M and $1\times10^{-9}$ M, between $1\times10^{-7}$ M and $5\times10^{-10}$ M, between $1\times10^{-7}$ M and $1\times10^{-10}$ M, between $1\times10^{-7}$ M and $5\times10^{-1}$ M, between $1\times10^{-7}$ M and $1\times10^{-11}$ M, between $1\times10^{-7}$ M and $5\times10^{-12}$ M, between $1\times10^{-7}$ M and $1\times10^{-12}$ M, between $5\times10^{-8}$ M and $1\times10^{-8}$ M, between $5\times10^{-8}$ M and $5\times10^{-9}$ M, between $5\times10^{-8}$ M and $1\times10^{-9}$ M, between $5\times10^{-8}$ M and $5\times10^{-10}$ M, between $5\times10^{-8}$ M and $1\times10^{-10}$ M, between $5\times10^{-8}$ M and $5\times10^{-11}$ M, between $5\times10^{-8}$ M and $1\times10^{-11}$ M, between $5\times10^{-8}$ M and $5\times10^{-12}$ M, between $5\times10^{-8}$ M and $1\times10^{-12}$ M, $1\times10^{-8}$ M and $5\times10^{-9}$ M, between $1\times10^{-8}$ M and $1\times10^{-9}$ M, between $1\times10^{-8}$ M and $5\times10^{-10}$ M, between $1\times10^{-8}$ M and $1\times10^{-10}$ M, between $1\times10^{-8}$ M and $5\times10^{-11}$ M, between $1\times10^{-8}$ M and $1\times10^{-11}$ M, between $1\times10^{-8}$ M and $5\times10^{-12}$ M, between $1\times10^{-8}$ M and $1\times10^{-12}$ M, between $5\times10^{-9}$ M and $1\times10^{-9}$ M, between $5\times10^{-9}$ M and $5\times10^{-10}$ M, between $5\times10^{-9}$ M and $1\times10^{-10}$ M, between $5\times10^{-9}$ M and $5\times10^{-11}$ M, between $5\times10^{-9}$ M and $1\times10^{-11}$ M, between $5\times10^{-9}$ M and $5\times10^{-12}$ M, between $5\times10^{-9}$ M and $1\times10^{-12}$ M, between $1\times10^{-9}$ M and $5\times10^{-10}$ M, between $1\times10^{-9}$ M and $1\times10^{-10}$ M, between $1\times10^{-9}$ M and $5\times10^{-11}$ M, between $1\times10^{-9}$ M and $1\times10^{-11}$ M, between $1\times10^{-9}$ M and $5\times10^{-12}$ M, between $1\times10^{-9}$ M and $1\times10^{-12}$ M, between $5\times10^{-10}$ M and $1\times10^{-10}$ M, between $5\times10^{-10}$ M and $5\times10^{-11}$ M, between, $1\times10^{-10}$ M and $5\times10^{-11}$ M, $1\times10^{-10}$ M and $1\times10^{-11}$ M, between $1\times10^{-10}$ M and $5\times10^{-12}$ M, between $1\times10^{-10}$ M and $1\times10^{-12}$ M, between $5\times10^{-11}$ M and $1\times10^{-12}$ M, between $5\times10^{-11}$ M and $5\times10^{-12}$ M, between $5\times10^{-11}$ M and $1\times10^{-12}$ M, between $1\times10^{-11}$ M and $5\times10^{-12}$ M, or between $1\times10^{-11}$ M and $1\times10^{-12}$ M, as measured by biolayer interferometry. In some embodiments, an anti-IL31 antibody binds to canine IL31, feline IL31, or equine IL31, as determined by immunoblot analysis.

In some embodiments, an anti-IL31 antibody does not bind to human IL31 as determined by immunoblot analysis and/or biolayer interferometry.

In some embodiments, an anti-IL31 antibody is provided that competes with an anti-IL31 antibody described herein (such as M14, M18, M19, or M87) for binding to IL31. In some embodiments, an antibody that competes with binding with any of the antibodies provided herein can be made or used. In some embodiments, an anti-IL31 antibody is provided that competes with monoclonal M14 antibody in binding to canine IL31 or feline IL31.

A "variant" means a biologically active polypeptide having at least about 50% amino acid sequence identity with the native sequence polypeptide after aligning the sequences and introducing gaps, if necessary, to achieve the maximum percent sequence identity, and not considering any conservative substitutions as part of the sequence identity. Such variants include, for instance, polypeptides wherein one or more amino acid residues are added, deleted, at the N- or C-terminus of the polypeptide.

In some embodiments, a variant has at least about 50% amino acid sequence identity, at least about 60% amino acid sequence identity, at least about 65% amino acid sequence identity, at least about 70% amino acid sequence identity, at least about 75% amino acid sequence identity, at least about 80% amino acid sequence identity, at least about 85% amino acid sequence identity, at least about 90% amino acid sequence identity, at least about 95% amino acid sequence identity with the native sequence polypeptide.

As used herein, "percent (%) amino acid sequence identity" and "homology" with respect to a peptide, polypeptide, or antibody sequence are defined as the percentage of amino acid residues in a candidate sequence that are identical with the amino acid residues in the specific peptide or polypeptide sequence, after aligning the sequences and introducing gaps, if necessary to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN, or MEGALINE™ (DNASTAR) software. Those skilled in the art can determine appropriate parameters for measuring alignment, including any algorithms needed to achieve maximal alignment over the full length of sequences being compared.

An amino acid substitution may include but is not limited to the replacement of one amino acid in a polypeptide with another amino acid. Exemplary substitutions are shown in Table 2. Amino acid substitutions may be introduced into an antibody of interest and the products screened for a desired activity, for example, retained/improved antigen binding, decreased immunogenicity, or improved ADCC or CDC.

TABLE 2

| Original Residue | Exemplary Substitutions |
|---|---|
| Ala (A) | Val; Leu; Ile |
| Arg (R) | Lys; Gln; Asn |
| Asn (N) | Gln; His; Asp; Lys; Arg |
| Asp (D) | Glu; Asn |
| Cys (C) | Ser; Ala |
| Gln (Q) | Asn; Glu |
| Glu (E) | Asp; Gln |
| Gly (G) | Ala |
| His (H) | Asn; Gln; Lys; Arg |
| Ile (I) | Leu; Val; Met; Ala; Phe; Norleucine |
| Leu (L) | Norleucine; Ile; Val; Met; Ala; Phe |
| Lys (K) | Arg; Gln; Asn |
| Met (M) | Leu; Phe; Ile |
| Phe (F) | Trp; Leu; Val; Ile; Ala; Tyr |
| Pro (P) | Ala |
| Ser (S) | Thr |
| Thr (T) | Val; Ser |
| Trp (W) | Tyr; Phe |
| Tyr (Y) | Trp; Phe; Thr; Ser |
| Val (V) | Ile; Leu; Met; Phe; Ala; Norleucine |

Amino acids may be grouped according to common side-chain properties:
(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.
(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

Non-conservative substitutions will entail exchanging a member of one of these classes with another class.

In some embodiments, an anti-IL31 antibody comprises a heavy chain and a light chain, wherein:
a. the heavy chain comprises a CDR-H1 sequence having at least 85% sequence identity, at least 90% sequence identity, at least 95% sequence identity, or at least 98% sequence identity to the amino acid sequence of SEQ ID NO: 1; a CDR-H2 sequence having at least 85% sequence identity, at least 90% sequence identity, at least 95% sequence identity, or at least 98% sequence identity to the amino acid sequence of SEQ ID NO: 2, SEQ ID NO: 62, SEQ ID NO: 89, or SEQ ID NO: 87; and a CDR-H3 sequence having at least 85% sequence identity, at least 90% sequence identity, at least 95% sequence identity, or at least 98% sequence identity to the amino acid sequence of SEQ ID NO: 3, and
b. the light chain comprises a CDR-L1 sequence having at least 85% sequence identity, at least 90% sequence identity, at least 95% sequence identity, or at least 98% sequence identity to the amino acid sequence of SEQ ID NO: 8 or SEQ ID NO: 63; a CDR-L2 sequence having at least 85% sequence identity, at least 90% sequence identity, at least 95% sequence identity, or at least 98% sequence identity to the amino acid sequence of SEQ ID NO: 9; and a CDR-L3 sequence having at least 85% sequence identity, at least 90% sequence identity, at least 95% sequence identity, or at least 98% sequence identity to the amino acid sequence of SEQ ID NO: 10.

In some embodiments, an anti-IL31 antibody comprises a heavy chain and a light chain, wherein:
a. (i) a variable light chain sequence having at least 85%, at least 90%, at least 95%, or at least 98% sequence identity to the amino acid sequence of SEQ ID NO: 24; (ii) a variable heavy chain sequence having at least 85%, at least 90%, at least 95%, or at least 98% sequence identity to the amino acid sequence of SEQ ID NO: 25; or (iii) a variable light chain sequence as in (i) and a variable heavy chain sequence as in (ii); or
b. (i) a variable light chain sequence having at least 85%, at least 90%, at least 95%, or at least 98% sequence identity to the amino acid sequence of SEQ ID NO: 16; (ii) a variable heavy chain sequence having at least 85%, at least 90%, at least 95%, or at least 98% sequence identity to the amino acid sequence of SEQ ID NO: 15; or (iii) a variable light chain sequence as in (i) and a variable heavy chain sequence as in (ii); or
c. (i) a variable light chain sequence having at least 85%, at least 90%, at least 95%, or at least 98% sequence identity to the amino acid sequence of SEQ ID NO: 32; (ii) a variable heavy chain sequence having at least 85%, at least 90%, at least 95%, or at least 98% sequence identity to the amino acid sequence of SEQ ID NO: 33; or (iii) a variable light chain sequence as in (i) and a variable heavy chain sequence as in (ii); or
d. (i) a variable light chain sequence having at least 85%, at least 90%, at least 95%, or at least 98% sequence identity to the amino acid sequence of SEQ ID NO: 64; (ii) a variable heavy chain sequence having at least 85%, at least 90%, at least 95%, or at least 98% sequence identity to the amino acid sequence of SEQ ID NO: 67; or (iii) a variable light chain sequence as in (i) and a variable heavy chain sequence as in (ii); or
e. (i) a variable light chain sequence having at least 85%, at least 90%, at least 95%, or at least 98% sequence identity to the amino acid sequence of SEQ ID NO: 65; (ii) a variable heavy chain sequence having at least 85%, at least 90%, at least 95%, or at least 98% sequence identity to the amino acid sequence of SEQ ID NO: 68; or (iii) a variable light chain sequence as in (i) and a variable heavy chain sequence as in (ii); or
f. (i) a variable light chain sequence having at least 85%, at least 90%, at least 95%, or at least 98% sequence identity to the amino acid sequence of SEQ ID NO: 66; (ii) a variable heavy chain sequence having at least 85%, at least 90%, at least 95%, or at least 98% sequence identity to the amino acid sequence of SEQ ID NO: 69; or (iii) a variable light chain sequence as in (i) and a variable heavy chain sequence as in (ii).

The term "vector" is used to describe a polynucleotide that can be engineered to contain a cloned polynucleotide or polynucleotides that can be propagated in a host cell. A vector can include one or more of the following elements: an origin of replication, one or more regulatory sequences (such as, for example, promoters or enhancers) that regulate the expression of the polypeptide of interest, or one or more selectable marker genes (such as, for example, antibiotic resistance genes and genes that can be used in colorimetric assays, for example, (β-galactosidase). The term "expression vector" refers to a vector that is used to express a polypeptide of interest in a host cell.

A "host cell" refers to a cell that may be or has been a recipient of a vector or isolated polynucleotide. Host cells may be prokaryotic cells or eukaryotic cells. Exemplary eukaryotic cells include mammalian cells, such as primate or non-primate animal cells; fungal cells, such as yeast; plant cells; and insect cells. Nonlimiting exemplary mammalian cells include, but are not limited to, NSO cells, PER.C6® cells (Crucell), 293 cells, and CHO cells, and their derivatives, such as 293-6E, DG44, CHO-S, and CHO-K cells. Host cells include progeny of a single host cell, and the progeny may not necessarily be completely identical (in morphology or in genomic DNA complement) to the original parent cell due to natural, accidental, or deliberate mutation. A host cell includes cells transfected in vivo with a polynucleotide(s) encoding an amino acid sequence(s) provided herein.

The term "isolated" as used herein refers to a molecule that has been separated from at least some of the components with which it is typically found in nature or produced. For example, a polypeptide is referred to as "isolated" when it is separated from at least some of the components of the cell in which it was produced. Where a polypeptide is secreted by a cell after expression, physically separating the supernatant containing the polypeptide from the cell that produced it is considered to be "isolating" the polypeptide. Similarly, a polynucleotide is referred to as "isolated" when it is not part of the larger polynucleotide (such as, for example, genomic DNA or mitochondrial DNA, in the case of a DNA polynucleotide) in which it is typically found in nature, or is separated from at least some of the components of the cell in which it was produced, for example, in the case of an RNA polynucleotide. Thus, a DNA polynucleotide that is contained in a vector inside a host cell may be referred to as "isolated." In some embodiments, the anti-IL31 antibody is purified using chromatography, such as size exclusion chromatography, ion exchange chromatography, protein A column chromatography, hydrophobic interaction chromatography, and CHT chromatography.

The term "companion animal species" refers to an animal suitable to be a companion to humans. In some embodiments, a companion animal species is a small mammal, such as a canine, feline, dog, cat, horse, rabbit, ferret, guinea pig, rodent, etc. In some embodiments, a companion animal species is a farm animal, such as a horse, cow, pig, etc.

The term "IL31 signaling function" refers to any one of or combination of the downstream activities that occurs when IL31 binds its receptor or receptor complex. In some embodiments, the IL31 signaling function comprises activation of Janus kinase (Jak) 1 or Jak 2 signaling molecules. In some embodiments, the IL31 signaling function comprises phosphorylation of STAT-3 or STAT-5 proteins. In some embodiments, the IL31 signaling function comprises activating the ERK1/2 MAP kinase signaling pathway. In some embodiments, the IL31 signaling function comprises activating the PI3K/AKT signaling pathway. In some embodiments, the IL31 signaling function comprises activating the Jak1/2 signaling pathway.

"STAT phosphorylation" means the post-expression modification of a STAT protein by phosphorylation. For example, "STAT-3 phosphorylation" refers to the phosphorylation of STAT-3 and "STAT-5 phosphorylation" refers to the phosphorylation of STAT-5. In some embodiments, the phosphorylation of STAT-3 is measured by immune-blot analysis. For example, cells (e.g., canine monocytic DH82 cells) are plated into a 96-well cell culture plate at a density of $1 \times 10^5$ cells per well in growth media (e.g., MEM, Life Technologies®) containing 15% heat-inactivated fetal bovine serum, 2 mmol/L GlutaMax, 1 mmol/L sodium pyruvate, and 10 nm/mL canine interferon-c (R&D Systems, Minneapolis, Minnesota, USA) for 24 hours at 37° C. in the presence of anti-IL31 antibody as described herein. Immuno-blot analysis of the cell lysate using anti-phospho STAT-3 and anti-STAT-3 antibodies (R&D Systems) were used to detect the concentration of phosphorylated STAT-3 and unphosphorylated STAT-3 relative to each other and compared to a beta-actin control. Methods for determining the concentration of proteins, either qualitatively or quantitatively, by immunoblot are understood by persons of skill in the art. In some embodiments, relative concentration is determined by qualitatively by visual inspection of the immunoblot. In some embodiments, the concentration of phosphorylated STAT-3 and unphosphorylated STAT-3 is quantitatively determined by digitally imaging an immunoblot, determining the intensity of the bands, and using a linear standard curve of known concentrations of STAT-3 protein to back calculate the concentration of phosphorylated or unphosporylated STAT-3 in a sample.

To "reduce" or "inhibit" means to decrease, reduce, or arrest an activity, function, or amount as compared to a reference. In some embodiments, by "reduce" or "inhibit" is meant the ability to cause an overall decrease of 20% or greater. In some embodiments, by "reduce" or "inhibit" is meant the ability to cause an overall decrease of 50% or greater. In some embodiments, by "reduce" or "inhibit" is meant the ability to cause an overall decrease of 75%, 85%, 90%, 95%, or greater. In some embodiments, the amount noted above is inhibited or decreased over a period of time, relative to a control dose (such as a placebo) over the same period of time. A "reference" as used herein, refers to any sample, standard, or level that is used for comparison purposes. A reference may be obtained from a healthy or non-diseased sample. In some examples, a reference is obtained from a non-diseased or non-treated sample of a companion animal. In some examples, a reference is obtained from one or more healthy animals of a particular species, which are not the animal being tested or treated.

The term "substantially reduced," as used herein, denotes a sufficiently high degree of reduction between a numeric value and a reference numeric value such that one of skill in the art would consider the difference between the two values to be of statistical significance within the context of the biological characteristic measured by said values. In some embodiments, the substantially reduced numeric values is reduced by greater than about any one of 10%, 15% 20%, 25%, 30%, 35%, 40%, 45%, 50%, 60%, 70%, 80%, 90%, or 100% compared to the reference value. In some embodiments, an IL31 antibody may reduce IL31 signaling function in a companion animal species by at least 10%, at least 15%, at least 20%, at least 25%, at least 30%, at least 35%, at least 40%, at least 45%, at least 50%, at least 60%, at least 70%, at least 80%, at least 90%, or 100% compared to IL31 signaling function in the absence of the antibody, as measured by a reduction in STAT-3 phosphorylation. In some embodiments, the reduction in IL31 signaling function or the reduction in STAT-3 phosphorylation is between 10% and 15%, between 10% and 20%, between 10% and 25%, between 10% and 30%, between 10% and 35%, between 10% and 40%, between 10% and 45%, between 10% and 50%, between 10% and 60%, between 10% and 70%, between 10% and 80%, between 10% and 90%, between 10% and 100%, between 15% and 20%, between 15% and 25%, between 15% and 30%, between 15% and 35%, between 15% and 40%, between 15% and 45%, between 15% and 50%, between 15% and 60%, between 15% and 70%, between 15% and 80%, between 15% and 90%, between 15% and 100%, between 20% and 25%, between 20% and 30%, between 20% and 35%, between 20% and 40%, between 20% and 45%, between 20% and 50%, between 20% and 60%, between 20% and 70%, between 20% and 80%, between 20% and 90%, between 20% and 100%, between 25% and 30%, between 25% and 35%, between 25% and 40%, between 25% and 45%, between 25% and 50%, between 25% and 60%, between 25% and 70%, between 25% and 80%, between 25% and 90%, between 25% and 100%, between 30% and 35%, between 30% and 40%, between 30% and 45%, between 30% and 50%, between 30% and 60%, between 30% and 70%, between 30% and 80%, between 30% and 90%, between 30% and 100%, between 35% and 40%, between 35% and 45%, between 35% and 50%, between 35% and 60%, between 35% and 70%, between 35% and 80%, between 35% and 90%, between 35% and 100%, between 40% and 45%, between 40% and 50%, between 40% and 60%, between 40% and 70%, between 40% and 80%, between 40% and 90%, between 40% and 100%, between 45% and 50%, between 45% and 60%, between 45% and 70%, between 45% and 80%, between 45% and 90%, between 45% and 100%, between 50% and 60%, between 50% and 70%, between 50% and 80%, between 50% and 90%, between 50% and 100%, between 60% and 70%, between 60% and 80%, between 60% and 90%, between 60% and 100%, between 70% and 80%, between 70% and 90%, between 70% and 100%, between 80% and 90%, between 80% and 100%, or between 90% and 100%.

Pharmaceutical Compositions

The terms "pharmaceutical formulation" and "pharmaceutical composition" refer to a preparation which is in such form as to permit the biological activity of the active ingredient(s) to be effective, and which contains no additional components that are unacceptably toxic to a subject to which the formulation would be administered.

A "pharmaceutically acceptable carrier" refers to a non-toxic solid, semisolid, or liquid filler, diluent, encapsulating material, formulation auxiliary, or carrier conventional in the art for use with a therapeutic agent that together comprise a "pharmaceutical composition" for administration to a subject. A pharmaceutically acceptable carrier is non-toxic to recipients at the dosages and concentrations employed and is compatible with other ingredients of the formulation. The pharmaceutically acceptable carrier is appropriate for the formulation employed. Examples of pharmaceutically acceptable carriers include alumina; aluminum stearate; lecithin; serum proteins, such as human serum albumin, canine or other animal albumin; buffers such as phosphate, citrate, tromethamine or HEPES buffers; glycine; sorbic acid; potassium sorbate; partial glyceride mixtures of saturated vegetable fatty acids; water; salts or electrolytes, such as protamine sulfate, disodium hydrogen phosphate, potassium hydrogen phosphate, sodium chloride, zinc salts, colloidal silica, or magnesium trisilicate; polyvinyl pyrrolidone, cellulose-based substances; polyethylene glycol; sucrose; mannitol; or amino acids including, but not limited to, arginine.

The pharmaceutical composition can be stored in lyophilized form. Thus, in some embodiments, the preparation process includes a lyophilization step. The lyophilized composition may then be reformulated, typically as an aqueous composition suitable for parenteral administration, prior to administration to the dog, cat, or horse. In other embodiments, particularly where the antibody is highly stable to thermal and oxidative denaturation, the pharmaceutical composition can be stored as a liquid, i.e., as an aqueous composition, which may be administered directly, or with appropriate dilution, to the dog, cat, or horse. A lyophilized composition can be reconstituted with sterile Water for Injection (WFI). Anti-bacterial agents (e.g, bacteriostatic reagents, such benzyl alcohol, may be included. Thus, the invention provides pharmaceutical compositions in solid or liquid form. The pH of the pharmaceutical compositions may be in the range of from about pH 5 to about pH 8, when administered. The compositions of the invention are sterile if they are to be used for therapeutic purposes. Sterility can be achieved by any of several means known in the art, including by filtration through sterile filtration membranes (e.g., 0.2 micron membranes). Sterility may be maintained with or without anti-bacterial agents.

In some embodiments, the pharmaceutically acceptable carrier or the pharmaceutical composition has a pH of from 5.0 to 6.2, from 5.0 to 6.0, or from 5.3 to 5.7. In some embodiments, the pharmaceutically acceptable carrier or the pharmaceutical composition has a pH of 5.0, 5.1, 5.2, 5.3, 5.4, 5.5, 5.6, 5.7, 5.8, 5.9, 6.0, 6.1, or 6.2

In some embodiments, the pharmaceutically acceptable carrier or the pharmaceutical composition comprises L-histidine, sodium chloride, and polysorbate 80.

In some embodiments, the pharmaceutically acceptable carrier or the pharmaceutical composition comprises sodium chloride at a concentration of from 80 nM to 200 nM, of from 100 nM to 180 nM, of from 100 nM to 175 nM, of from 110 nM to 170 nM, of from 120 nM to 160 nM, of from 120 nM to 150 nM, of from 130 nM to 150 nM, of from 130 nM to 160 nM, of 100 nM, of 80 nM, of 110 nM, of 120 nM, of 130 nM, of 140 nM, of 150 nM, of 160 nM, of 170 nM, of 180 nM, or of 200 nM.

In some embodiments, the pharmaceutically acceptable carrier or the pharmaceutical composition comprises polysorbate 80 at a concentration of from 0.005 mg/mL to 0.5 mg/mL, of from 0.01 mg/mL to 0.1 mg/mL, of from 0.1 mg/mL to 0.5 mg/mL, of from 0.005 mg/mL to 0.01 mg/mL, of 0.1 mg/mL, of 0.2 mg/mL, of 0.3 mg/mL, of 0.4 mg/mL, of 0.05 mg/mL, of 0.06 mg/mL, of 0.07 mg/mL, of 0.08 mg/mL, of 0.09 mg/mL, or of 0.1 mg/mL.

In some embodiments, the pharmaceutically acceptable carrier or the pharmaceutical composition comprises L-histidine at a concentration of from 5 mM to 100 mM, of from 10 mM to 50 mM, of from 20 mM to 30 mM, of from 10 mM to 30 mM, of from 20 mM to 80 mM, of from 30 mM to 70 mM, of from 40 mM to 60 mM, of 10 mM, of 15 mM, of 20 mM, of 25 mM, of 30 mM, of 40 mM, or of 50 mM.

In some embodiments, the pharmaceutically acceptable carrier or the pharmaceutical composition comprises m-cresol or benzyl alcohol. In some embodiments, the concentration of m-cresol is about 0.2%, of from about 0.1% to about 0.3%, of from about 0.08% to about 0.25%, or of from about 0.05% to about 0.25%. In some embodiments, the concentration of benzyl alcohol is about 1%, of from about 0.5% to about 2%, of from about 0.2% to about 2.5%, of about 1% to about 5%, of about 0.5% to about 5%, or of about 1% to about 3%.

In some embodiments, the pharmaceutically acceptable carrier or the pharmaceutical composition comprises a sugar. In some embodiments, the sugar is sucrose, trehalose, D-mannitol, maltose, and/or sorbitol. In some embodiments, the pharmaceutically acceptable carrier or the pharmaceutical composition comprises a sugar at a concentration of 0.5% to 20%, of from 1% to 10%, of from 1% to 5%, of from 1% to 3%, of 0.5%, of 1%, of 2%, of 3%, of 4%, of 5%, or of 10%.

In some embodiments, the pharmaceutically acceptable carrier or a pharmaceutical composition comprises an anti-bacterial agent. In some embodiments, the pharmaceutically acceptable carrier or pharmaceutical composition comprises m-cresol or methylparaben. In some embodiments, the pharmaceutically acceptable carrier or pharmaceutical composition comprises 0.2% m-cresol. In some embodiments, the pharmaceutically acceptable carrier or pharmaceutical composition comprises 0.9% methylparaben.

Uses of Antibodies and Pharmaceutical Compositions

The antibodies or pharmaceutical compositions comprising the antibodies of the invention may be useful for treating an IL-31-induced condition. As used herein, an "IL31-induced condition" means a disease associated with, caused by, or characterized by, elevated levels or altered gradients of IL31 concentration. Such IL31-induced conditions include, but are not limited to, a pruritic or an allergic disease. In some embodiments, the IL31-induced condition is atopic dermatitis, pruritus, asthma, psoriasis, scleroderma, or eczema. An IL31-induced condition may be exhibited in a companion animal, including, but not limited to, canine, feline, or equine.

As used herein, "treatment" is an approach for obtaining beneficial or desired clinical results. "Treatment" as used herein, covers any administration or application of a therapeutic for disease in a mammal, including a companion animal. For purposes of this disclosure, beneficial or desired clinical results include, but are not limited to, any one or more of: alleviation of one or more symptoms, diminishment of extent of disease, preventing or delaying spread of disease, preventing or delaying recurrence of disease, delay or slowing of disease progression, amelioration of the disease state, inhibiting the disease or progression of the disease, inhibiting or slowing the disease or its progression, arresting its development, and remission (whether partial or total). Also encompassed by "treatment" is a reduction of pathological consequence of a proliferative disease. The methods provided herein contemplate any one or more of these aspects of treatment. In-line with the above, the term treatment does not require one-hundred percent removal of all aspects of the disorder.

In some embodiments, an anti-IL31 antibody or pharmaceutical compositions comprising it can be utilized in accordance with the methods herein to treat IL31-induced conditions. In some embodiments, an anti-IL31 antibody or pharmaceutical compositions is administered to a companion animal, such as a canine, a feline, or equine, to treat an IL31-induced condition.

A "therapeutically effective amount" of a substance/molecule, agonist or antagonist may vary according to factors such as the type of disease to be treated, the disease state, the severity and course of the disease, the type of therapeutic purpose, any previous therapy, the clinical history, the response to prior treatment, the discretion of the attending veterinarian, age, sex, and weight of the animal, and the ability of the substance/molecule, agonist or antagonist to elicit a desired response in the animal. A therapeutically effective amount is also one in which any toxic or detrimental effects of the substance/molecule, agonist or antagonist are outweighed by the therapeutically beneficial effects. A therapeutically effective amount may be delivered in one or more administrations. A therapeutically effective amount refers to an amount effective, at dosages and for periods of time necessary, to achieve the desired therapeutic or prophylactic result.

In some embodiments, an anti-IL31 antibody or pharmaceutical composition comprising an anti-IL31 antibody is administered parenterally, by subcutaneous administration, intravenous infusion, or intramuscular injection. In some embodiments, an anti-IL31 antibody or pharmaceutical composition comprising an anti-IL31 antibody is administered as a bolus injection or by continuous infusion over a period of time. In some embodiments, an anti-IL31 antibody or pharmaceutical composition comprising an anti-IL31 antibody is administered by an intramuscular, an intraperitoneal, an intracerebrospinal, a subcutaneous, an intra-arterial, an intrasynovial, an intrathecal, or an inhalation route.

Anti-IL31 antibodies described herein may be administered in an amount in the range of 0.1 mg/kg body weight to 100 mg/kg body weight per dose. In some embodiments, anti-IL31 antibodies may be administered in an amount in the range of 0.5 mg/kg body weight to 50 mg/kg body weight per dose. In some embodiments, anti-IL31 antibodies may be administered in an amount in the range of 1 mg/kg body weight to 10 mg/kg body weight per dose. In some embodiments, anti-IL31 antibodies may be administered in an amount in the range of 0.5 mg/kg body weight to 100 mg/kg body, in the range of 1 mg/kg body weight to 100 mg/kg body weight, in the range of 5 mg/kg body weight to 100 mg/kg body weight, in the range of 10 mg/kg body weight to 100 mg/kg body weight, in the range of 20 mg/kg body weight to 100 mg/kg body weight, in the range of 50 mg/kg body weight to 100 mg/kg body weight, in the range of 1 mg/kg body weight to 10 mg/kg body weight, in the range of 5 mg/kg body weight to 10 mg/kg body weight, in the range of 0.5 mg/kg body weight to 10 mg/kg body weight, or in the range of 5 mg/kg body weight to 50 mg/kg body weight.

An anti-IL31 antibody or a pharmaceutical composition comprising an anti-IL31 antibody can be administered to a companion animal at one time or over a series of treatments. For example, an anti-IL31 antibody or a pharmaceutical composition comprising an anti-IL31 antibody may be administered at least once, more than once, at least twice, at least three times, at least four times, or at least five times.

In some embodiments, the dose is administered once per week for at least two or three consecutive weeks, and in some embodiments, this cycle of treatment is repeated two or more times, optionally interspersed with one or more weeks of no treatment. In other embodiments, the therapeutically effective dose is administered once per day for two to five consecutive days, and in some embodiments, this cycle of treatment is repeated two or more times, optionally interspersed with one or more days or weeks of no treatment. Administration "in combination with" one or more further therapeutic agents includes simultaneous (concurrent) and consecutive or sequential administration in any order. The term "concurrently" is used herein to refer to administration of two or more therapeutic agents, where at least part of the administration overlaps in time or where the administration of one therapeutic agent falls within a short period of time relative to administration of the other therapeutic agent. For example, the two or more therapeutic agents are administered with a time separation of no more than about a specified number of minutes. The term "sequentially" is used herein to refer to administration of two or more therapeutic agents where the administration of one or more agent(s) continues after discontinuing the administration of one or more other agent(s), or wherein administration of one or more agent(s) begins before the administration of one or more other agent(s). For example, administration of the two or more therapeutic agents are administered with a time separation of more than about a specified number of minutes. As used herein, "in conjunction with" refers to administration of one treatment modality in addition to another treatment modality. As such, "in conjunction with" refers to administration of one treatment modality before, during or after administration of the other treatment modality to the animal.

In some embodiments, the method comprises administering in combination with an anti-IL31 antibody or a pharmaceutical composition comprising an anti-IL31 antibody, a Jak inhibitor, a PI3K inhibitor, an AKT inhibitor, or a MAPK inhibitor. In some embodiments, the method comprises administering in combination with an anti-IL31 antibody or a pharmaceutical composition comprising an anti-IL31 antibody, an anti-IL17 antibody, an anti-TNFα antibody, an anti-CD20 antibody, an anti-CD19 antibody, an anti-CD25 antibody, an anti-IL4 antibody, an anti-IL13 antibody, an anti-IL23 antibody, an anti-IgE antibody, an anti-CD11a antibody, anti-IL6R antibody, anti-α4-Intergrin antibody, an anti-IL12 antibody, an anti-IL10 antibody, or an anti-BlyS antibody.

Provided herein are methods of exposing to a cell an anti-IL31 antibody or a pharmaceutical composition comprising an anti-IL31 antibody under conditions permissive for binding of the antibody to IL31. In some embodiments, the cell is exposed to the antibody or pharmaceutical composition ex vivo. In some embodiments, the cell is exposed to the antibody or pharmaceutical composition in vivo. In some embodiments, a cell is exposed to the anti-IL31 antibody or the pharmaceutical composition under conditions permissive for binding of the antibody to intracellular IL31. In some embodiments, a cell is exposed to the anti-IL31 antibody or the pharmaceutical composition under conditions permissive for binding of the antibody to extracellular IL31. In some embodiments, a cell may be exposed in vivo to the anti-IL31 antibody or the pharmaceutical composition by any one or more of the administration methods described herein, including but not limited to, intraperitoneal, intramuscular, intravenous injection into the subject. In some embodiments, a cell may be exposed ex vivo to the anti-IL31 antibody or the pharmaceutical composition by exposing the cell to a culture medium comprising the antibody or the pharmaceutical composition. In some embodiments, the permeability of the cell membrane may be affected by the use of any number of methods understood by those of skill in the art (such as electroporating the cells or exposing the cells to a solution containing calcium chloride) before exposing the cell to a culture medium comprising the antibody or the pharmaceutical composition.

In some embodiments, the binding results in a reduction of IL31 signaling function by the cell. In some embodiments, an IL31 antibody may reduce IL31 signaling function in a cell by at least 10%, at least 15%, at least 20%, at least 25%, at least 30%, at least 35%, at least 40%, at least 45%, at least 50%, at least 60%, at least 70%, at least 80%, at least 90%, or 100% compared to IL31 signaling function in the absence of the antibody, as measured by a reduction in STAT-3 phosphorylation. In some embodiments, the reduction in IL31 signaling function or the reduction in STAT-3 phosphorylation is between 10% and 15%, between 10% and 20%, between 10% and 25%, between 10% and 30%, between 10% and 35%, between 10% and 40%, between 10% and 45%, between 10% and 50%, between 10% and 60%, between 10% and 70%, between 10% and 80%, between 10% and 90%, between 10% and 100%, between 15% and 20%, between 15% and 25%, between 15% and 30%, between 15% and 35%, between 15% and 40%, between 15% and 45%, between 15% and 50%, between 15% and 60%, between 15% and 70%, between 15% and 80%, between 15% and 90%, between 15% and 100%, between 20% and 25%, between 20% and 30%, between 20% and 35%, between 20% and 40%, between 20% and 45%, between 20% and 50%, between 20% and 60%, between 20% and 70%, between 20% and 80%, between 20% and 90%, between 20% and 100%, between 25% and 30%, between 25% and 35%, between 25% and 40%, between 25% and 45%, between 25% and 50%, between 25% and 60%, between 25% and 70%, between 25% and 80%, between 25% and 90%, between 25% and 100%, between 30% and 35%, between 30% and 40%, between 30% and 45%, between 30% and 50%, between 30% and 60%, between 30% and 70%, between 30% and 80%, between 30% and 90%, between 30% and 100%, between 35% and 40%, between 35% and 45%, between 35% and 50%, between 35% and 60%, between 35% and 70%, between 35% and 80%, between 35% and 90%, between 35% and 100%, between 40% and 45%, between 40% and 50%, between 40% and 60%, between 40% and 70%, between 40% and 80%, between 40% and 90%, between 40% and 100%, between 45% and 50%, between 45% and 60%, between 45% and 70%, between 45% and 80%, between 45% and 90%, between 45% and 100%, between 50% and 60%, between 50% and 70%, between 50% and 80%, between 50% and 90%, between 50% and 100%, between 60% and 70%, between 60% and 80%, between 60% and 90%, between 60% and 100%, between 70% and 80%, between 70% and 90%, between 70% and 100%, between 80% and 90%, between 80% and 100%, or between 90% and 100%.

Provided herein are methods of using the anti-IL31 antibodies, polypeptides and polynucleotides for detection, diagnosis and monitoring of an IL31-induced condition. Provided herein are methods of determining whether a companion animal will respond to anti-IL31 antibody therapy. In some embodiments, the method comprises detecting whether the animal has cells that express IL31 using an anti-IL31 antibody. In some embodiments, the method of detection comprises contacting the sample with an antibody, polypeptide, or polynucleotide and determining whether the level of binding differs from that of a reference or comparison sample (such as a control). In some embodiments, the method may be useful to determine whether the antibodies or polypeptides described herein are an appropriate treatment for the subject animal.

In some embodiments, the sample is a biological sample. The term "biological sample" means a quantity of a substance from a living thing or formerly living thing. In some embodiments, the biological sample is a cell or cell/tissue lysate. In some embodiments, the biological sample includes, but is not limited to, blood, (for example, whole blood), plasma, serum, urine, synovial fluid, and epithelial cells.

In some embodiments, the cells or cell/tissue lysate are contacted with an anti-IL31 antibody and the binding between the antibody and the cell is determined. When the test cells show binding activity as compared to a reference cell of the same tissue type, it may indicate that the subject would benefit from treatment with an anti-IL31 antibody. In some embodiments, the test cells are from tissue of a companion animal.

Various methods known in the art for detecting specific antibody-antigen binding can be used. Exemplary immunoassays which can be conducted include fluorescence polarization immunoassay (FPIA), fluorescence immunoassay (FIA), enzyme immunoassay (EIA), nephelometric inhibition immunoassay (NIA), enzyme linked immunosorbent assay (ELISA), and radioimmunoassay (RIA). An indicator moiety, or label group, can be attached to the subject antibodies and is selected so as to meet the needs of various uses of the method which are often dictated by the availability of assay equipment and compatible immunoassay procedures. Appropriate labels include, without limitation, radionuclides (for example $^{125}$I, $^{131}$I, $^{35}$S, $^{3}$H, or $^{32}$P), enzymes (for example, alkaline phosphatase, horseradish peroxidase, luciferase, or p-glactosidase), fluorescent moieties or proteins (for example, fluorescein, rhodamine, phycoerythrin, GFP, or BFP), or luminescent moieties (for example, Qdot™ nanoparticles supplied by the Quantum Dot Corporation, Palo Alto, Calif). General techniques to be used in performing the various immunoassays noted above are known to those of ordinary skill in the art.

For purposes of diagnosis, the polypeptide including antibodies can be labeled with a detectable moiety including but not limited to radioisotopes, fluorescent labels, and various enzyme-substrate labels know in the art. Methods of conjugating labels to an antibody are known in the art. In some embodiments, the anti-IL31 antibodies need not be labeled, and the presence thereof can be detected using a second labeled antibody which binds to the first anti-IL31 antibody. In some embodiments, the anti-IL31 antibody can be employed in any known assay method, such as competitive binding assays, direct and indirect sandwich assays, and immunoprecipitation assays. Zola, Monoclonal Antibodies: A Manual of Techniques, pp. 147-158 (CRC Press, Inc. 1987). The anti-IL31 antibodies and polypeptides can also be used for in vivo diagnostic assays, such as in vivo imaging. Generally, the antibody or the polypeptide is labeled with a radionuclide (such as $^{111}$In, $^{99}$Tc, $^{14}$C, $^{131}$I, $^{125}$I, $^{3}$H, or any other radionuclide label, including those outlined herein) so that the cells or tissue of interest can be localized using immunoscintiography. The antibody may also be used as staining reagent in pathology using techniques well known in the art.

In some embodiments, a first antibody is used for a diagnostic and a second antibody is used as a therapeutic. In some embodiments, the first and second antibodies are different. In some embodiments, the first and second antibodies can both bind to the antigen at the same time, by binding to separate epitopes.

The following examples illustrate particular aspects of the disclosure and are not intended in any way to limit the disclosure.

EXAMPLES

Example 1: Identification of Mouse Monoclonal Antibodies that Bind to Canine IL31

Canine IL31 gene encoding IL31 protein (SEQ ID NO: 22) was synthesized with poly-His tag on the C-terminal and cloned into a mammalian expression vector. The plasmid that carries canine IL31 gene was transfected to 293 cells.

The supernatant containing canine IL31 protein was collected and filtered. Canine IL31 was affinity purified using Ni-NTA column (CaptivA® Protein A Affinity Resin, Repligen).

Mouse monoclonal antibodies were identified using standard immunization using canine IL31 produced by 293 cells as immunogen. Two different adjuvants were used during immunizations (Antibody Solutions, Sunnyvale, Calif.) and monoclonal antibodies were obtained through standard hybridoma technology. Enzyme linked immunosorbent assay (ELISA) was developed to screen the clones that produce IL31 binding antibodies. First canine IL31 was biotinylated and then it was introduced to streptavidin-coated wells. Immunized serum was then added to the wells followed by washing and detection with HRP-conjugated anti-mouse antibodies. The presence of canine IL31 binding antibody developed a positive signal. Of the thousands of clones tested by ELISA, 170 clones having the highest binding affinity based on signal intensity were selected for further testing by biosensor assay (Forte Bio Octet). Biotinylated canine IL31 was bound to the sensor tip and hybridoma clone supernatants containing anti-canine IL31 antibodies were selected based on a slow off-rate (the rate of dissociation between antibody and ligand). The binding affinity of the top 19 candidates were measured at single concentration and reported as the equilibrium dissociation constant (Kd) after the antibody concentrations were measured by protein A titer assay using Biosensor Octet. The Kds of the top 19 candidates were each less than 10 nM.

Furthermore, each of the 170 clones having high binding activity based on ELISA was tested for neutralization activity. The cell-based functional assay described below in Example 4, was performed to assess activity of the top candidates in reducing canine IL31-mediated pSTAT signaling using canine DH82 cells. Four top clones (M14, M18, M19, and M87) were selected for further investigation. Notably, the majority of the high affinity binders identified by ELISA were not functional.

Example 2: Identification of DNA Sequences Encoding VH and VL of Monoclonal Antibodies Hybridoma cells producing M14, M18, M19 and M87 were pelleted. RNA was extracted and oligonucleotide primers for amplifying mouse immunoglobulin (Ig) variable domains were used to obtain cDNA using standard techniques. The variable heavy chain (VH) and variable light chain (VL) of each of the four clones were sequenced and analyzed by sequence alignment (FIG. 1; SEQ ID NOs 36 to 43). Notably, three of the four active antibodies (M14, M18, and M19) share the same six CDR sequences, with the exception that CDR-L1 of M18 has an isoleucine at position 14 (SEQ ID NO: 63), where M14 and M19 have a methionine at position 14 (SEQ ID NO: 8), and CDR-H2 of M18 has a tyrosine at position 9 (SEQ ID NO: 62 and SEQ ID NO: 87), where M14 and M19 have a asparatic acid at position 14 (SEQ ID NO: 2 and SEQ ID NO: 89). The similarity in CDR sequences suggests that M14, M18, and M19 share a common epitope.

Example 3: Expression and Purification of Murine-Canine Chimeric and Caninized IL31-mAb M14 from CHO Cells DNA sequences encoding a chimeric antibody were designed for a fusion of murine M14 VH (SEQ ID NO: 25) and murine VL (SEQ ID NO: 24) to canine constant heavy chain and canine constant light chain. The nucleotide sequences were synthesized chemically and inserted into an expression vector suitable for transfection into a CHO host cell. After transfection into CHO cells, the light chain or heavy chain protein or both were secreted from the cell. For example, chimeric M14 that uses canine IgG-B was purified by single step Protein A column chromatography.

Murine M14 VH and VL were caninized by searching and selecting proper canine germline antibody sequences as a template for CDR grafting, followed by protein modeling. Caninized M14 IgG-B (SEQ ID NO: 18 and SEQ ID NO: 21) was readily expressed and purified in a single step with a protein A column or other chromatographic methods, such as ion exchange column chromatography, hydrophobic interaction column chromatography, mixed mode column chromatography such as CHT, or multimodal mode column chromatography such as CaptoMMC. Low pH or other viral inactivation and viral removal steps can be applied. The purified protein is admixed with excipients, and sterilized by filtration to prepare a pharmaceutical composition of the invention. The pharmaceutical composition is administered to a dog with an atopic dermatitis in an amount sufficient to bind to inhibit IL31.

The vectors were then used to perform pilot-scale transfection in CHO-S cells using the FreestyleMax™ transfection reagent (Life Technologies). The supernatant was harvested by clarifying the conditioned media. Protein was purified with a single pass Protein A chromatography step and used for further investigation.

Example 4: Demonstration of IL31 Binding Activity

This example demonstrates that antibodies of the invention, illustrated with the chimeric M14 (SEQ ID NO:26 and SEQ ID NO:27) and caninized M14 (SEQ ID NO: 18 and SEQ ID NO:21) bind canine IL31 with kinetics requisite for therapeutic activity.

The binding analysis was performed using a biosensor Octet as follows. Briefly, canine IL31 was biotinylated at primary amine groups using EZ-Link™ NHS-LC-Biotin (Thermo Scientific, Catalog No. 21336) or at glycan groups using EZ-Link™ Biotin-LC-Hydrazide (ThermoFisher Scientific, Catalog No. 21340) according to the manufacturer's instructions. The free unreacted biotin was removed from biotinylated IL31 by extensive dialysis. Biotinylated canine IL31 was captured on streptavidin sensor tips. The association of four different concentrations (400, 200, 66.6, and 33 nM) of chimeric and caninized M14 antibody and human and canine IL31 (amine-conjugated-biotin) and the association of 100 nM of caninized M14 antibody and canine IL31 (glycan-conjugated-biotin) was monitored for ninety seconds. Dissociation was monitored for 600 seconds. A buffer only blank curve was subtracted to correct for any drift. The data were fit to a 2:1 binding model using ForteBio™ data analysis software to determine the $k_{on}$, $k_{off}$ and the Kd. The buffer for dilutions and all binding steps was: 20 mM phosphate, 150 mM NaCl, pH 7.2.

Figure 2B:
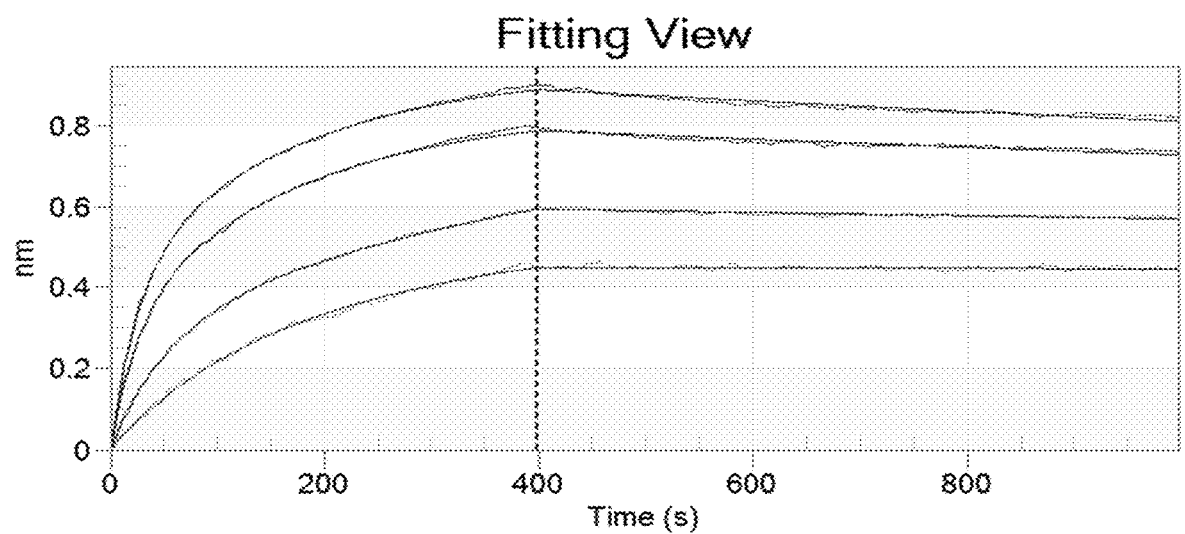
Figure 3A:
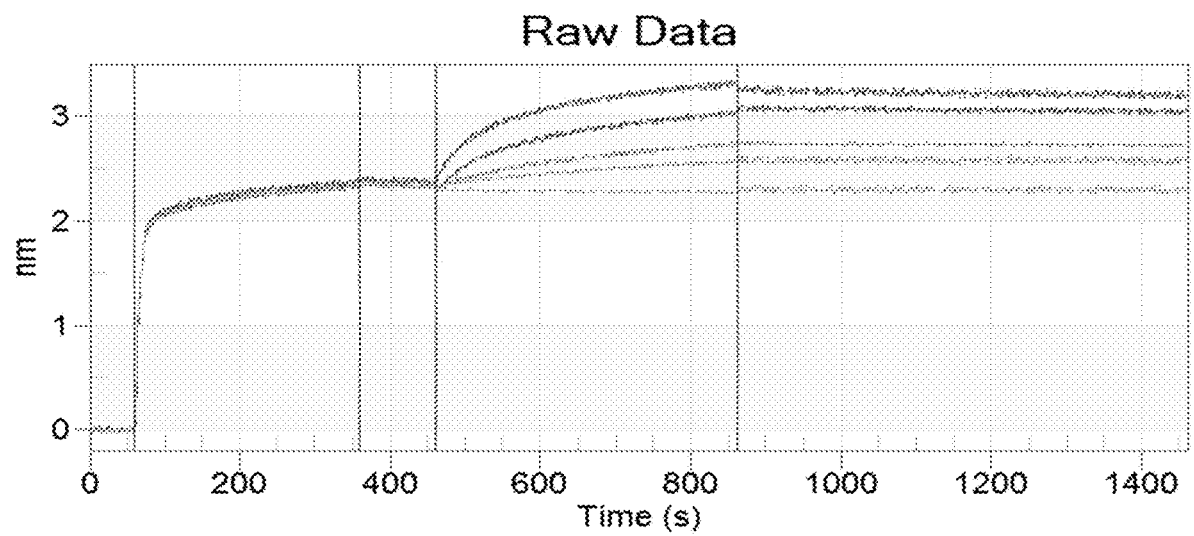
FIG. 3A and FIG. 3B are graphs of canine IL31 binding analysis with varying concentrations of caninized M14 antibody.
Figure 3B:
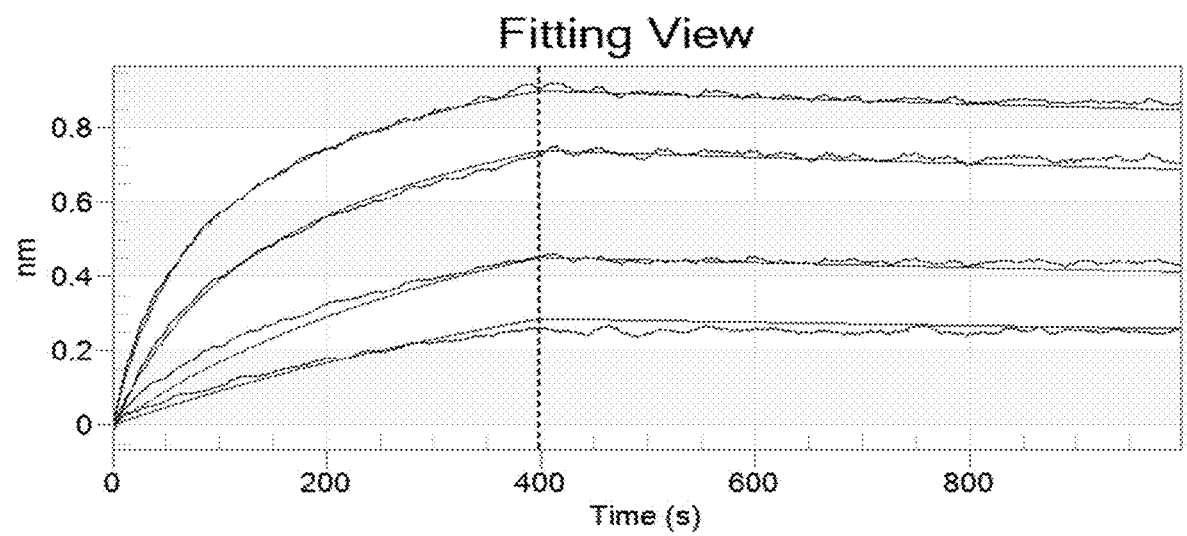

Canine IL31 with C-terminal polyHis tag was expressed and purified from CHO-S cells. Human IL31 was obtained from Sino Biologicaland Streptavidin biosensors was obtained from ForteBio (Cat. #18-509). The binding kinetics were as follows: For the ligand canine IL31 (amine-conjugated-biotin), the Kd (M) for chimeric M14 was $<1.0\times10^{-11}$ (FIG. 2) and $<1.0\times10^{-11}$ (FIG. 3) for caninized M14. For the ligand canine IL31 (glycan-conjugated-biotin), the Kd (M) for caninized M14 was $<1.0\times10^{-12}$ and $k_{off}$ (1/s) was $<1.0\times10^{-7}$.

Chimeric M14 and caninized M14 had no obvious binding signal with human IL31. Thus, the Kd could not be measured.

Example 5: Demonstration that M14 Inhibits Canine IL31 Signaling

Figure 4:
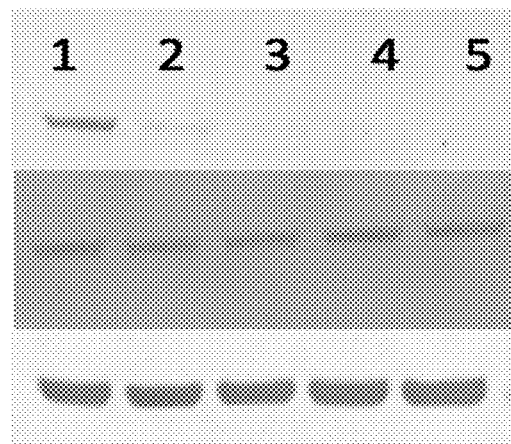
FIG. 4 is an immunoblot showing inhibited canine IL31 signaling at varying concentrations of caninized M14 antibody.

After binding to its IL31 receptor, IL-31 activates Janus kinase (Jak) 1 and Jak2 signaling molecules. In turn, activated Jaks stimulate the phosphorylation of downstream signaling STAT-3 and STAT-5. Anti-phospho-Stat3 immunoblot analysis was used to detect anti-IL31 activity from a protein A-purified fraction of cell-free culture medium (Gonzales et. al. Vet Dermatol 2013; 24: 48-e12). In Brief, the canine monocytic DH82 cells (American Type Culture Collection, Manassas, Va., USA) were plated into 96-well flat-bottomed cell culture plates at a density of $1\times10^{-5}$ cells per well in MEM growth media (Life Technologies) containing 15% heat-inactivated fetal bovine serum, 2 mmol/L GlutaMax, 1 mmol/L sodium pyruvate, and 10 ng/mL canine interferon-c (R&D Systems, Minneapolis, Minn., USA) for 24 h at 37° C. In this experiment, concentration of canine IL31-Fc was 5 ng/mL (8 nM). Anti-phospho STAT-3 and anti-STAT-3 antibodies were purchased from R&D Systems. Anti-beta actin antibody was from Sigma-Aldrich. As shown in FIG. 4, canine IL31 signaling decreased (as evidenced by a reduction in STAT-3 phosphorylation) as the concentration of caninized M14 exposed to the cells increased (lane 1: no anti-IL31 antibody; Lane 2: 3.3 nM; Lane 3: 6.6 nM; Lane 4: 9.9 nM; and Lane 5: 13.2 nM).

Example 6: Identification of M14 Canine IL31 Binding Epitope

To identify the canine IL31 epitope recognized by M14, multiple GST canine IL31 fragment fusion molecules were generated and proteins were expressed intracellularly in *E. coli*. After the GST fusion proteins were transferred to a membrane, chimeric M14 was used to probe the membrane. A positive signal resulted when the IL31 fragment contained the epitope.

Figure 5A:
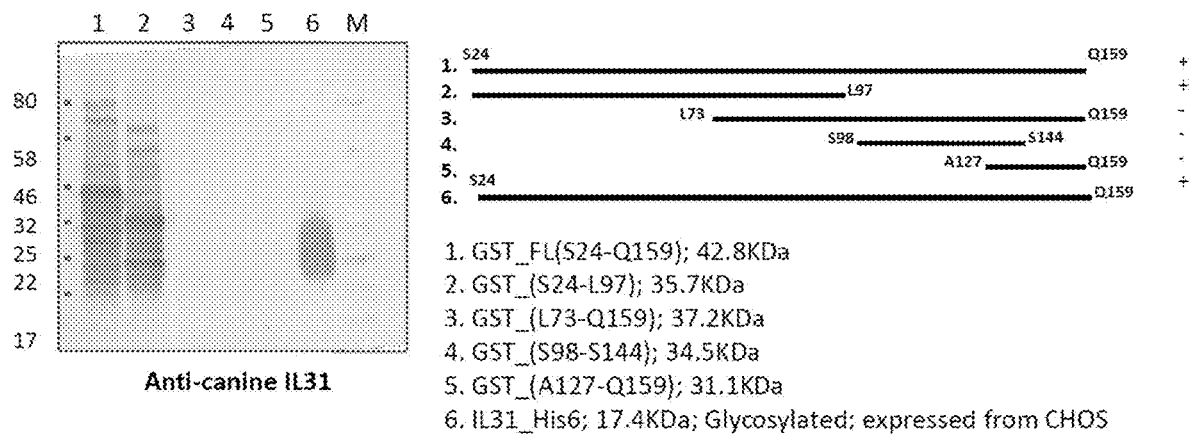
FIGS. 5A and 5B are immunoblots of GST-canine-IL31 deletions probed with M14 antibody and anti-GST antibody, respectively.
Figure 5B:
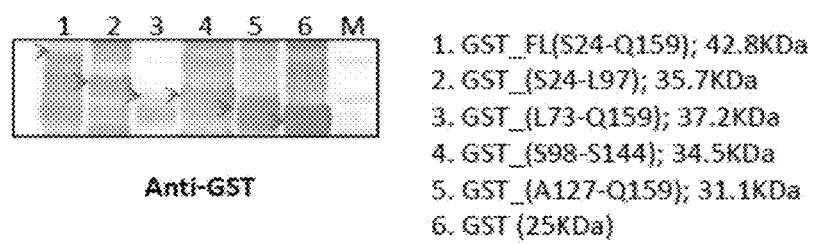
Figure 6A:
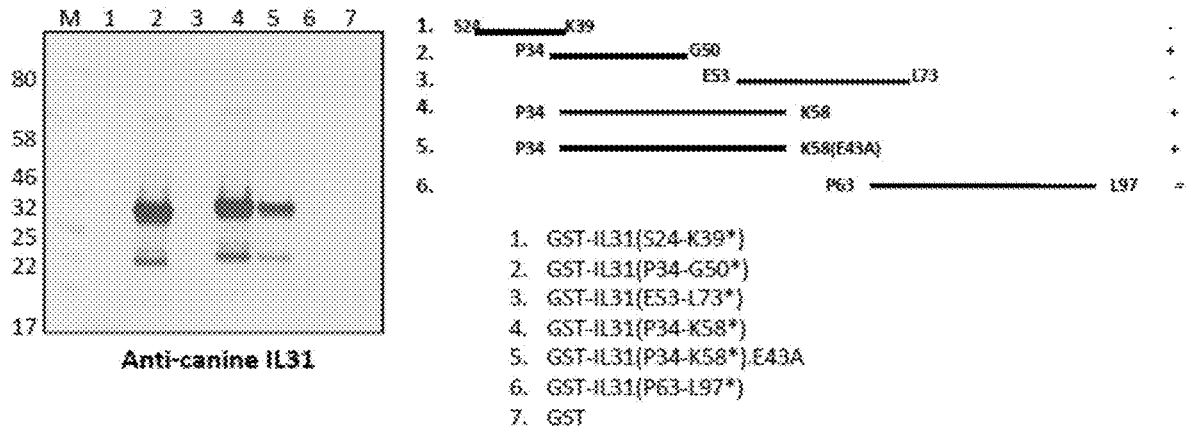
FIGS. 6A and 6B are immunoblots of GST-canine-IL31 deletions probed with M14 antibody and anti-GST antibody, respectively.
Figure 6B:
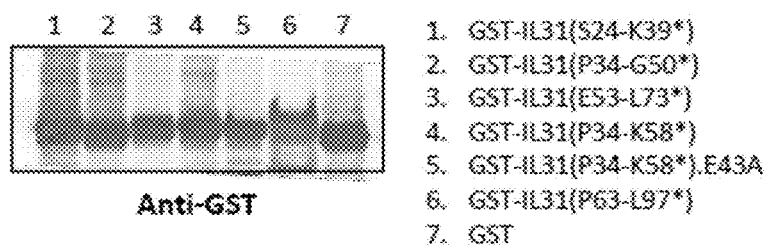
Figure 7A:
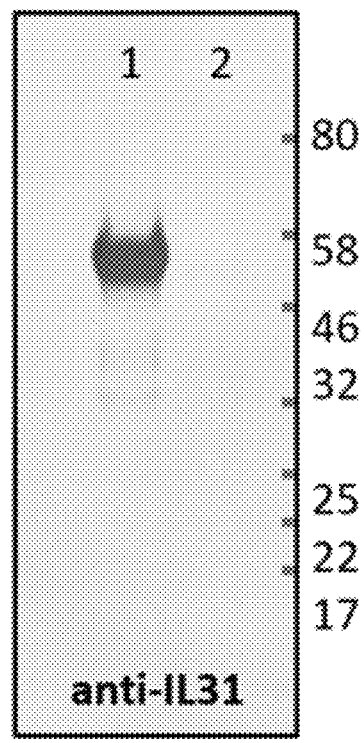
FIGS. 7A and 7B are immunoblots of feline and equine IL31 proteins fused to human Fc probed with M14 antibody and anti-FC antibody, respectively.
Figure 7B:
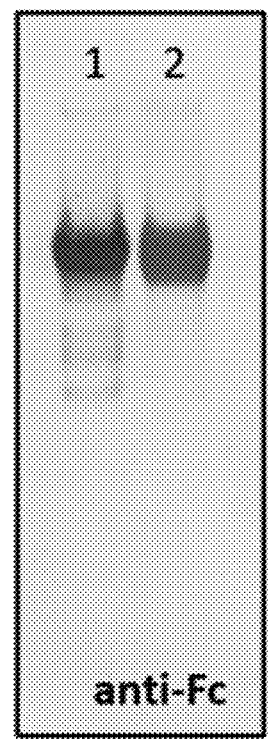
Figure 8:
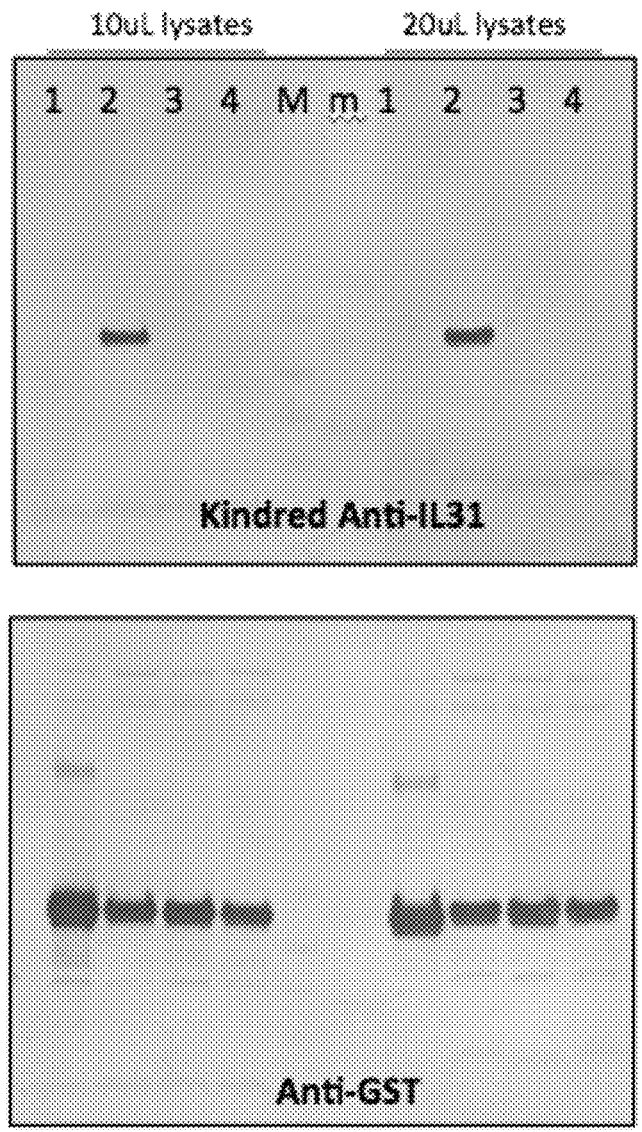
FIG. 8 shows immunoblot analysis of fine epitope mapping and alanine scanning of mature canine IL31 epitope using anti-canine IL31 antibody (top panel) and anti-GST antibody (bottom panel).
Figure 10:
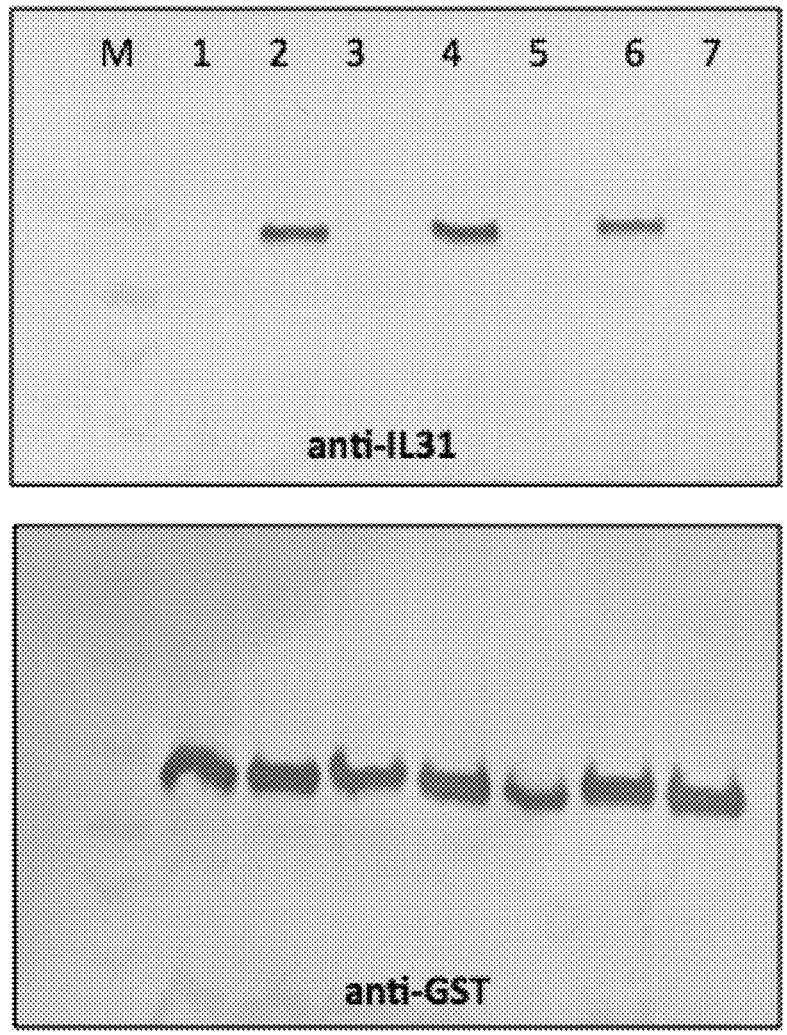
FIG. 10 shows immunoblot analysis of fine epitope mapping and alanine scanning of mature canine IL31 epitope using anti-canine IL31 antibody (top panel) and anti-GST antibody (bottom panel).
Figure 11:
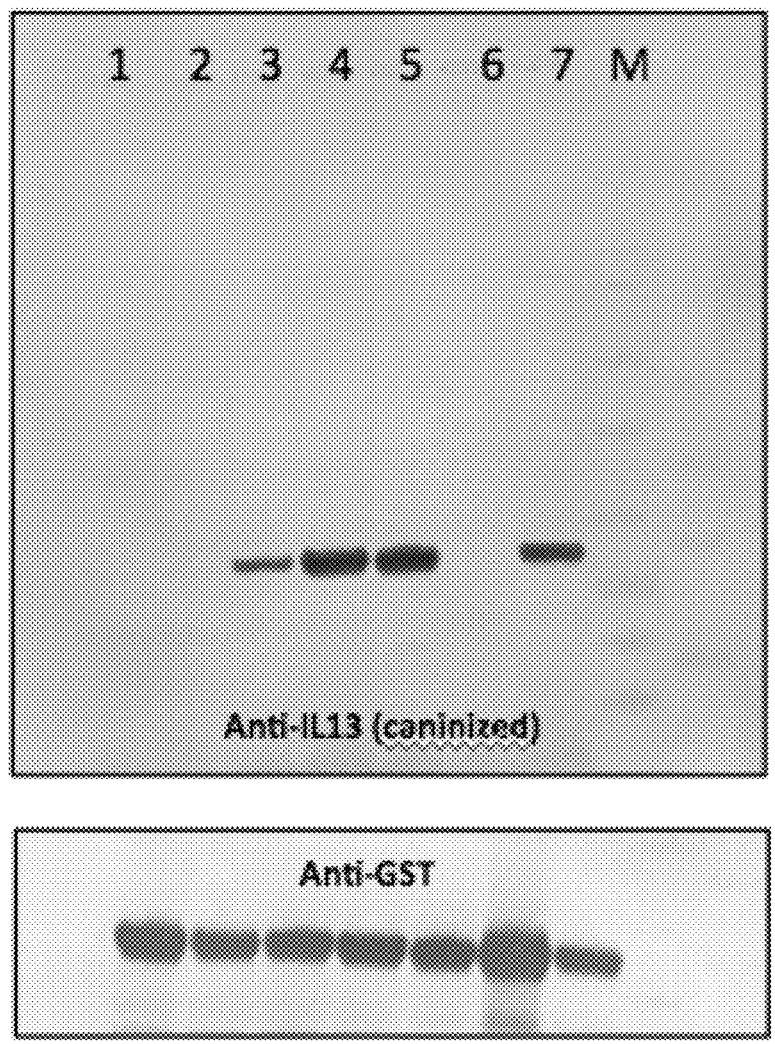
FIG. 11 shows immunoblot analysis of fine epitope mapping and alanine scanning of mature canine IL31 epitope using anti-canine IL31 antibody (top panel) and anti-GST antibody (bottom panel).
Figure 12:
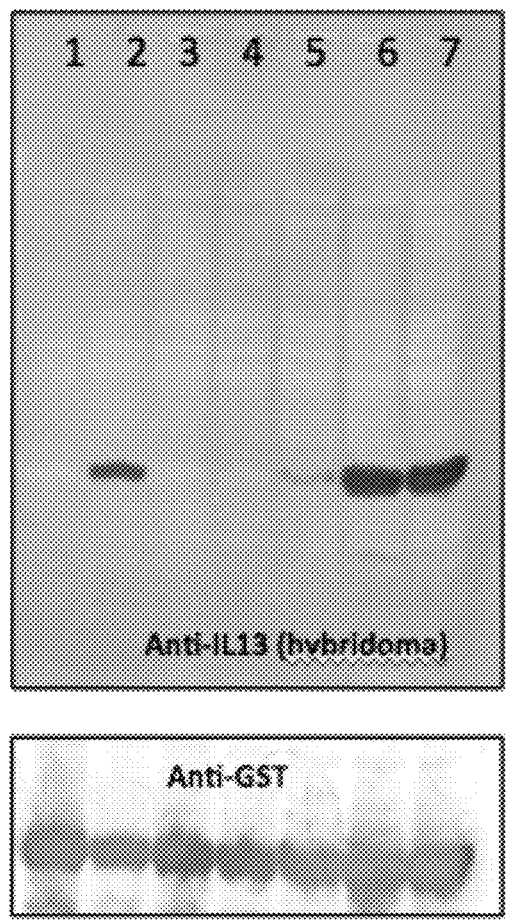
FIG. 12 shows immunoblot analysis of fine epitope mapping and alanine scanning of mature canine IL31 epitope using anti-canine IL31 antibody (top panel) and anti-GST antibody (bottom panel).

FIG. 5 combined with FIG. 6 demonstrated M14 can recognize the minimal fragment (SEQ ID NO: 23).

Example 7: Demonstrating M14 Cross Reacts to Feline IL31

To examine whether M14 antibody recognizes feline IL31 (SEQ ID NO: 28) or equine IL31 (SEQ ID NO: 29), each protein was fused to human Fc and expressed in mammalian 293 cells. The partially purified proteins were blotted to membrane and probed with M14 antibody. The immunoblot of FIG. 1 demonstrates that M14 binds to feline IL31. The immunoblot assay did not detect binding between M14 and equine IL31. However, biolayer interferometry analysis revealed that M14 antibody binds equine IL31, but with a lesser affinity. The preliminary Kd measurement using biotinylated equine IL31 immobilized to the sensor revealed that the affinity (Kd) is approximately 10 to 50 nM.

Example 8: Felinized M14

M14 variable light chain was felinized as (SEQ ID NO: 32) and M14 variable heavy chain was felinized as (SEQ ID NO: 33). First, the mouse heavy chain variable and light chain variable sequences were used to search proper variants of feline VH and VL. The proper feline frames were chosen to graft CDRs. They are further optimized using structural modeling. The felinized VH and VL were fused to a feline IgG heavy chain constant domains (CH1, CH2, and CH3) and feline light chain constant domain (CL1).

Feline M14 chimeric antibody (SEQ ID NO: 30 and SEQ ID NO: 31) or felinized M14 antibody (SEQ ID NO: 34 and SEQ ID NO: 35) can be as administered to cats for treatment of an IL31-induced condition.

Example 9: Identification of M14 Canine IL31 Binding Epitope

To further identify amino acid residues of the canine IL31 epitope recognized by M14, multiple GST canine IL31 epitope fragment fusion molecules carrying alanine mutations were expressed in E. coli. FIGS. 8-12 show immunoblots of fine epitope mapping of canine IL31-GST fusion proteins probed with anti-canine IL31-mAb (M14) or caninized M14 (top panels) and anti-GST antibody control (bottom panels). The epitope fragment tested in each lane is listed below the immunoblots. The fragment name indicates the range of amino acids of mature canine IL31 (SEQ ID NO: 44) tested and the position of the alanine mutation, if one was included. A positive signal resulted when the IL31 fragment contained the wildtype epitope, while a negative signal resulted when the IL31 fragment contained an alanine substitution at a residue important for antibody-ligand interaction.

The results of the epitope mapping study are summarized in Table 3, below. The results suggest that P12, S 13, D14, and K17 of mature canine IL31 (SEQ ID NO: 44) are involved in binding of antibody M14 and that R16 and 118 are partially involved in M14 recognition. In sum, the results of this study suggest that the motif of an IL31 polypeptide that bind the CDRs of antibody M14 is: $PSDX_1X_2KI$, where $X_1$ and $X_2$ are variable (SEQ ID NO: 45).

TABLE 3

| Amino Acid Substitution | Does substitution prevent binding? |
|---|---|
| P12A | Yes |
| S13A | Yes |
| D14A | Yes |
| V15A | No |
| R16A | Partially |
| K17A | Yes |
| I18A | Partially |
| I19A | No |
| L20A | No |

Figure 13:
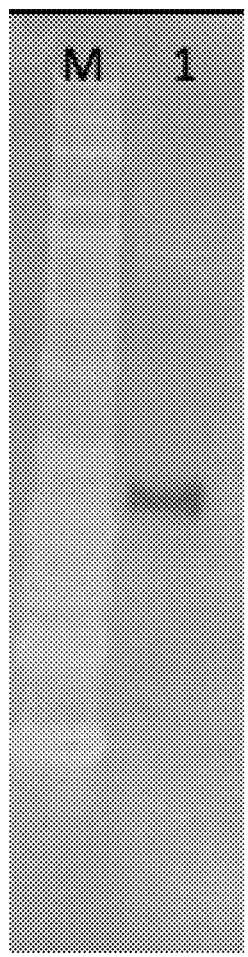
FIG. 13 is an immunoblot cross reactivity of anti-canine IL31 antibody M14 to walrus IL31.

Example 10: M14 Specifically Binds to IL31 of Other Species Having the PSDX1x2KI Epitope Motif The IL31 epitope motif recognized by M14 ($PSDXiX_2KI$; SEQ ID NO: 45) is not present in the IL31 amino acid sequences of human (SEQ ID NO: 46) or mouse (SEQ ID NO: 61). However, the motif was identified in several other species, including feline:
Felis catus (XP_011286140.1; SEQ ID NO: 28)
Odobenus rosmarus divergens (XP_004395998.1; SEQ ID NO: 47)
Papio Anubis (XP_003907358.1; SEQ ID NO: 49)
Ursus maritimus (XP_008687166.1; SEQ ID NO: 51)
Leptonychotes weddelihi (XP_006746595.1; SEQ ID NO: 52)
Panthera tigris altaica (XP_007079636.1; SEQ ID NO: 53)
Acinonyx jubatus (XP_014919275.1; SEQ ID NO: 54)
Macaca fascicularis (EHH66805.1; SEQ ID NO: 55)
Macaca mulatta (EHH21279.1; SEQ ID NO: 56)
Mandrillus leucophaeus (XP_011819882.1; SEQ ID NO: 57)
Chlorocebus sabaeus (XP_008003211.1; SEQ ID NO: 58)
Cercocebus atys (XP_011926625.1; SEQ ID NO: 59)
Rhinopithecus roxellana (XP_010366647.1; SEQ ID NO: 60)
Walrus IL31 (SEQ ID NO: 47) and oliver baboon IL31 (SEQ ID NO: 49) possess the $PSDX_1X_2KI$ epitope (SEQ ID NO: 45) that can be recognized by antibody M14. To facilitate protein purification, C-terminal His tag was added to walrus IL31 (SEQ ID NO: 48) and to oliver baboon IL31 (SEQ ID NO: 50). Western blot analysis confirmed that M14 binds walrus IL31 (FIG. 13). M14 antibody or its derivatives can be used for therapeutic and diagnostic agents for an IL31-induced disease in any of the above listed species.

Example 11: Thermostability of Caninized M14 Antibody

Thermostability of caninized M14 antibody was compared to Zoetis' CYTOPOINT™, a commercially available anti-IL31 antibody, across a broad range of pH was analyzed using differential scanning fluorescence (DSF). The melting temperature (Tm) of each antibody at the different pHs is listed in Table 4, below. Both CYTOPOINT™ and caninized M14 antibodies were buffer exchanged into the assay buffer listed in Table 4 using a PD Minitrap™ G-25 column (GE Healthcare). Tm of each antibody was evaluated using the same buffer and protein concentration. Caninized M14 antibody exhibited improved thermostability compared to CYTOPOINT™ across a broad pH range. Furthermore, under stress conditions at 55° C. for 2 days at 0.22 mg/ml antibody, CYTOPOINT™ precipitated, while no precipitates were observed with caninized M14 antibody.

TABLE 4

| pH tested | Assay Buffer | Caninized M14 Melting temperature (Tm° C.) | CYTOPOINT ™ Melting temperature (Tm° C.) |
|---|---|---|---|
| 3 | 0.1M NaAc | 55.44 | 49.21 |
| 4 | 0.1M NaAc | 61.68 | 57.54 |
| 5 | 0.1M NaAc | 66.84 | 61.71 |
| 6 | 0.1M NaPO$_4$ | 68.20 | 62.84 |
| 7 | 0.1M NaPO$_4$ | 67.25 | 61.76 |
| 7.2 | 2xPBS | 66.71 | 60.98 |
| 8 | 0.1M NaPO$_4$ | 65.08 | 60.08 |
| 9 | 0.1M TrisHCl | 64.25 | 59.25 |

Example 12. Caninized M14 Antibody Buffer Formulations

Thermostability of caninized M14 antibody in various buffer formulations was analyzed. Buffers containing sodium phosphate, sodium acetate, or L-histidine were considered. Other formulation variables included different pHs (pH 5.2, 5.5, 6.0, 6.5, and 7.0), different concentrations of sodium chloride (50 mM and 140 mM), different polysorbates (polysorbate 20 and polysorbate 80), and different anti-bacterial agents (m-cresol and methylparaben). The melting temperature (Tm) of caninized M14 antibody in each buffer was measured by differential scanning fluorescence (DSF) technique from 20° C. to 95° C. Table 5 lists Tm values of caninized M14 antibody in the various buffers tested.

TABLE 5

| Formulation Designation | Buffer Formulation | Melting temperature (Tm° C.) |
|---|---|---|
| A1 | 20 mM sodium phosphate 140 mM sodium chloride Polysorbate 80 (0.05 mg/mL) pH 6.0 | 67.6 |

TABLE 5-continued

| Formulation Designation | Buffer Formulation | Melting temperature (Tm° C.) |
|---|---|---|
| A2 | A1 + m-cresol (0.2%) | 65.0 |
| A3 | A1 + Methyparaben 0.9 mg/mL | 67.3 |
| A4 | 20 mM sodium phosphate 140 mM sodium chloride Polysorbate 20 (0.05 mg/mL) pH 6.0 | 66.9 |
| A5 | A4 + 0.2% m-cresol | 64.4 |
| A6 | A4 + Methyparaben 0.9 mg/mL | 67.3 |
| A7 | 20 mM sodium phosphate 50 mM sodium chloride Polysorbate 80 (0.05 mg/mL) pH 6.0 | 66.3 |
| A8 | A7 + 0.2% m-cresol | no peak* |
| A9 | A7 + Methyparaben 0.9 mg/mL | 66.1 |
| A10 | 20 mM sodium phosphate 50 mM sodium chloride Polysorbate 20 (0.05 mg/mL) pH 6.0 | 65.8 |
| A11 | A10 + 0.2% m-cresol | 63.6 |
| A12 | A10 + Methyparaben 0.9 mg/mL | 65.5 |
| B1 | 20 mM sodium phosphate 140 mM sodium chloride Polysorbate 80 (0.05 mg/mL) pH 7.0 | 68.0 |
| B2 | B1 + m-cresol (0.2%) | 66.2 |
| B3 | B1 + Methyparaben 0.9 mg/mL | 68.1 |
| B4 | 20 mM sodium phosphate 140 mM sodium chloride Polysorbate 20 (0.05 mg/mL) pH 7.0 | 68.1 |
| B5 | B4 + 0.2% m-cresol | 64.6 |
| B6 | B4 + Methyparaben 0.9 mg/mL | 67.2 |
| B7 | 20 mM sodium phosphate 50 mM sodium chloride Polysorbate 80 (0.05 mg/mL) pH 7.0 | 67.6 |
| B8 | A7 + 0.2% m-cresol | 64.7 |
| B9 | B7 + Methyparaben 0.9 mg/mL | 66.9 |
| B10 | 20 mM sodium phosphate 50 mM sodium chloride Polysorbate 80 (0.05 mg/mL) pH 7.0 | 67.3 |
| B11 | B10 + 0.2% m-cresol | 64.8 |
| B12 | B10 + Methyparaben 0.9 mg/mL | 67.4 |
| C1 | 20 mM sodium acetate 140 mM sodium chloride Polysorbate 80 (0.05 mg/mL) pH 5.2 | 67.9 |
| C2 | C1 + m-cresol (0.2%) | 65.4 |
| C3 | C1 + Methyparaben 0.9 mg/mL | 67.6 |
| C4 | 20 mM sodium acetate 140 mM sodium chloride Polysorbate 20 (0.05 mg/mL) pH 5.2 | 67.7 |
| C5 | C4 + 0.2% m-cresol | 64.7 |
| C6 | C4 + Methyparaben 0.9 mg/mL | 67.7 |
| C7 | 20 mM sodium acetate 50 mM sodium chloride Polysorbate 80 (0.05 mg/mL) pH 5.2 | 66.6 |
| C8 | C7 + 0.2% m-cresol | no peak* |
| C9 | C7 + Methyparaben 0.9 mg/mL | 66.9 |
| C10 | 20 mM sodium acetate 50 mM sodium chloride Polysorbate 20 (0.05 mg/mL) pH 5.2 | 68.0 |
| C11 | C10 + 0.2% m-cresol | 64.7 |
| C12 | C10 + Methyparaben 0.9 mg/mL | 67.7 |
| D1 | 20 mM L-Histidine 140 mM sodium chloride Polysorbate 80 (0.05 mg/mL) pH 5.5 | 69.5 |
| D2 | D1 + m-cresol (0.2%) | 68.1 |
| D3 | D1 + Methyparaben 0.9 mg/mL | 69.6 |
| D4 | 20 mM L-Histidine 140 mM sodium chloride Polysorbate 20 (0.05 mg/mL) pH 5.5 | 69.6 |
| D5 | D4 + 0.2% m-cresol | 67.2 |
| D6 | D4 + Methyparaben 0.9 mg/mL | 69.1 |
| D7 | 20 mM L-Histidine 50 mM sodium chloride Polysorbate 80 (0.05 mg/mL) pH 5.5 | 68.0 |
| D8 | D7 + 0.2% m-cresol | 66.2 |
| D9 | D7 + Methyparaben 0.9 mg/mL | 67.7 |
| D10 | 20 mM L-Histidine 50 mM sodium chloride Polysorbate 20 (0.05 mg/mL) pH 5.5 | 68.1 |
| D11 | D10 + 0.2% m-cresol | 66.6 |
| D12 | D10 + Methyparaben 0.9 mg/mL | 68.1 |
| E1 | 20 mM L-Histidine 140 mM sodium chloride Polysorbate 80 (0.05 mg/mL) pH 6.5 | 68.2 |
| E2 | E1 + m-cresol (0.2%) | no peak* |
| E3 | E1 + Methyparaben 0.9 mg/mL | 67.9 |
| E4 | 20 mM L-Histidine 140 mM sodium chloride Polysorbate 20 (0.05 mg/mL) pH 6.5 | 67.9 |
| E5 | E4 + 0.2% m-cresol | no peak* |
| E6 | E4 + Methyparaben 0.9 mg/mL | 67.6 |
| E7 | 20 mM L-Histidine 50 mM sodium chloride Polysorbate 80 (0.05 mg/mL) pH 6.5 | 67.3 |
| E8 | E7 + 0.2% m-cresol | no peak* |
| E9 | E7 + Methyparaben 0.9 mg/mL | 67.5 |
| E10 | 20 mM L-Histidine 50 mM sodium chloride Polysorbate 20 (0.05 mg/mL) pH 6.5 | 67.2 |
| E11 | E10 + 0.2% m-cresol | 64.6 |
| E12 | E10 + Methyparaben 0.9 mg/mL | 66.9 |

*No peak indicates that no distinct melting point was observed.

The Tm of formulas D1, D2, D3, D4, D35, and D6 in the presence of one of each of the following sugars (1%): sucrose, trehalose, D-mannitol, maltose, and sorbitol, was further tested using DSF.

The formulations with and without sugars were also tested under stress conditions. 1 day at 40° C., followed by 1 day at 45° C., followed by 4 days at 55° C. Size exclusion HPLC analysis was used to detect and quantify monomeric and aggregation form of antibodies in the various formulations after being subjected to stress conditions. The sample was loaded onto SHODEX™ KW803 column (8 mm×300 mm) and attached to a KW-G guard column. An Agilent 1100 chromatography system was used with 2×PBS (270 mM NaCl, 5.4 mM KCl, 8.6 mM $Na_2PO_4$), pH 7.2 as a running buffer at a constant flow rate of 0.5 mL/min. The column was calibrated with BIORAD gel filtration standard (Catalog No. 151-1901) composed of thyroglobulin, bovine γ-globulin, chicken ovalbumin, equine myoglobin, and vitamin B12 (molecular weight 1,350-670,000). The amount of monomeric antibody remaining in solution was determined by measuring UV absorbance at 214 nm or 280 nm and calculating the peak area under the curve.

Based on DSF and HPLC analysis, formulations containing L-histidine, sodium chloride, polysorbate 80, and having a pH of between 5.0 and 6.2, such as Formulas D1, D2, D3, D4, D6, D7, D10, and D12, were considered more desirable. For example, formulations desirable for single dosing are: 20 mM L-Histidine; 140 mM sodium chloride; polysorbate 80 (0.05 mg/mL); pH 5.5. Formulations desirable for multidosing (in the presence of preservatives) are:

1. 20 mM L-Histidine; 140 mM sodium chloride; Polysorbate 80 (0.05 mg/mL); sucrose (1-3%); m-cresol (0.2%); pH 5.5; and
2. 20 mM L-Histidine; 140 mM sodium chloride; Polysorbate 80 (0.05 mg/mL); trehalose (1-3%); methylparaben (0.9%); pH 5.5.

1. 20 mM L-Histidine; 140 mM sodium chloride; Polysorbate 80 (0.05 mg/mL); sucrose (1-3%); m-cresol (0.2%); pH 5.5; and
2. 20 mM L-Histidine; 140 mM sodium chloride; Polysorbate 80 (0.05 mg/mL); trehalose (1-3%); methylparaben (0.9%); pH 5.5.

What is claimed is:

1. A pharmaceutical composition comprising an anti-IL31 antibody and a pharmaceutically acceptable carrier, wherein the antibody comprises:
   a) (i) a CDR-H1 comprising the amino acid sequence of SEQ ID NO: 1,
      (ii) a CDR-H2 comprising the amino acid sequence of SEQ ID NO: 2,
      (iii) a CDR-H3 comprising the amino acid sequence of SEQ ID NO: 3, and
   b) (i) a CDR-L1 comprising the amino acid sequence of SEQ ID NO: 8,
      (ii) a CDR-L2 comprising the amino acid sequence of SEQ ID NO: 9,
      (iii) a CDR-L3 comprising the amino acid sequence of SEQ ID NO: 10.

2. The composition of claim 1, wherein the antibody comprises:
   a) (i) a variable light chain sequence having at least 95% sequence identity to the amino acid sequence of SEQ ID NO: 24; (ii) a variable heavy chain sequence having at least 95% sequence identity to the amino acid sequence of SEQ ID NO: 25; or (iii) a variable light chain sequence as in (i) and a variable heavy chain sequence as in (ii); or
   b) (i) a variable light chain sequence having at least 95% sequence identity to the amino acid sequence of SEQ ID NO: 16; (ii) a variable heavy chain sequence having at least 95% sequence identity to the amino acid sequence of SEQ ID NO: 15; or (iii) a variable light chain sequence as in (i) and a variable heavy chain sequence as in (ii).

3. The composition of claim 1, wherein the antibody comprises (a) a canine heavy chain constant region selected from an IgG-A, IgG-B, IgG-C, and IgG-D constant region; or (b) a feline heavy chain constant region selected from an IgG1, IgG2a, and IgG2b constant region.

4. The composition of claim 1, wherein the antibody comprises: a) (i) a light chain amino acid sequence of SEQ ID NO: 26; (ii) a heavy chain amino acid sequence of SEQ ID NO: 27; or (iii) a light chain amino acid sequence as in (i) and a heavy chain amino acid sequence as in (ii); or b) (i) a light chain amino acid sequence of SEQ ID NO: 30; (ii) a heavy chain amino acid sequence of SEQ ID NO: 31; or (iii) a light chain amino acid sequence as in (i) and a heavy chain amino acid sequence as in (ii).

5. The composition of claim 1, wherein the antibody binds to canine IL31 with a dissociation constant (Kd) of between $5\times10^{-11}$ M and $1\times10^{-12}$ M, as measured by biolayer interferometry.

6. The composition of claim 1, wherein the antibody is a monoclonal antibody.

7. The composition of claim 1, wherein the antibody is a canonized or a felinized antibody.

8. The composition of claim 1, wherein the antibody is an antibody fragment selected from Fv, scFv, Fab, Fab', $F(ab')_2$, and Fab'-SH.

9. The composition of claim 1, wherein the composition further comprises:
   a) a Jak inhibitor, a PI3K inhibitor, an AKT inhibitor, or a MAPK inhibitor; or
   b) one or more antibodies selected from an anti-IL17 antibody, an anti-TNFα antibody, an anti-CD20 antibody, an anti-CD19 antibody, an anti-CD25 antibody, an anti-IL4 antibody, an anti-IL13 antibody, an anti-IL23 antibody, an anti-IgE antibody, an anti-CD11 antibody, anti-IL6R antibody, anti-α4-Intergrin antibody, an anti-IL12 antibody, an anti-IL1β antibody, and an anti-BlyS antibody.

10. The composition of claim 1, wherein the pharmaceutically acceptable carrier comprises L-histidine.

11. The composition of claim 1, wherein the pharmaceutically acceptable carrier comprises sodium chloride.

12. The composition of claim 1, wherein the pharmaceutically acceptable carrier comprises L-polysorbate 80.

13. The composition of claim 1, wherein the composition has a pH of from 5.0 to 6.2.

14. The composition of claim 10, wherein the composition has an L-histidine concentration of from 5 mM to 100 mM.

15. The composition of claim 11, wherein the composition has a sodium chloride concentration of from 80 to 200 mM.

16. The composition of claim 12, wherein the composition has a L-polysorbate 80 concentration of from 0.005 mg/mL to 0.5 mg/mL.

17. The composition of claim 1, wherein the pharmaceutically acceptable carrier comprises at least one sugar.

18. The composition of claim 17, wherein the at least one sugar is present in the pharmaceutically acceptable carrier at a concentration of from 0.5% to 20%.

19. The composition of claim 1, wherein the pharmaceutically acceptable carrier comprises an ingredient selected from the group consisting of sucrose, trehalose, D-mannitol, maltose, sorbitol, and combinations thereof.

20. The composition of claim 1, wherein the pharmaceutically acceptable carrier comprises an anti-bacterial agent.

21. The composition of claim 20, wherein the anti-bacterial agent is selected from the group consisting of m-cresol, methylparaben, and combinations thereof.

22. The composition of claim 1, wherein the antibody further comprises one or more of (a) a variable region heavy chain framework 1 (HC-FR1) sequence of SEQ ID NO: 4; (b) a HC-FR2 sequence of SEQ ID NO: 5; (c) a HC-FR3 sequence of SEQ ID NO: 6; (d) a HC-FR4 sequence of SEQ ID NO: 7; (e) a variable region light chain framework 1 (LC-FR1) sequence of SEQ ID NO: 11; (f) an LC-FR2 sequence of SEQ ID NO: 12; (g) an LC-FR3 sequence of SEQ ID NO: 13; or (h) an LC-FR4 sequence of SEQ ID NO: 14.

23. The composition of claim 1, wherein the antibody comprises a variable light chain sequence having at least 95% sequence identity to the amino acid sequence of SEQ ID NO: 16 and a variable heavy chain sequence having at least 95% sequence identity to the amino acid sequence of SEQ ID NO: 15.

24. The composition of claim 23, wherein the antibody comprises a variable light chain sequence comprising SEQ ID NO: 16 and a variable heavy chain sequence comprising SEQ ID NO: 15.

25. The composition of claim 23, wherein the antibody comprises a canine heavy chain constant region from an IgG-B constant region.

26. The composition of claim 24, wherein the antibody comprises a canine heavy chain constant region from an IgG-B constant region.

27. The composition of claim 1, wherein the antibody comprises a heavy chain amino acid sequence at least 98% identical to SEQ NO: 18 and a light chain amino acid sequence at least 98% identical to SEQ ID NO: 21.

28. The composition of claim 1, wherein the antibody comprises a heavy chain amino acid sequence at least 99% identical to SEQ ID NO: 18 and a light chain amino acid sequence at least 99% identical to SEQ ID NO: 21.

29. The composition of claim 1, wherein the antibody comprises a heavy chain amino acid sequence 100% identical to SEQ NO: 18 and a light chain amino acid sequence 100% identical to SEQ ID NO: 21.

* * * * *

```
                             SEQUENCE LISTING

Sequence total quantity: 89
SEQ ID NO: 1              moltype = AA   length = 9
FEATURE                   Location/Qualifiers
REGION                    1..9
                          note = Murinae sp.
REGION                    1..9
                          note = misc_feature - Variable heavy chain CDR-H1 amino
                           acid sequence of mouse antibody clones M14, M18, and M19
source                    1..9
                          mol_type = protein
                          organism = unidentified
SEQUENCE: 1
GDSITSGYW                                                                         9

SEQ ID NO: 2              moltype = AA   length = 16
FEATURE                   Location/Qualifiers
REGION                    1..16
                          note = Murinae sp.
REGION                    1..16
                          note = misc_feature - Variable heavy chain CDR-H2 amino
                           acid sequence of mouse antibody clones M14 and M19
source                    1..16
                          mol_type = protein
                          organism = unidentified
SEQUENCE: 2
YISYSGITDY NPSLKS                                                                16

SEQ ID NO: 3              moltype = AA   length = 12
FEATURE                   Location/Qualifiers
REGION                    1..12
                          note = Murinae sp.
REGION                    1..12
                          note = misc_feature - Variable heavy chain CDR-H3 amino
                           acid sequence of mouse antibody clones M14, M18, and M19
source                    1..12
                          mol_type = protein
                          organism = unidentified
SEQUENCE: 3
ARYGNYGYAM DY                                                                    12

SEQ ID NO: 4              moltype = AA   length = 25
FEATURE                   Location/Qualifiers
REGION                    1..25
                          note = Murinae sp.
REGION                    1..25
                          note = misc_feature - Variable region heavy chain framework
                           HC-FR1 amino acid sequence of mouse antibody clone M14
source                    1..25
                          mol_type = protein
                          organism = unidentified
SEQUENCE: 4
EVQLQESGPS LVKPSQTLSL TCSVT                                                      25

SEQ ID NO: 5              moltype = AA   length = 15
FEATURE                   Location/Qualifiers
REGION                    1..15
                          note = Murinae sp.
REGION                    1..15
                          note = misc_feature - Variable region heavy chain framework
                           HC-FR2 amino acid sequence of mouse antibody clone M14
source                    1..15
                          mol_type = protein
                          organism = unidentified
SEQUENCE: 5
NWIRKFPGNK LEYMG                                                                 15

SEQ ID NO: 6              moltype = AA   length = 30
FEATURE                   Location/Qualifiers
REGION                    1..30
                          note = Murinae sp.
```

|   |   |   |
|---|---|---|
| REGION | 1..30 | |
| | note = misc_feature - Variable region heavy chain framework HC-FR3 amino acid sequence of mouse antibody clone M14 | |
| source | 1..30 | |
| | mol_type = protein | |
| | organism = unidentified | |
| SEQUENCE: 6 | | |
| RISITRDTSK NQYYLQLNSV TTEDTATYYC | | 30 |
| | | |
| SEQ ID NO: 7 | moltype = AA  length = 11 | |
| FEATURE | Location/Qualifiers | |
| REGION | 1..11 | |
| | note = Murinae sp. | |
| REGION | 1..11 | |
| | note = misc_feature - Variable region heavy chain framework HC-FR4 amino acid sequence of mouse antibody clone M14 | |
| source | 1..11 | |
| | mol_type = protein | |
| | organism = unidentified | |
| SEQUENCE: 7 | | |
| WGQGTSVTVS S | | 11 |
| | | |
| SEQ ID NO: 8 | moltype = AA  length = 15 | |
| FEATURE | Location/Qualifiers | |
| REGION | 1..15 | |
| | note = Murinae sp. | |
| REGION | 1..15 | |
| | note = misc_feature - Variable light chain CDR-L1 amino acid sequence of mouse antibody clones M14 and M19 | |
| source | 1..15 | |
| | mol_type = protein | |
| | organism = unidentified | |
| SEQUENCE: 8 | | |
| RASESVDTYG NSFMH | | 15 |
| | | |
| SEQ ID NO: 9 | moltype = AA  length = 7 | |
| FEATURE | Location/Qualifiers | |
| REGION | 1..7 | |
| | note = Murinae sp. | |
| REGION | 1..7 | |
| | note = misc_feature - Variable light chain CDR-L2 amino acid sequence of mouse antibody clones M14, M18, and M19 | |
| source | 1..7 | |
| | mol_type = protein | |
| | organism = unidentified | |
| SEQUENCE: 9 | | |
| RASNLES | | 7 |
| | | |
| SEQ ID NO: 10 | moltype = AA  length = 9 | |
| FEATURE | Location/Qualifiers | |
| REGION | 1..9 | |
| | note = Murinae sp. | |
| REGION | 1..9 | |
| | note = misc_feature - Variable light chain CDR-L3 amino acid sequence of mouse antibody clones M14, M18, and M19 | |
| source | 1..9 | |
| | mol_type = protein | |
| | organism = unidentified | |
| SEQUENCE: 10 | | |
| QQSYEDPWT | | 9 |
| | | |
| SEQ ID NO: 11 | moltype = AA  length = 23 | |
| FEATURE | Location/Qualifiers | |
| REGION | 1..23 | |
| | note = Murinae sp. | |
| REGION | 1..23 | |
| | note = misc_feature - Variable region light chain framework LC-FR1 amino acid sequence of mouse antibody clone M14 | |
| source | 1..23 | |
| | mol_type = protein | |
| | organism = unidentified | |
| SEQUENCE: 11 | | |
| DIVLTQSPAS LAVSLGQRAT ISC | | 23 |
| | | |
| SEQ ID NO: 12 | moltype = AA  length = 15 | |
| FEATURE | Location/Qualifiers | |
| REGION | 1..15 | |
| | note = Murinae sp. | |
| REGION | 1..15 | |

|   |   |   |
|---|---|---|
|  | note = misc_feature - Variable region light chain framework<br>LC-FR2 amino acid sequence of mouse antibody clone M14 |  |
| source | 1..15 |  |
|  | mol_type = protein |  |
|  | organism = unidentified |  |

SEQUENCE: 12
WYQQKSGQSP KLLIY                                                          15

|   |   |   |
|---|---|---|
| SEQ ID NO: 13 | moltype = AA  length = 32 |  |
| FEATURE | Location/Qualifiers |  |
| REGION | 1..32 |  |
|  | note = Murinae sp. |  |
| REGION | 1..32 |  |
|  | note = misc_feature - Variable region light chain framework<br>LC-FR3 amino acid sequence of mouse antibody clone M14 |  |
| source | 1..32 |  |
|  | mol_type = protein |  |
|  | organism = unidentified |  |

SEQUENCE: 13
GIPARFGGSG SRTDFTLTID PVEADDVATY YC                                        32

|   |   |   |
|---|---|---|
| SEQ ID NO: 14 | moltype = AA  length = 10 |  |
| FEATURE | Location/Qualifiers |  |
| REGION | 1..10 |  |
|  | note = Murinae sp. |  |
| REGION | 1..10 |  |
|  | note = misc_feature - Variable region light chain framework<br>LC-FR4 amino acid sequence of mouse antibody clone M14 |  |
| source | 1..10 |  |
|  | mol_type = protein |  |
|  | organism = unidentified |  |

SEQUENCE: 14
FGGGTKLEIK                                                                10

|   |   |   |
|---|---|---|
| SEQ ID NO: 15 | moltype = AA  length = 118 |  |
| FEATURE | Location/Qualifiers |  |
| REGION | 1..118 |  |
|  | note = Synthetic: Caninized variable heavy chain amino acid<br>sequence of mouse antibody clone M14 |  |
| source | 1..118 |  |
|  | mol_type = protein |  |
|  | organism = synthetic construct |  |

SEQUENCE: 15
EVQLVESGPS LVKPGGSLRL TCSVTGDSIT SGYWNWIRKF PGNKLEYMGY ISYSGITDYN    60
PSLKSRITIS RDTSKNQYYL QLNSVTTEDT ATYYCARYGN YGYAMDYWGQ GTLVTVSS     118

|   |   |   |
|---|---|---|
| SEQ ID NO: 16 | moltype = AA  length = 111 |  |
| FEATURE | Location/Qualifiers |  |
| REGION | 1..111 |  |
|  | note = Synthetic: Caninized variable light chain amino acid<br>sequence of mouse antibody clone M14 |  |
| source | 1..111 |  |
|  | mol_type = protein |  |
|  | organism = synthetic construct |  |

SEQUENCE: 16
DIVMTQSPAS LSVSLGQRAT ISCRASESVD TYGNSFMHWY QQKPGQSPKL LIYRASNLES    60
GIPARFGGSG SGTDFTLTID PVQADDVATY YCQQSYEDPW TFGGGTKLEI K            111

|   |   |   |
|---|---|---|
| SEQ ID NO: 17 | moltype = AA  length = 448 |  |
| FEATURE | Location/Qualifiers |  |
| REGION | 1..448 |  |
|  | note = Synthetic: Caninized heavy chain sequence from mouse<br>antibody clone M14 and canine IgG-A |  |
| source | 1..448 |  |
|  | mol_type = protein |  |
|  | organism = synthetic construct |  |

SEQUENCE: 17
EVQLVESGPS LVKPGGSLRL TCSVTGDSIT SGYWNWIRKF PGNKLEYMGY ISYSGITDYN    60
PSLKSRITIS RDTSKNQYYL QLNSVTTEDT ATYYCARYGN YGYAMDYWGQ GTLVTVSSAS   120
TTAPSVFPLA PSCGSTSGST VALACLVSGY FPEPVTVSWN SGSLTSGVHT FPSVLQSSGL   180
HSLSSMVTVP SSRWPSETFT CNVVHPASNT KVDKPVFNEC RCTDTPCPVP EPLGGPSVLI   240
FPPKPKDILR ITRTPEVTCV VLDLGREDPE VQISWFVDGK EVHTAKTQSR EQQFNGTYRV   300
VSVLPIEHQD WLTGKEFKCR VNHIDLPSPI ERTISKARGQ AHKPSVYVLP PSPKELSSSD   360
TVSITCLIKD FYPPDIDVEW QSNGQQEPER KHRMTPPQLD EDGSYFLYSK LSVDKSRWQQ   420
GDPFTCAVMH ETLQNHYTDL SLSHSPGK                                      448

|   |   |   |
|---|---|---|
| SEQ ID NO: 18 | moltype = AA  length = 453 |  |
| FEATURE | Location/Qualifiers |  |
| REGION | 1..453 |  |

```
                         note = Synthetic: Caninized heavy chain sequence from mouse
                             antibody clone M14 and canine IgG-B
source                   1..453
                         mol_type = protein
                         organism = synthetic construct
SEQUENCE: 18
EVQLVESGPS LVKPGGSLRL TCSVTGDSIT SGYWNWIRKF PGNKLEYMGY ISYSGITDYN    60
PSLKSRITIS RDTSKNQYYL QLNSVTTEDT ATYYCARYGN YGYAMDYWGQ GTLVTVSSAS   120
TTAPSVFPLA PSCGSTSGST VALACLVSGY FPEPVTVSWN SGSLTSGVHT FPSVLQSSGL   180
YSLSSMVTVP SSRWPSETFT CNVAHPASKT KVDKPVPKRE NGRVPRPPDC PKCPAPEMLG   240
GPSVFIFPPK PKDTLLIART PEVTCVVVDL DPEDPEVQIS WFVDGKQMQT AKTQPREEQF   300
NGTYRVVSVL PIGHQDWLKG KQFTCKVNNK ALPSPIERTI SKARGQAHQP SVYVLPPSRE   360
ELSKNTVSLT CLIKDFFPPD IDVEWQSNGQ QEPESKYRTT PPQLDEDGSY FLYSKLSVDK   420
SRWQRGDTFI CAVMHEALHN HYTQESLSHS PGK                                453

SEQ ID NO: 19            moltype = AA  length = 451
FEATURE                  Location/Qualifiers
REGION                   1..451
                         note = Synthetic: Caninized heavy chain sequence from mouse
                             antibody clone M14 and canine IgG-C
source                   1..451
                         mol_type = protein
                         organism = synthetic construct
SEQUENCE: 19
EVQLVESGPS LVKPGGSLRL TCSVTGDSIT SGYWNWIRKF PGNKLEYMGY ISYSGITDYN    60
PSLKSRITIS RDTSKNQYYL QLNSVTTEDT ATYYCARYGN YGYAMDYWGQ GTLVTVSSAS   120
TTAPSVFPLA PSCGSQSGST VALACLVSGY IPEPVTVSWN SVSLTSGVHT FPSVLQSSGL   180
YSLSSMVTVP SSRWPSETFT CNVAHPATNT KVDKPVAKEC ECKCNCNNCP CPGCGLLGGP   240
SVFIFPPKPK DILVTARTPT VTCVVVDLDP ENPEVQISWF VDSKQVQTAN TQPREEQSNG   300
TYRVVSVLPI GHQDWLSGKQ FKCKVNNKAL PSPIEEIISK TPGQAHQPNV YVLPPSRDEM   360
SKNTVTLTCL VKDFFPPEID VEWQSNGQQE PESKYRMTPP QLDEDGSYFL YSKLSVDKSR   420
WQRGDTFICA VMHEALHNHY TQISLSHSPG K                                  451

SEQ ID NO: 20            moltype = AA  length = 449
FEATURE                  Location/Qualifiers
REGION                   1..449
                         note = Synthetic: Caninized heavy chain sequence from mouse
                             antibody clone M14 and canine IgG-D
source                   1..449
                         mol_type = protein
                         organism = synthetic construct
SEQUENCE: 20
EVQLVESGPS LVKPGGSLRL TCSVTGDSIT SGYWNWIRKF PGNKLEYMGY ISYSGITDYN    60
PSLKSRITIS RDTSKNQYYL QLNSVTTEDT ATYYCARYGN YGYAMDYWGQ GTLVTVSSAS   120
TTAPSVFPLA PSCGSTSGST VALACLVSGY FPEPVTVSWN SGSLTSGVHT FPSVLQSSGL   180
YSLSSTVTVP SSRWPSETFT CNVVHPASNT KVDKPVPKES TCKCISPCPV PESLGGPSVF   240
IFPPKPKDIL RITRTPEITC VVLDLGREDP EVQISWFVDG KEVHTAKTQP REQQFNSTYR   300
VVSVLPIEHQ DWLTGKEFKC RVNHIGLPSP IERTISKARG QAHQPSVYVL PPSPKELSSS   360
DTVTLTCLIK DFFPPEIDVE WQSNGQPEPE SKYHTTAPQL DEDGSYFLYS KLSVDKSRWQ   420
QGDTFTCAVM HEALQNHYTD LSLSHSPGK                                     449

SEQ ID NO: 21            moltype = AA  length = 221
FEATURE                  Location/Qualifiers
REGION                   1..221
                         note = Synthetic: Caninized light chain sequence from mouse
                             antibody clone M14 and canine light chain constant region
source                   1..221
                         mol_type = protein
                         organism = synthetic construct
SEQUENCE: 21
DIVMTQSPAS LSVSLGQRAT ISCRASESVD TYGNSFMHWY QQKPGQSPKL LIYRASNLES    60
GIPARFGGSG SGTDFTLTID PVQADDVATY YCQQSYEDPW TFGGGTKLEI KRNDAQPAVY   120
LFQPSPDQLH TGSASVVCLL NSFYPKDINV KWKVDGVIQD TGIQESVTEQ DKDSTYSLSS   180
TLTMSSTEYL SHELYSCEIT HKSLPSTLIK SFQRSECQRV D                       221

SEQ ID NO: 22            moltype = AA  length = 159
FEATURE                  Location/Qualifiers
REGION                   1..159
                         note = Canidae sp.
REGION                   1..159
                         note = misc_feature - Canine IL31 amino acid sequence
source                   1..159
                         mol_type = protein
                         organism = unidentified
SEQUENCE: 22
MLSHTGPSRF ALFLLCSMET LLSSHMAPTH QLPPSDVRKI ILELQPLSRG LLEDYQKKET    60
GVPESNRTLL LCLTSDSQPP RLNSSAILPY FRAIRPLSDK NIIDKIIEQL DKLKFQHEPE   120
TEISVPADTF ECKSFILTIL QQFSACLESV FKSLNSGPQ                          159
```

```
SEQ ID NO: 23            moltype = AA   length = 17
FEATURE                  Location/Qualifiers
REGION                   1..17
                         note = Canidae sp.
REGION                   1..17
                         note = misc_feature - Canine IL31 epitope
source                   1..17
                         mol_type = protein
                         organism = unidentified
SEQUENCE: 23
PSDVRKIILE LQPLSRG                                                     17

SEQ ID NO: 24            moltype = AA   length = 111
FEATURE                  Location/Qualifiers
REGION                   1..111
                         note = Murinae sp.
REGION                   1..111
                         note = misc_feature - Variable light chain amino acid
                           sequence of mouse antibody clone M14
source                   1..111
                         mol_type = protein
                         organism = unidentified
SEQUENCE: 24
DIVLTQSPAS LAVSLGQRAT ISCRASESVD TYGNSFMHWY QQKSGQSPKL LIYRASNLES       60
GIPARFGGSG SRTDFTLTID PVEADDVATY YCQQSYEDPW TFGGGTKLEI K               111

SEQ ID NO: 25            moltype = AA   length = 118
FEATURE                  Location/Qualifiers
REGION                   1..118
                         note = Murinae sp.
REGION                   1..118
                         note = misc_feature - Variable heavy chain amino acid
                           sequence of mouse antibody clone M14
source                   1..118
                         mol_type = protein
                         organism = unidentified
SEQUENCE: 25
EVQLQESGPS LVKPSQTLSL TCSVTGDSIT SGYWNWIRKF PGNKLEYMGY ISYSGITDYN       60
PSLKSRISIT RDTSKNQYYL QLNSVTTEDT ATYYCARYGN YGYAMDYWGQ GTSVTVSS        118

SEQ ID NO: 26            moltype = AA   length = 221
FEATURE                  Location/Qualifiers
REGION                   1..221
                         note = Synthetic: Chimeric variable light chain of mouse
                           antibody clone M14 and canine light chain constant region
source                   1..221
                         mol_type = protein
                         organism = synthetic construct
SEQUENCE: 26
DIVLTQSPAS LAVSLGQRAT ISCRASESVD TYGNSFMHWY QQKSGQSPKL LIYRASNLES       60
GIPARFGGSG SRTDFTLTID PVEADDVATY YCQQSYEDPW TFGGGTKLEI KRNDAQPAVY      120
LFQPSPDQLH TGSASVVCLL NSFYPKDINV KWKVDGVIQD TGIQESVTEQ DKDSTYSLSS      180
TLTMSSTEYL SHELYSCEIT HKSLPSTLIK SFQRSECQRV D                         221

SEQ ID NO: 27            moltype = AA   length = 453
FEATURE                  Location/Qualifiers
REGION                   1..453
                         note = Synthetic: Chimeric variable heavy chain of mouse
                           antibody clone M14 and canine IgG-B
source                   1..453
                         mol_type = protein
                         organism = synthetic construct
SEQUENCE: 27
EVQLQESGPS LVKPSQTLSL TCSVTGDSIT SGYWNWIRKF PGNKLEYMGY ISYSGITDYN       60
PSLKSRISIT RDTSKNQYYL QLNSVTTEDT ATYYCARYGN YGYAMDYWGQ GTSVTVSSAS      120
TTAPSVFPLA PSCGSTSGST VALACLVSGY FPEPVTVSWN SGSLTSGVHT PPSVLQSSGL      180
YSLSSMVTVP SSRWPSETFT CNVAHPASKT KVDKPVPKRE NGRVPRPPDC PKCPAPEMLG      240
GPSVFIFPPK PKDTLLIART PEVTCVVVDL DPEDPEVQIS WFVDGKQMQT AKTQPREEQF      300
NGTYRVVSVL PIGHQDWLKG KQFTCKVNNK ALPSPIERTI SKARGQAHQP SVYVLPPSRE      360
ELSKNTVSLT CLIKDFFPPD IDVEWQSNGQ QEPESKYRTT PPQLDEDGSY FLYSKLSVDK      420
SRWQRGDTFI CAVMHEALHN HYTQESLSHS PGK                                  453

SEQ ID NO: 28            moltype = AA   length = 159
FEATURE                  Location/Qualifiers
REGION                   1..159
                         note = misc_feature - Feline IL31 amino acid sequence NCBI
                           ref: XP_011286140.1 [felis catus]
source                   1..159
                         mol_type = protein
```

```
                            organism = Felis catus
SEQUENCE: 28
MLSHAGPARF ALFLLCCMET LLPSHMAPAH RLQPSDVRKI ILELRPMSKG LLQDYLKKEI    60
GLPESNHSSL PCLSSDSQLP HINGSAILPY FRAIRPLSDK NTIDKIIEQL DKLKFQREPE   120
AKVSMPADNF ERKNFILAVL QQFSACLEHV LQSLNSGPQ                          159

SEQ ID NO: 29           moltype = AA  length = 209
FEATURE                 Location/Qualifiers
REGION                  1..209
                        note = misc_feature - Equine IL31 amino acid sequence
source                  1..209
                        mol_type = protein
                        organism = Equus caballus
SEQUENCE: 29
MVSHIGSTRF ALFLLCCLGT LMFSHTGPIY QLQPKEIQAI IVELQNLSKK LLDDYLNKEK    60
GVQKFDSDLP SCFTSDSQAP GNINSSAILP YFKAISPSLN NDKSLYIIEQ LDKLNFQNAP   120
ETEVSMPTDN FERKRFILTI LRWFSNCLEL AMKTLTTAEQ ALPPLDPSTP HAGAVALTHH   180
QQDRTALDRA VFPFVWAAPR GGEVGDGGH                                     209

SEQ ID NO: 30           moltype = AA  length = 221
FEATURE                 Location/Qualifiers
REGION                  1..221
                        note = Synthetic: Chimeric variable light chain of mouse
                         antibody clone M14 and feline light chain constant region
source                  1..221
                        mol_type = protein
                        organism = synthetic construct
SEQUENCE: 30
DIVLTQSPAS LAVSLGQRAT ISCRASESVD TYGNSFMHWY QQKSGQSPKL LIYRASNLES    60
GIPARFGGSG SRTDFTLTID PVEADDVATY YCQQSYEDPW TFGGGTKLEI KRSDAQPSVF   120
LFQPSLDELH TGSASIVCIL NDFYPKEVNV KWKVDGVVQN KGIQESTTEQ NSKDSTYSLS   180
STLTMSSTEY QSHEKFSCEV THKSLASTLV KSFNRSECQR E                       221

SEQ ID NO: 31           moltype = AA  length = 453
FEATURE                 Location/Qualifiers
REGION                  1..453
                        note = Synthetic: Chimeric variable heavy chain of mouse
                         antibody clone M14 and feline heavy chain constant region
source                  1..453
                        mol_type = protein
                        organism = synthetic construct
SEQUENCE: 31
EVQLQESGPS LVKPSQTLSL TCSVTGDSIT SGYWNWIRKF PGNKLEYMGY ISYSGITDYN    60
PSLKSRISIT RDTSKNQYYL QLNSVTTEDT ATYYCARYGN YGYAMDYWGQ GTSVTVSSAS   120
TTAPSVFPLA PSCGTTSGAT VALACLVLGY FPEPVTVSWN SGALTSGVHT FPAVLQASGL   180
YSLSSMVTVP SSRWLSDTFT CNVAHPPSNT KVDKTVRKTD HPPGPKPCDC PKCPPPEMLG   240
GPSIFIFPPK PKDTLSISRT PEVTCLVVDL GPDDSDVQIT WFVDNTQVYT AKTSPREEQF   300
NSTYRVVSVL PILHQDWLKG KEFKCKVNSK SLPSPIERTI SKAKGQPHEP QVYVLPPAQE   360
ELSRNKVSVT CLIKSFHPPD IAVEWEITGQ PEPENNYRTT PPQLDSDGTY FVYSKLSVDR   420
SHWQRGNTYT CSVSHEALHS HHTQKSLTQS PGK                                453

SEQ ID NO: 32           moltype = AA  length = 111
FEATURE                 Location/Qualifiers
REGION                  1..111
                        note = Synthetic: Felinized variable light chain sequence
                         from mouse antibody clone M14
source                  1..111
                        mol_type = protein
                        organism = synthetic construct
SEQUENCE: 32
EIQMTQSPSS LSASPGDRVT ISCRASESVD TYGNSFMHWY QQKPGQSPKL LIYRASNLES    60
GVPSRFSGSG SGTDFTLTIS SLEPEDAATY YCQQSYEDPW TFGGGTKLEI K            111

SEQ ID NO: 33           moltype = AA  length = 118
FEATURE                 Location/Qualifiers
REGION                  1..118
                        note = Synthetic: Felinized variable heavy chain sequence
                         from mouse antibody clone M14
source                  1..118
                        mol_type = protein
                        organism = synthetic construct
SEQUENCE: 33
DVQLVESGGD LVKPGGSLRL TCSVTGDSIT SGYWNWVRQA PGKGLQWVAY ISYSGITDYA    60
DSVKGRFTIS RDNAKNTLYL QLNNLKAEDT ATYYCARYGN YGYAMDYWGQ GTLVTVSS     118

SEQ ID NO: 34           moltype = AA  length = 221
FEATURE                 Location/Qualifiers
REGION                  1..221
                        note = Synthetic: Felinized light chain sequence from mouse
```

```
                        antibody clone M14
source                  1..221
                        mol_type = protein
                        organism = synthetic construct
SEQUENCE: 34
EIQMTQSPSS LSASPGDRVT ISCRASESVD TYGNSFMHWY QQKPGQSPKL LIYRASNLES    60
GVPSRFSGSG SGTDFTLTIS SLEPEDAATY YCQQSYEDPW TFGGGTKLEI KRSDAQPSVF   120
LFQPSLDELH TGSASIVCIL NDFYPKEVNV KWKVDGVVQN KGIQESTTEQ NSKDSTYSLS   180
STLTMSSTEY QSHEKFSCEV THKSLASTLV KSFNRSECQR E                       221

SEQ ID NO: 35           moltype = AA   length = 453
FEATURE                 Location/Qualifiers
REGION                  1..453
                        note = Synthetic: Felinized heavy chain sequence from mouse
                         antibody clone M14
source                  1..453
                        mol_type = protein
                        organism = synthetic construct
SEQUENCE: 35
DVQLVESGGD LVKPGGSLRL TCSVTGDSIT SGYWNWVRQA PGKGLQWVAY ISYSGITDYA    60
DSVKGRFTIS RDNAKNTLYL QLNNLKAEDT ATYYCARYGN YGYAMDYWGQ GTLVTVSSAS   120
TTAPSVFPLA PSCGTTSGAT VALACLVLGY FPEPVTVSWN SGALTSGVHT FPAVLQASGL   180
YSLSSMVTVP SSRWLSDTFT CNVAHPPSNT KVDKTVRKTD HPPGPKPCDC PKCPPPEMLG   240
GPSIFIFPPK PKDTLSISRT PEVTCLVVDL GPDDSDVQIT WFVDNTQVYT AKTSPREEQF   300
NSTYRVVSVL PILHQDWLKG KEFKCKVNSK SLPSPIERTI SKAKGQPHEP QVYVLPPAQE   360
ELSRNKVSVT CLIKSFHPPD IAVEWEITGQ PEPENNYRTT PPQLDSDGTY FVYSKLSVDR   420
SHWQRGNTYT CSVSHEALHS HHTQKSLTQS PGK                                453

SEQ ID NO: 36           moltype = AA   length = 238
FEATURE                 Location/Qualifiers
REGION                  1..238
                        note = Murinae sp.
REGION                  1..238
                        note = MISC_FEATURE - Light chain amino acid sequence of
                         mouse antibody clone M14
source                  1..238
                        mol_type = protein
                        organism = unidentified
SEQUENCE: 36
METDTLLLWV LLLWVPGSTG DIVLTQSPAS LAVSLGQRAT ISCRASESVD TYGNSFMHWY    60
QQKSGQSPKL LIYRASNLES GIPARFGGSG SRTDFTLTID PVEADDVATY YCQQSYEDPW   120
TFGGGTKLEI KRADAAPTVS IFPPSSEQLT SGGASVVCFL NNFYPKDINV KWKIDGSERQ   180
NGVLNSWTDQ DSKDSTYSMS STLTLTKDEY ERHNSYTCEA THKTSTSPIV KSFNRNEC     238

SEQ ID NO: 37           moltype = AA   length = 238
FEATURE                 Location/Qualifiers
REGION                  1..238
                        note = Murinae sp.
REGION                  1..238
                        note = MISC_FEATURE - Light chain amino acid sequence of
                         mouse antibody clone M18
source                  1..238
                        mol_type = protein
                        organism = unidentified
SEQUENCE: 37
METDTLLLWV LLLWVPGSTG DIVLTQSPAS LAVSPGQRAT ISCRASESVD TYGNSFIHWY    60
QQKPGQSPKL LIYRASNLES GIPARFSGSG SRTDFTLTIN PVETDDVATY YCQQSYEDPW   120
TFGGGTKLEI KRADAAPTVS IFPPSSEQLT SGGASVVCFL NNFYPKDINV KWKIDGSERQ   180
NGVLNSWTDQ DSKDSTYSMS STLTLTKDEY ERHNSYTCEA THKTSTSPIV KSFNRNEC     238

SEQ ID NO: 38           moltype = AA   length = 238
FEATURE                 Location/Qualifiers
REGION                  1..238
                        note = Murinae sp.
REGION                  1..238
                        note = MISC_FEATURE - Light chain amino acid sequence of
                         mouse antibody clone M19
source                  1..238
                        mol_type = protein
                        organism = unidentified
SEQUENCE: 38
METDTLLLWV LLLWVPGSTG DIVLTQSPAS LAVSLGQRAT ISCRASESVD TYGNSFMHWY    60
QQKPGQSPKL LIYRASNLES GIPARFSGSG SRTDFTLTIN PVEADDIATY YCQQSYEDPW   120
TFGGGTKLEI KRADAAPTVS IFPPSSEQLT SGGASVVCFL NNFYPKDINV KWKIDGSERQ   180
NGVLNSWTDQ DSKDSTYSMS STLTLTKDEY ERHNSYTCEA THKTSTSPIV KSFNRNEC     238

SEQ ID NO: 39           moltype = AA   length = 238
FEATURE                 Location/Qualifiers
REGION                  1..238
```

```
                        note = Murinae sp.
REGION                  1..238
                        note = MISC_FEATURE - Light chain amino acid sequence of
                         mouse antibody clone M87
source                  1..238
                        mol_type = protein
                        organism = unidentified
SEQUENCE: 39
METDTLLLWV LLLWVPGSTG DIVLTQSPAS LAVSLGQRAT ISYRASKSVS TSGYSYMHWN    60
QQKPGQPPRL LIYLVSNLES GVPARFSGSG SGTDFTLNIH PVEEEDAATY YCQHIRELTR   120
SFGGGTKLEI KRADAAPTVS IFPPSSEQLT SGGASVVCFL NNFYPKDINV KWKIDGSERQ   180
NGVLNSWTDQ DSKDSTYSMS STLTLTKDEY ERHNSYTCEA THKTSTSPIV KSFNRNEC     238

SEQ ID NO: 40           moltype = AA   length = 152
FEATURE                 Location/Qualifiers
REGION                  1..152
                        note = Murinae sp.
REGION                  1..152
                        note = MISC_FEATURE - Variable and hinge heavy chain amino
                         acid sequence of mouse antibody clone M14
source                  1..152
                        mol_type = protein
                        organism = unidentified
SEQUENCE: 40
MAVLGLLLCL VTFPSCVLSE VQLQESGPSL VKPSQTLSLT CSVTGDSITS GYWNWIRKFP    60
GNKLEYMGYI SYSGITDYNP SLKSRISITR DTSKNQYYLQ LNSVTTEDTA TYYCARYGNY   120
GYAMDYWGQG TSVTVSSAKT TPPSVYPLAP GS                                 152

SEQ ID NO: 41           moltype = AA   length = 152
FEATURE                 Location/Qualifiers
REGION                  1..152
                        note = Murinae sp.
REGION                  1..152
                        note = MISC_FEATURE - Variable and hinge heavy chain amino
                         acid sequence of mouse antibody clone M18
source                  1..152
                        mol_type = protein
                        organism = unidentified
SEQUENCE: 41
MAVLGLLFCL VTFPSCVLSE VQLQESGPSL VKPSQTLSLT CSVTGDSITS GYWNWIRKFP    60
GNKLEYMGYI SYSGITDYNP SLKSRISITR DTSKNQYYLQ LNSVTTEDTA TYYCARYGNY   120
GYAMDYWGQG TSVTVSSAKT TPPSVYPLAP GS                                 152

SEQ ID NO: 42           moltype = AA   length = 152
FEATURE                 Location/Qualifiers
REGION                  1..152
                        note = Murinae sp.
REGION                  1..152
                        note = MISC_FEATURE - Variable and hinge heavy chain amino
                         acid sequence of mouse antibody clone M19
source                  1..152
                        mol_type = protein
                        organism = unidentified
SEQUENCE: 42
MAVLGLLFCL VTFPSCVLSE VQLQESGPSL VKPSQTLSLT CSVTGDSITS GYWNWIRKFP    60
GNELEYMGYI SYSGITYYNP SLKSRFSITR DTSKNQYYLQ LNSVTTEDTA TYYCARYGNY   120
GYAMDYWGQG TSVTVSSAKT TPPSVYPLAP GS                                 152

SEQ ID NO: 43           moltype = AA   length = 154
FEATURE                 Location/Qualifiers
REGION                  1..154
                        note = Murinae sp.
REGION                  1..154
                        note = MISC_FEATURE - Variable and hinge heavy chain amino
                         acid sequence of mouse antibody clone M87
source                  1..154
                        mol_type = protein
                        organism = unidentified
SEQUENCE: 43
MAVLGLLFCL VTFPSCVLSE VKLVESGGGL VQPGGSLRLS CATSGFTFTD YYMNWVRQPP    60
GKALEWLGFI RNKANGYTTE YSASVKGRFT ISRDNSQSIL YLQMNTLRAE DSATYYCARD   120
YYGSCFDYWG QGTTLTVSSA KTTPPSVYPL APGS                               154

SEQ ID NO: 44           moltype = AA   length = 137
FEATURE                 Location/Qualifiers
REGION                  1..137
                        note = Canidae sp.
REGION                  1..137
                        note = MISC_FEATURE - Mature canine IL31 amino acid sequence
```

```
source                    1..137
                          mol_type = protein
                          organism = unidentified
SEQUENCE: 44
SSHMAPTHQL PPSDVRKIIL ELQPLSRGLL EDYQKKETGV PESNRTLLLC LTSDSQPPRL    60
NSSAILPYFR AIRPLSDKNI IDKIIEQLDK LKFQHEPETE ISVPADTFEC KSFILTILQQ   120
FSACLESVFK SLNSGPQ                                                  137

SEQ ID NO: 45             moltype = AA  length = 7
FEATURE                   Location/Qualifiers
REGION                    1..7
                          note = IL31 epitope
SITE                      4
                          note = MISC_FEATURE - X is any amino acid; or wherein X is
                            a hydrophobic amino acid, or wherein X is selected from A,
                            V, I, and L, or wherein X is selected from V and I
SITE                      5
                          note = MISC_FEATURE - X is any amino acid; or wherein X is
                            a hydrophilic amino acid, or wherein X is selected from A,
                            R, K, Q, and N; or wherein X is selected from R and Q
source                    1..7
                          mol_type = protein
                          organism = synthetic construct
SEQUENCE: 45
PSDXXKI                                                               7

SEQ ID NO: 46             moltype = AA  length = 164
FEATURE                   Location/Qualifiers
REGION                    1..164
                          note = MISC_FEATURE - Human IL31 precursor amino acid
                            sequence NCBI ref: NP_001014358.1
source                    1..164
                          mol_type = protein
                          organism = Homo sapiens
SEQUENCE: 46
MASHSGPSTS VLFLFCCLGG WLASHTLPVR LLRPSDDVQK IVEELQSLSK MLLKDVEEEK    60
GVLVSQNYTL PCLSPDAQPP NNIHSPAIRA YLKTIRQLDN KSVIDEIIEH LDKLIFQDAP   120
ETNISVPTDT HECKRFILTI SQQFSECMDL ALKSLTSGAQ QATT                    164

SEQ ID NO: 47             moltype = AA  length = 177
FEATURE                   Location/Qualifiers
REGION                    1..177
                          note = MISC_FEATURE - Predicted walrus IL31 amino acid
                            sequence NCBI ref: XP_004395998.1 [odobeus rosmarus
                            divergens]
source                    1..177
                          mol_type = protein
                          note = divergens
                          organism = Odobenus rosmarus
SEQUENCE: 47
MLSHAGPARF ALFLLCFMGT SLTSQTAPIH QLHPSDVRKI ILELQPLSKG LLEDYLKKEM    60
GVPESNHFLL PCLTSDSQPP RINSSAILPY FRAIRPLSDK NTINKIIEQL DKLKFQHEPE   120
TEVSVPADTF ESKSFILAIL QQFSACLDHV FKSLNPGPQQ VMQGHLIEPI PSGTADV      177

SEQ ID NO: 48             moltype = AA  length = 187
FEATURE                   Location/Qualifiers
REGION                    1..187
                          note = MISC_FEATURE - Walrus_IL31_His6
source                    1..187
                          mol_type = protein
                          note = divergens
                          organism = Odobenus rosmarus
SEQUENCE: 48
MLSHAGPARF ALFLLCFMGT SLTSQTAPIH QLHPSDVRKI ILELQPLSKG LLEDYLKKEM    60
GVPESNHFLL PCLTSDSQPP RINSSAILPY FRAIRPLSDK NTINKIIEQL DKLKFQHEPE   120
TEVSVPADTF ESKSFILAIL QQFSACLDHV FKSLNPGPQQ VMQGHLIEPI PSGTADVGSG   180
SHHHHHH                                                             187

SEQ ID NO: 49             moltype = AA  length = 163
FEATURE                   Location/Qualifiers
REGION                    1..163
                          note = MISC_FEATURE - Predicted olive baboon IL31 amino
                            acid sequence NCBI ref: XP_003907358.1 [papio anubis]
source                    1..163
                          mol_type = protein
                          organism = Papio anubis
SEQUENCE: 49
MASHSGPATS VLFLLCCLGG WLTSHTLPVH FLQPSDIQKI VEELQSLSKM LLKDVKEDKG    60
VLVSQNYTLP CLTPDAQPPN IIHSPAIRAY LKTIRELDNK SVIDEIIEHL DKLIFQDAPE   120
```

```
TNISVPTDTH ECKRFILTIS QQFSECMDLA LKSLTSGAQQ ATT              163

SEQ ID NO: 50           moltype = AA  length = 173
FEATURE                 Location/Qualifiers
REGION                  1..173
                        note = MISC_FEATURE - Olive baboon_IL31_His6
source                  1..173
                        mol_type = protein
                        organism = Papio anubis
SEQUENCE: 50
MASHSGPATS VLFLLCCLGG WLTSHTLPVH FLQPSDIQKI VEELQSLSKM LLKDVKEDKG   60
VLVSQNYTLP CLTPDAQPPN IIHSPAIRAY LKTIRELDNK SVIDEIIEHL DKLIFQDAPE  120
TNISVPTDTH ECKRFILTIS QQFSECMDLA LKSLTSGAQQ ATTGSGSHHH HHH         173

SEQ ID NO: 51           moltype = AA  length = 159
FEATURE                 Location/Qualifiers
REGION                  1..159
                        note = MISC_FEATURE - Predicted polar bear IL31 amino acid
                         sequence NCBI ref: XP_008687166.1 [ursus maritimus]
source                  1..159
                        mol_type = protein
                        organism = Ursus maritimus
SEQUENCE: 51
MLSRAVPAGF ALFLLCYMET LLTSHTAPTH RLPPSDVRKI ILELQPLSKG LLEDYLKKET   60
GLPESNHSLV PCLTSDSEAP HINSSAILPY FRAIRPLSDK NVIDKIIEQL DKLKFQHEPE  120
TEVSVPADTF EGKSFILTIL QQFSACLERV FKSLNPGAQ                         159

SEQ ID NO: 52           moltype = AA  length = 185
FEATURE                 Location/Qualifiers
REGION                  1..185
                        note = MISC_FEATURE - Predicted weddell seal IL31 amino
                         acid sequence NCBI ref: XP_006746595.1 [leptonychotes
                         weddellii]
source                  1..185
                        mol_type = protein
                        organism = Ursus maritimus
SEQUENCE: 52
MLSHAGPARF ALFLLCFMET SLTSQTVPIH QLQPSDVRKI ILELQPLSKG LLEDYLKKEM   60
GVPESNHFLL PCLTSDSQPP RINSSAILPY FRAIRPLSDK NIIINKIIEQL DKLKFQHEPE 120
TEVSVPADTF ESKSFILTIL QQFSACLGHV LKSLNPGPQQ VMQGHLAKPI PSGTADMYET  180
LRHHH                                                             185

SEQ ID NO: 53           moltype = AA  length = 159
FEATURE                 Location/Qualifiers
REGION                  1..159
                        note = MISC_FEATURE - Predicted amur tiger IL31 amino acid
                         sequence NCBI ref: XP_007079636.1 [panther tigris altaica]
source                  1..159
                        mol_type = protein
                        note = altaica
                        organism = Panthera tigris
SEQUENCE: 53
MLSHAGPARF ALFLLCCMET LLPSHMAPTH RLQPSDVRKI ILELRPMSKG LLQDYLKKEM   60
GLPESNHSSL PCLSSDSQLP HINGSAILPY FRAIRPLSDK NTIDKIIEQL DKLKFQREPE  120
AEVSMPADNF ERKNFILAVL QQFSACLEHV LQSLNSGPQ                         159

SEQ ID NO: 54           moltype = AA  length = 159
FEATURE                 Location/Qualifiers
REGION                  1..159
                        note = MISC_FEATURE - Predicted cheetah IL31 amino acid
                         sequence NCBI ref: XP_014919275.1 [acinonyx jubatus]
source                  1..159
                        mol_type = protein
                        organism = Acinonyx jubatus
SEQUENCE: 54
MLSHAGPARF ALFLLCCMET LLPSHMAPTH RLQPSDVRKI ILELRPMSKG LLQDYLKKEM   60
GLPESNHSSL PCLSSDSQLP HINGSAILPY FRAIRPLSDK NTIDKIIEQL DKLKFQREPE  120
AEVSMPADNF ERKNFILAVL QQFSACLEHV LQSLNSGSQ                         159

SEQ ID NO: 55           moltype = AA  length = 163
FEATURE                 Location/Qualifiers
REGION                  1..163
                        note = MISC_FEATURE - Predicted crab-eating macaque IL31
                         amino acid sequence GenBank ref: EHH66805.1 [macaca
                         fascicularis]
source                  1..163
                        mol_type = protein
                        organism = Macaca fascicularis
SEQUENCE: 55
```

```
MASHSGPATS VLFLLCCLGG WLTSHTLPVH FLQPSDIQKI VEELQSLSKM LLKDVKEDKG    60
VLVSQNYTLP CLTPDAQPPN IIHSPAIRAY LKTIRQLDNK SVIDEIIEHL DKLIFQDAPE   120
TNISVPTDTH ECKRFILTIS QQFSECMDLA LKSLTSGAQQ ATT                    163

SEQ ID NO: 56           moltype = AA   length = 158
FEATURE                 Location/Qualifiers
REGION                  1..158
                        note = MISC_FEATURE - Predicted rhesus monkey IL31 amino
                          acid sequence (partial) GenBank ref: EHH21279.1 [macaca
                          mulatta]
source                  1..158
                        mol_type = protein
                        organism = Macaca mulatta
SEQUENCE: 56
GPATSVLFLL CCLGGWLTSH TLPVHFLQPS DIQKIVEELQ SLSKMLLKDV KEDKGVLVSQ    60
NYTLPCLTPD AQPPNIIHSP AIRAYLKTIR QLDNKSVIDE IIEHLDKLIF QDAPETNISV   120
PTDTHECKRF ILTISQQFSE CMDLALKSLT SGAQQATT                          158

SEQ ID NO: 57           moltype = AA   length = 163
FEATURE                 Location/Qualifiers
REGION                  1..163
                        note = MISC_FEATURE - Predicted drill IL31 amino acid
                          sequence NCBI ref: XP_011819882.1 [mandrillus leucophaeus]
source                  1..163
                        mol_type = protein
                        organism = Mandrillus leucophaeus
SEQUENCE: 57
MASHSGPATS VLFLLCCLGG WLTSHTLPVH FLQPSDIQKI VKELQSLSKM LLKDVKEDKG    60
VLVSQNYTLP CLTPDAQPPN IIHSPAIRAY LKTIRQLDNR SVIDEIIEHL DKLIFQDAPE   120
TNISVPTDTH ECKRFILTIS QQFSECMDLA LKSLTSGAQQ ATT                    163

SEQ ID NO: 58           moltype = AA   length = 163
FEATURE                 Location/Qualifiers
REGION                  1..163
                        note = MISC_FEATURE - Predicted green monkey IL31 amino
                          acid sequence NCBI ref: XP_008003211.1 [chlorocebus
                          sabaeus]
source                  1..163
                        mol_type = protein
                        organism = Chlorocebus sabaeus
SEQUENCE: 58
MASHSGPATS VLFLLCCLGG WLTSHTLPVH FLQPSDIQKI VEELQSLSKM LLKDVKEDKG    60
VLVSQNYKLP CLTPDAQPPN IIHSPAIRAY LKTIRQLDNK SVIDEIIEHL DKLIFQDAPE   120
TNISVPTDTH ECKRFILTIS QQFSECMDLA LKSLTSGAQQ ATT                    163

SEQ ID NO: 59           moltype = AA   length = 163
FEATURE                 Location/Qualifiers
REGION                  1..163
                        note = MISC_FEATURE - Predicted sooty mangebey IL31 amino
                          acid sequence NCBI ref: XP_011926625.1 [cercocebus atys]
source                  1..163
                        mol_type = protein
                        organism = Cercocebus atys
SEQUENCE: 59
MASHSGPATS VLFLLCCLGG WLTSHTLPVH FLQPSDIQKI VEELQSLSKM LLKDVKEDKG    60
VLVSQNYTLP CLTPDAQPPN IIHSPAIRAY LKTIRQLDNR SVIDEIIEHL DKLIFQDAPE   120
TNISVPTDTH ECKRFILTIS QQFSECMDLA LKSLTSGAQQ ATT                    163

SEQ ID NO: 60           moltype = AA   length = 163
FEATURE                 Location/Qualifiers
REGION                  1..163
                        note = MISC_FEATURE - Predicted golden snub-nosed monkey
                          IL31 amino acid sequence NCBI ref: XP_010366647.1
                          [rhinopithecus roxellana]
source                  1..163
                        mol_type = protein
                        organism = Rhinopithecus roxellana
SEQUENCE: 60
MASHSGPTTS VLFLLCCLGG WLTSHTLPVH FLRPSDIQKI VEELQSLSKM LLKDVEEDKG    60
VLVSQNYTLP CLTPDAQPPN IIHSPAIRAY LKTIRQLDNK SVIDEIIEHL DKLIFQDAPE   120
TNISVPTDTH ECKRFILTIS QQFSECMDLA LKSLTSGAQQ ATT                    163

SEQ ID NO: 61           moltype = AA   length = 163
FEATURE                 Location/Qualifiers
REGION                  1..163
                        note = MISC_FEATURE - Murine IL31 precursor amino acid
                          sequence NCBI ref: NP_083870 [mus musculus]
source                  1..163
                        mol_type = protein
```

```
                        organism = Mus musculus
SEQUENCE: 61
MIFHTGTTKP TLVLLCCIGT WLATCSLSFG APISKEDLRT TIDLLKQESQ DLYNNYSIKQ    60
ASGMSADESI QLPCFSLDRE ALTNISVIIA HLEKVKVLSE NTVDTSWVIR WLTNISCFNP   120
LNLNISVPGN TDESYDCKVF VLTVLKQFSN CMAELQAKDN TTC                    163

SEQ ID NO: 62           moltype = AA  length = 16
FEATURE                 Location/Qualifiers
REGION                  1..16
                        note = Murinae sp.
REGION                  1..16
                        note = MISC_FEATURE - Variable heavy chain CDR-H2 amino
                         acid sequence of mouse antibody clone M18
source                  1..16
                        mol_type = protein
                        organism = unidentified
SEQUENCE: 62
YISYSGITYY NPSLKS                                                   16

SEQ ID NO: 63           moltype = AA  length = 15
FEATURE                 Location/Qualifiers
REGION                  1..15
                        note = Murinae sp.
REGION                  1..15
                        note = MISC_FEATURE - Variable light chain CDR-L1 amino
                         acid sequence of mouse antibody clone M18
source                  1..15
                        mol_type = protein
                        organism = unidentified
SEQUENCE: 63
RASESVDTYG NSFIH                                                    15

SEQ ID NO: 64           moltype = AA  length = 131
FEATURE                 Location/Qualifiers
REGION                  1..131
                        note = Murinae sp.
REGION                  1..131
                        note = MISC_FEATURE - Variable light chain amino acid
                         sequence of mouse antibody clone M18
source                  1..131
                        mol_type = protein
                        organism = unidentified
SEQUENCE: 64
METDTLLLWV LLLWVPGSTG DIVLTQSPAS LAVSPGQRAT ISCRASESVD TYGNSFIHWY    60
QQKPGQSPKL LIYRASNLES GIPARFSGSG SRTDFTLTIN PVETDDVATY YCQQSYEDPW   120
TFGGGTKLEI K                                                       131

SEQ ID NO: 65           moltype = AA  length = 131
FEATURE                 Location/Qualifiers
REGION                  1..131
                        note = Murinae sp.
REGION                  1..131
                        note = MISC_FEATURE - Variable light chain amino acid
                         sequence of mouse antibody clone M19
source                  1..131
                        mol_type = protein
                        organism = unidentified
SEQUENCE: 65
METDTLLLWV LLLWVPGSTG DIVLTQSPAS LAVSLGQRAT ISCRASESVD TYGNSFMHWY    60
QQKPGQPPKL LIYRASNLES GIPARFSGSG SRTDFTLTIN PVEADDIATY YCQQSYEDPW   120
TFGGGTKLEI K                                                       131

SEQ ID NO: 66           moltype = AA  length = 131
FEATURE                 Location/Qualifiers
REGION                  1..131
                        note = Murinae sp.
REGION                  1..131
                        note = MISC_FEATURE - Variable light chain amino acid
                         sequence of mouse antibody clone M87
source                  1..131
                        mol_type = protein
                        organism = unidentified
SEQUENCE: 66
METDTLLLWV LLLWVPGSTG DIVLTQSPAS LAVSLGQRAT ISYRASKSVS TSGYSYMHWN    60
QQKPGQPPRL LIYLVSNLES GVPARFSGSG SGTDFTLNIH PVEEEDAATY YCQHIRELTR   120
SFGGGTKLEI K                                                       131

SEQ ID NO: 67           moltype = AA  length = 137
FEATURE                 Location/Qualifiers
```

```
REGION                  1..137
                        note = Murinae sp.
REGION                  1..137
                        note = MISC_FEATURE - Variable heavy chain amino acid
                         sequence of mouse antibody clone M18
source                  1..137
                        mol_type = protein
                        organism = unidentified
SEQUENCE: 67
MAVLGLLFCL VTFPSCVLSE VQLQESGPSL VKPSQTLSLT CSVTGDSITS GYWNWIRKFP    60
GNKLEYMGYI SYSGITDYNP SLKSRISITR DTSKNQYYLQ LNSVTTEDTA TYYCARYGNY   120
GYAMDYWGQG TSVTVSS                                                  137

SEQ ID NO: 68           moltype = AA   length = 137
FEATURE                 Location/Qualifiers
REGION                  1..137
                        note = Murinae sp.
REGION                  1..137
                        note = MISC_FEATURE - Variable heavy chain amino acid
                         sequence of mouse antibody clone M19
source                  1..137
                        mol_type = protein
                        organism = unidentified
SEQUENCE: 68
MAVLGLLFCL VTFPSCVLSE VQLQESGPSL VKPSQTLSLT CSVTGDSITS GYWNWIRKFP    60
GNELEYMGYI SYSGITYYNP SLKSRFSITR DTSKNQYYLQ LNSVTTEDTA TYYCARYGNY   120
GYAMDYWGQG TSVTVSS                                                  137

SEQ ID NO: 69           moltype = AA   length = 139
FEATURE                 Location/Qualifiers
REGION                  1..139
                        note = Murinae sp.
REGION                  1..139
                        note = MISC_FEATURE - Variable heavy chain amino acid
                         sequence of mouse antibody clone M87
source                  1..139
                        mol_type = protein
                        organism = unidentified
SEQUENCE: 69
MAVLGLLFCL VTFPSCVLSE VKLVESGGGL VQPGGSLRLS CATSGFTFTD YYMNWVRQPP    60
GKALEWLGFI RNKANGYTTE YSASVKGRFT ISRDNSQSIL YLQMNTLRAE DSATYYCARD   120
YYGSCFDYWG QGTTLTVSS                                                139

SEQ ID NO: 70           moltype = AA   length = 25
FEATURE                 Location/Qualifiers
REGION                  1..25
                        note = Caninized M14 HC-FR1
source                  1..25
                        mol_type = protein
                        organism = synthetic construct
SEQUENCE: 70
EVQLVESGPS LVKPGGSLRL TCSVT                                          25

SEQ ID NO: 71           moltype = AA   length = 15
FEATURE                 Location/Qualifiers
REGION                  1..15
                        note = Caninized M14 HC-FR2
source                  1..15
                        mol_type = protein
                        organism = synthetic construct
SEQUENCE: 71
NWIRKFPGNK LEYMG                                                     15

SEQ ID NO: 72           moltype = AA   length = 30
FEATURE                 Location/Qualifiers
REGION                  1..30
                        note = Caninized M14 HC-FR3
source                  1..30
                        mol_type = protein
                        organism = synthetic construct
SEQUENCE: 72
RITISRDTSK NQYYLQLNSV TTEDTATYYC                                     30

SEQ ID NO: 73           moltype = AA   length = 36
FEATURE                 Location/Qualifiers
REGION                  1..36
                        note = Alternate caninized M14 HC-FR3
source                  1..36
                        mol_type = protein
```

```
                                      organism = synthetic construct
SEQUENCE: 73
NPSLKSRITI SRDTSKNQYY LQLNSVTTED TATYYC                                  36

SEQ ID NO: 74              moltype = AA   length = 11
FEATURE                    Location/Qualifiers
REGION                     1..11
                           note = Caninized M14 HC-FR4
source                     1..11
                           mol_type = protein
                           organism = synthetic construct
SEQUENCE: 74
WGQGTLVTVS S                                                             11

SEQ ID NO: 75              moltype = AA   length = 23
FEATURE                    Location/Qualifiers
REGION                     1..23
                           note = Caninized M14 LC-FR1
source                     1..23
                           mol_type = protein
                           organism = synthetic construct
SEQUENCE: 75
DIVMTQSPAS LSVSLGQRAT ISC                                                23

SEQ ID NO: 76              moltype = AA   length = 15
FEATURE                    Location/Qualifiers
REGION                     1..15
                           note = Caninized M14 LC-FR2
source                     1..15
                           mol_type = protein
                           organism = synthetic construct
SEQUENCE: 76
WYQQKPGQSP KLLIY                                                         15

SEQ ID NO: 77              moltype = AA   length = 32
FEATURE                    Location/Qualifiers
REGION                     1..32
                           note = Caninized M14 LC-FR3
source                     1..32
                           mol_type = protein
                           organism = synthetic construct
SEQUENCE: 77
GIPARFGGSG SGTDFTLTID PVQADDVATY YC                                      32

SEQ ID NO: 78              moltype = AA   length = 10
FEATURE                    Location/Qualifiers
REGION                     1..10
                           note = Caninized M14 LC-FR4
source                     1..10
                           mol_type = protein
                           organism = synthetic construct
SEQUENCE: 78
FGGGTKLEIK                                                               10

SEQ ID NO: 79              moltype = AA   length = 25
FEATURE                    Location/Qualifiers
REGION                     1..25
                           note = Felinized M14 HC-FR1
source                     1..25
                           mol_type = protein
                           organism = synthetic construct
SEQUENCE: 79
DVQLVESGGD LVKPGGSLRL TCSVT                                              25

SEQ ID NO: 80              moltype = AA   length = 15
FEATURE                    Location/Qualifiers
REGION                     1..15
                           note = Felinized M14 HC-FR2
source                     1..15
                           mol_type = protein
                           organism = synthetic construct
SEQUENCE: 80
NWVRQAPGKG LQWVA                                                         15

SEQ ID NO: 81              moltype = AA   length = 37
FEATURE                    Location/Qualifiers
REGION                     1..37
                           note = Felinized M14 HC-FR3
source                     1..37
```

-continued

```
                                mol_type = protein
                                organism = synthetic construct
SEQUENCE: 81
ADSVKGRFTI SRDNAKNTLY LQLNNLKAED TATYYCA                                    37

SEQ ID NO: 82           moltype = AA   length = 11
FEATURE                 Location/Qualifiers
REGION                  1..11
                        note = Felinized M14 HC-FR4
source                  1..11
                        mol_type = protein
                        organism = synthetic construct
SEQUENCE: 82
WGQGTLVTVS S                                                                11

SEQ ID NO: 83           moltype = AA   length = 23
FEATURE                 Location/Qualifiers
REGION                  1..23
                        note = Felinized M14 LC-FR1
source                  1..23
                        mol_type = protein
                        organism = synthetic construct
SEQUENCE: 83
EIQMTQSPSS LSASPGDRVT ISC                                                   23

SEQ ID NO: 84           moltype = AA   length = 15
FEATURE                 Location/Qualifiers
REGION                  1..15
                        note = Felinized M14 LC-FR2
source                  1..15
                        mol_type = protein
                        organism = synthetic construct
SEQUENCE: 84
WYQQKPGQSP KLLIY                                                            15

SEQ ID NO: 85           moltype = AA   length = 32
FEATURE                 Location/Qualifiers
REGION                  1..32
                        note = Felinized M14 LC-FR3
source                  1..32
                        mol_type = protein
                        organism = synthetic construct
SEQUENCE: 85
GVPSRFSGSG SGTDFTLTIS SLEPEDAATY YC                                         32

SEQ ID NO: 86           moltype = AA   length = 10
FEATURE                 Location/Qualifiers
REGION                  1..10
                        note = Felinized M14 LC-FR4
source                  1..10
                        mol_type = protein
                        organism = synthetic construct
SEQUENCE: 86
FGGGTKLEIK                                                                  10

SEQ ID NO: 87           moltype = AA   length = 10
FEATURE                 Location/Qualifiers
REGION                  1..10
                        note = Murinae sp.
REGION                  1..10
                        note = MISC_FEATURE - Alternate variable heavy chain CDR-H2
                         amino acid sequence of mouse antibody clone M18
source                  1..10
                        mol_type = protein
                        organism = unidentified
SEQUENCE: 87
YISYSGITYY                                                                  10

SEQ ID NO: 88           moltype = AA   length = 7
FEATURE                 Location/Qualifiers
REGION                  1..7
                        note = Canidae sp.
REGION                  1..7
                        note = MISC_FEATURE - Alternative canine IL31 epitope
source                  1..7
                        mol_type = protein
                        organism = unidentified
SEQUENCE: 88
PSDVRKI                                                                     7
```

```
SEQ ID NO: 89         moltype = AA  length = 10
FEATURE               Location/Qualifiers
REGION                1..10
                      note = Murinae sp.
REGION                1..10
                      note = MISC_FEATURE - Alternate variable heavy chain CDR-H2
                       amino acid sequence of mouse antibody clones M14 and M19
source                1..10
                      mol_type = protein
                      organism = unidentified
SEQUENCE: 89
YISYSGITDY                                                                     10
```